(12) United States Patent
Pringle, IV et al.

(10) Patent No.: US 10,981,277 B2
(45) Date of Patent: Apr. 20, 2021

(54) SHANK-FASTENER APPARATUSES AND METHODS FOR JOINING PANELS

(71) Applicant: The Boeing Company, Chicago, IL (US)

(72) Inventors: John Walter Pringle, IV, Torrance, CA (US); Chris J. Erickson, Garden Grove, CA (US)

(73) Assignee: The Boeing Company, Chicago, IL (US)

( * ) Notice: Subject to any disclaimer, the term of this patent is extended or adjusted under 35 U.S.C. 154(b) by 17 days.

(21) Appl. No.: 16/222,861

(22) Filed: Dec. 17, 2018

(65) Prior Publication Data

US 2020/0189119 A1    Jun. 18, 2020

(51) Int. Cl.
   *B21J 15/14*     (2006.01)
   *B21J 15/32*     (2006.01)
   (Continued)

(52) U.S. Cl.
   CPC .......... *B25J 11/005* (2013.01); *B21J 15/022* (2013.01); *B21J 15/142* (2013.01); *B21J 15/32* (2013.01);
   (Continued)

(58) Field of Classification Search
   CPC .......... Y10T 29/5118; Y10T 29/49956; Y10T 29/5116; Y10T 29/49943; Y10T 408/37;
   (Continued)

(56) References Cited

U.S. PATENT DOCUMENTS

| 4,590,578 A | 5/1986 | Barto, Jr. et al. |
| 4,662,556 A | 5/1987 | Gidlund |

(Continued)

FOREIGN PATENT DOCUMENTS

| DE | 4320282 A1 * | 12/1994 |
| FR | 2722437 A1 * | 1/1996 |
| GB | 27049 | 5/1914 |

OTHER PUBLICATIONS

U.S. Appl. No. 15/832,543, filed Dec. 5, 2017, Pringle et al.

*Primary Examiner* — Erica E Cadugan
(74) *Attorney, Agent, or Firm* — Dascenzo Gates Intellectual Property Law, P.C.

(57) ABSTRACT

A shank-fastener apparatus comprises a shank-fastener housing, a shank-fastener turret, an indexing-pin assembly, a drill, and a shank-fastener delivery assembly. The shank-fastener turret is supported by the shank-fastener housing and is selectively rotatable relative to the shank-fastener housing about a shank-fastener-turret rotation axis (A). The indexing-pin assembly is supported by the shank-fastener housing and is selectively movable relative to the shank-fastener housing between an indexing-pin-assembly extended position and an indexing-pin-assembly retracted position along an indexing-pin-assembly axis (B) that is parallel to the shank-fastener-turret rotation axis (A). The drill is supported by the shank-fastener turret and is selectively movable relative to the shank-fastener turret along a drill axis (C) that is parallel to the shank-fastener-turret rotation axis (A). The shank-fastener delivery assembly also supported by the shank-fastener turret.

20 Claims, 47 Drawing Sheets

(51) Int. Cl.
*B21J 15/02* (2006.01)
*B23P 19/10* (2006.01)
*B23P 19/06* (2006.01)
*B25J 11/00* (2006.01)

(52) U.S. Cl.
CPC ............. *B23P 19/063* (2013.01); *B23P 19/10* (2013.01); *Y10T 29/4978* (2015.01); *Y10T 29/49956* (2015.01); *Y10T 29/5107* (2015.01); *Y10T 29/5118* (2015.01); *Y10T 29/5155* (2015.01)

(58) Field of Classification Search
CPC ............................ Y10T 29/49947–4997; Y10T 29/5373–53778; Y10T 29/49778–4978; Y10T 29/49895; B21J 15/022; B21J 15/142; B23P 19/063; B23P 19/06–069; B23P 19/10–12; B25J 11/007; B25J 15/0057; B23B 39/20–205
USPC ........ 29/34 B, 525.06, 34 R, 525.01–525.15, 29/524.1, 243.521–243.55, 407.09–407.1, 29/464; 408/35
See application file for complete search history.

(56) References Cited

U.S. PATENT DOCUMENTS

| | | | | |
|---|---|---|---|---|
| 4,762,261 | A | * | 8/1988 | Hawly ..................... B21J 15/14 227/111 |
| 4,854,491 | A | * | 8/1989 | Stoewer ................. B21J 15/022 227/58 |
| 4,885,836 | A | | 12/1989 | Bonomi et al. |
| 5,611,130 | A | * | 3/1997 | Rummell ................. B21J 15/10 29/34 B |
| 6,172,374 | B1 | | 1/2001 | Banks et al. |
| 6,237,212 | B1 | * | 5/2001 | Speller, Jr. ............... B21J 15/10 29/34 B |
| 7,805,829 | B2 | | 10/2010 | Herrmann et al. |
| 2016/0008869 | A1 | | 1/2016 | Oberoi et al. |
| 2017/0312923 | A1 | | 11/2017 | Erickson |
| 2020/0189047 | A1 | * | 6/2020 | Pringle, IV ............. B23P 19/06 |

* cited by examiner

SYSTEM 1000

| FIRST ROBOTIC DEVICE 600 | SECOND ROBOTIC DEVICE 602 |
|---|---|
| FIRST END EFFECTOR 603 | SECOND END EFFECTOR 604 |
| SHANK-FASTENER APPARATUS 100 | RECEIVER-FASTENER APPARATUS 200 |
| SHANK-FASTENER-TURRET 102 | RECEIVER-FASTENER-TURRET 202 |
| SHANK-FASTENER-TURRET TRAILING SIDE 180 | RECEIVER-FASTENER-TURRET TRAILING SIDE 280 |
| SHANK-FASTENER-TURRET LEADING SIDE 181 | SHANK-FASTENER-TURRET LEADING SIDE 281 |
| DRILL RECEPTACLE 183 | ANVIL RECEPTACLE 282 |
| DRILL CHAMBER 182 | SWAGER RECEPTACLE 284 |
| SHANK-FASTENER-DELIVERY-ASSEMBLY RECEPTACLE 184 | RECEIVER-FASTENER RECEPTACLE 290 |
| PISTON CHAMBER 186 | RECEIVER FASTENERS 506 |
| MAGAZINE PRESSURE SUPPLY PORT 139 | RECEIVER-FASTENER RECEPTACLE 290 |
|  | PISTON CHAMBER 248 |
| INDEXING-PIN ASSEMBLY 103 | INDEXING-COLLET ASSEMBLY 203 |
| CLAMPING SLEEVE 111 | COLLET SLEEVE 220 |
| CLAMPING-SLEEVE FIRST END 119 | COLLET-SLEEVE FIRST END 222 |
| CLAMPING-SLEEVE SECOND END 120 | COLLET-SLEEVE SECOND END 223 |
|  | TAPERED INNER SURFACE 226 |

FIG. 1A

| GEAR TRAIN 162 | SWAGER ASSEMBLY 206 |
|---|---|
| CHUCK NUT 163 | SWAGER 207 |
| | PISTON 245 |

SHANK-FASTENER DELIVERY ASSEMBLY 105

- MAGAZINE 138
  - MAGAZINE BODY 148
  - SHANK-FASTENER OUTLET 145
  - MAGAZINE SLOT 143
    - SHELF 142
  - SHANK FASTENERS 504
  - FIRST MAGAZINE SIDE 140
  - SECOND MAGAZINE SIDE 141
- RETAINER 147
  - FIRST RETAINER SIDE 152
  - SECOND RETAINER SIDE 153
  - FLAPS 154
  - HOLLOW INTERIOR SPACE 155
  - RETAINER SLOT 156
- PUSH ROD 149
  - FIRST PUSH-ROD END 150
  - SECOND PUSH-ROD END 151

RECEIVER-FASTENER HOUSING 270

- RECEIVER-FASTENER-HOUSING MOUNTING FLANGES 273
- INDEXING-COLLET-ASSMBLY RECEPTACLE 272
  - INDEXING-COLLET-ASSEMBLY-RECEPTACLE FIRST END 275
  - INDEXING-COLLET-ASSEMBLY-RECEPTACLE SECOND END 276
  - INDEXING-COLLET-ASSEMBLY-RECEPTACLE INLET 269
- CAP 291
- RECEIVER-FASTENER-RECEPTACLE SPRING 293

FIG. 1C

SHANK-FASTENER APPARATUSES AND METHODS FOR JOINING PANELS

FIELD

The present disclosure relates to joining panels.

BACKGROUND

Various types of fastening systems are used in a variety of manufacturing industries to fasten together two plates of material, including for example bolt-and-nut fastening systems, rivet fastening systems, and lockbolt fastening systems. In particular, lockbolt fastening systems are used extensively in the aerospace manufacturing industry. In some applications, installation-site space may be confined, overhead, or otherwise difficult to reach or access by human personnel with hand-operated tools. In one particular example, access to the internal panels (e.g., ribs) of a wing-box is particularly restricted.

SUMMARY

Accordingly, apparatuses and methods, intended to address at least the above-identified concerns, would find utility.

The following is a non-exhaustive list of examples, which may or may not be claimed, of the subject matter according to the invention.

One example of the subject matter, according to the invention, relates to a shank-fastener apparatus. The shank-fastener apparatus is for joining, in concert with a receiver-fastener apparatus, a first panel and a second panel, at least partially overlapping each other. The shank-fastener apparatus comprises a shank-fastener housing, a shank-fastener turret, an indexing-pin assembly, a drill, and a shank-fastener delivery assembly. The shank-fastener turret is supported by the shank-fastener housing and is selectively rotatable relative to the shank-fastener housing about a shank-fastener-turret rotation axis. The indexing-pin assembly is supported by the shank-fastener housing and is selectively movable relative to the shank-fastener housing between an indexing-pin-assembly extended position and an indexing-pin-assembly retracted position along an indexing-pin-assembly axis that is parallel to the shank-fastener-turret rotation axis. The drill is supported by the shank-fastener turret and is selectively movable relative to the shank-fastener turret along a drill axis that is parallel to the shank-fastener-turret rotation axis. The shank-fastener delivery assembly is supported by the shank-fastener turret.

The indexing-pin assembly enables the shank-fastener apparatus to be temporarily fixed relative to the first panel and the second panel, as well as relative to the receiver-fastener apparatus, while the various component tools of the shank-fastener apparatus function. More specifically, when the indexing-pin assembly fixes the shank-fastener apparatus relative to the first panel and the second panel, the shank-fastener turret can then be rotated relative to the shank-fastener housing to align the drill with at a point where a drilled hole is desired through the first panel and the second panel, and subsequently rotated to align the shank-fastener delivery assembly with the drilled hole for insertion of a shank fastener through the drilled hole.

The indexing-pin assembly is configured to transition between an indexing-pin-assembly retracted position and an indexing-pin-assembly extended position so that it may be selectively inserted into the locating hole in one of the first panel and the second panel. Once inserted into the locating hole, the indexing-pin assembly may then secure the shank-fastener apparatus relative to the first panel and second panel. Moreover, by having an indexing-pin-assembly retracted position, the indexing-pin assembly may be drawn into the shank-fastener turret, providing for a compact volume of the shank-fastener apparatus as it is manipulated into place for operation, which location may be confined with limited access.

The shank-fastener turret is rotatable relative to the shank-fastener housing, so that once the shank-fastener apparatus is secured relative to the first panel and the second panel by the indexing-pin assembly, the tools supported by the shank-fastener turret (i.e., the drill and the shank-fastener delivery assembly) may be selectively positioned relative to the first panel and the second panel for operation thereof. That is, the drill may be positioned for drilling a drilled hole at a point, and subsequently the shank-fastener delivery assembly may be positioned for insertion of a shank fastener through the drilled hole and through a receiver fastener operatively placed by the receiver-fastener apparatus.

Another example of the subject matter, according to the invention, relates to a receiver-fastener apparatus. The receiver-fastener apparatus is for joining, in concert with a shank-fastener apparatus, a first panel and a second panel, at least partially overlapping each other. The receiver-fastener apparatus comprises a receiver-fastener housing, a receiver-fastener turret, an indexing-collet assembly, an anvil, a receiver-fastener delivery assembly, and a swager assembly. The receiver-fastener turret is supported by the receiver-fastener housing and is selectively rotatable relative to the receiver-fastener housing about a receiver-fastener-turret rotation axis. The indexing-collet assembly is supported by the receiver-fastener housing and is selectively movable relative to the receiver-fastener housing between an indexing-collet-assembly extended position and an indexing-collet-assembly retracted position along an indexing-collet-assembly axis that is parallel to the receiver-fastener-turret rotation axis. The anvil is supported by the receiver-fastener turret and is selectively movable relative to the receiver-fastener turret along an anvil axis that is parallel to the receiver-fastener-turret rotation axis. The receiver-fastener delivery assembly is supported by the receiver-fastener turret and is configured to operatively position receiver fasteners for operative placement on shank fasteners, corresponding to the receiver fasteners. The swager assembly also is supported by the receiver-fastener turret and is movable relative to the receiver-fastener turret along a swaging axis that is parallel to the receiver-fastener-turret rotation axis.

The indexing-collet assembly enables the receiver-fastener apparatus to be temporarily fixed to the shank-fastener apparatus, and thus relative to the first panel and the second panel, while the various component tools of the receiver-fastener apparatus function. More specifically, the indexing-collet assembly is configured to couple to the indexing-pin assembly of the shank-fastener apparatus when the indexing-pin assembly is secured to a locating hole in one of the first panel or the second panel. In addition, when the indexing-collet assembly is coupled to the indexing-pin assembly, and thus when both of the shank-fastener apparatus and the receiver-fastener apparatus are fixed relative to the first panel and the second panel, the receiver-fastener turret can then be rotated relative to the receiver-fastener housing to align the anvil with the drill and for placement of one of the receiver fasteners for insertion of one of the shank fasteners via the drilled hole, and subsequently rotated to align the swager assembly with the placed receiver fastener for swaging onto the shank fastener.

The indexing-collet assembly is configured to transition between an indexing-collet-assembly extended position and an indexing-collet-assembly retracted position so that it may be selectively extended to be coupled to the indexing-pin assembly of the shank-fastener apparatus at the locating hole. Moreover, by having an indexing-collet-assembly retracted position, the indexing-collet assembly may be drawn into the receiver-fastener housing 270, providing for a compact volume of the receiver-fastener apparatus as it is manipulated into place for operation, which location may be confined with limited access.

The receiver-fastener turret is rotatable relative to the receiver-fastener housing, so that once the receiver-fastener apparatus is coupled to the shank-fastener apparatus and thus is secured relative to the first panel and the second panel by the indexing-collet assembly, the tools supported by the receiver-fastener turret (i.e., the anvil, the receiver-fastener delivery assembly, and the swager assembly) may be selectively positioned relative to the first panel and the second panel for operation thereof. That is, the anvil may be positioned for countering the force of the drill and for operative placement of one of the receiver fasteners, and subsequently the receiver-fastener delivery assembly may be positioned for the swager assembly to swage a receiver fastener onto a shank fastener extending through the receiver fastener.

Another example of the subject matter, according to the invention, relates to a system for joining a first panel and a second panel, at least partially overlapping each other. The system comprises a shank-fastener apparatus and a receiver-fastener apparatus. The shank-fastener apparatus comprises a shank-fastener housing, a shank-fastener turret, an indexing-pin assembly, a drill, and a shank-fastener delivery assembly. The shank-fastener turret is supported by the shank-fastener housing and is selectively rotatable relative to the shank-fastener housing about a shank-fastener-turret rotation axis. The indexing-pin assembly is supported by the shank-fastener housing and is selectively movable relative to the shank-fastener housing between an indexing-pin-assembly extended position and an indexing-pin-assembly retracted position along an indexing-pin-assembly axis that is parallel to the shank-fastener-turret rotation axis. The drill is supported by the shank-fastener turret and is selectively movable relative to the shank-fastener turret along a drill axis that is parallel to the shank-fastener-turret rotation axis. The shank-fastener delivery assembly also is supported by the shank-fastener turret. The receiver-fastener apparatus comprises a receiver-fastener housing, a receiver-fastener turret, an indexing-collet assembly, an anvil, a receiver-fastener delivery assembly, and a swager assembly. The receiver-fastener turret is supported by the receiver-fastener housing and is selectively rotatable relative to the receiver-fastener housing about a receiver-fastener-turret rotation axis. The indexing-collet assembly is supported by the receiver-fastener housing and is selectively movable relative to the receiver-fastener housing between an indexing-collet-assembly extended position and an indexing-collet-assembly retracted position along an indexing-collet-assembly axis that is parallel to the receiver-fastener-turret rotation axis. The indexing-collet assembly also is configured to cooperate with the indexing-pin assembly to secure the shank-fastener apparatus and the receiver-fastener apparatus relative to the first panel and the second panel. The anvil is supported by the receiver-fastener turret and is selectively movable relative to the receiver-fastener turret along an anvil axis that is parallel to the receiver-fastener-turret rotation axis. The anvil is also configured to cooperate with the drill for operative drilling of a hole through the first panel and the second panel. The receiver-fastener delivery assembly is supported by the receiver-fastener turret and is configured to position receiver fasteners for operative placement on shank fasteners, corresponding to the receiver fasteners, by the shank-fastener delivery assembly. The swager assembly is supported by the receiver-fastener turret and is movable relative to the receiver-fastener turret along a swaging axis that is parallel to the receiver-fastener-turret rotation axis. The swager assembly is also configured to swage the receiver fasteners on corresponding ones of the shank fasteners.

Another example of the subject matter, according to the invention, relates to a method of joining a first panel and a second panel, at least partially overlapping each other. The method comprises locating a shank-fastener apparatus relative to the first panel and the second panel by engaging an indexing-pin assembly of the shank-fastener apparatus with a locating hole in the first panel. The shank-fastener apparatus is located on a first side of the first panel. The method further comprises locating a receiver-fastener apparatus relative to the first panel and the second panel by engaging the indexing-pin assembly of the shank-fastener apparatus with an indexing-collet assembly of the receiver-fastener apparatus. The receiver-fastener apparatus is located opposite the shank-fastener apparatus on a second side of the first panel, opposite the first side. The method also comprises aligning a drill of the shank-fastener apparatus with an anvil of the receiver-fastener apparatus. The method additionally comprises drilling a hole with the drill through the first panel and the second panel. The method further comprises aligning one of receiver fasteners with the hole using a receiver-fastener delivery assembly of the receiver-fastener apparatus. The method also comprises inserting one of shank fasteners from the first side of the first panel into the hole and into the one of the receiver fasteners using a shank-fastener delivery assembly of the shank-fastener apparatus. The method additionally comprises securing the one of the receiver fasteners onto the one of the shank fasteners with a swager assembly of the receiver-fastener apparatus.

By locating the shank-fastener apparatus and the receiver-fastener apparatus relative to the first panel and the second panel, and by engaging the indexing-pin assembly with the indexing-collet assembly, the shank-fastener apparatus and the receiver-fastener apparatus are secured relative to the first panel and the second panel for operation of their respective component tools. That is, once the shank-fastener apparatus is secured, the drill may be accurately positioned for drilling the drilled hole through the first panel and the second panel, and subsequently the shank-fastener delivery assembly may be accurately positioned for inserting one of the shank fasteners through the drilled hole and through a receiver fastener positioned by the receiver-fastener apparatus. Once the receiver-fastener apparatus is secured, the anvil may be accurately positioned opposite the drill, one of the receiver fasteners may be positioned for insertion of the shank fastener through the drilled hole and through the positioned receiver fastener, and subsequently, the swager assembly may be accurately positioned for securing the placed receiver fastener to the inserted shank fastener.

BRIEF DESCRIPTION OF THE DRAWINGS

Figure 1B:
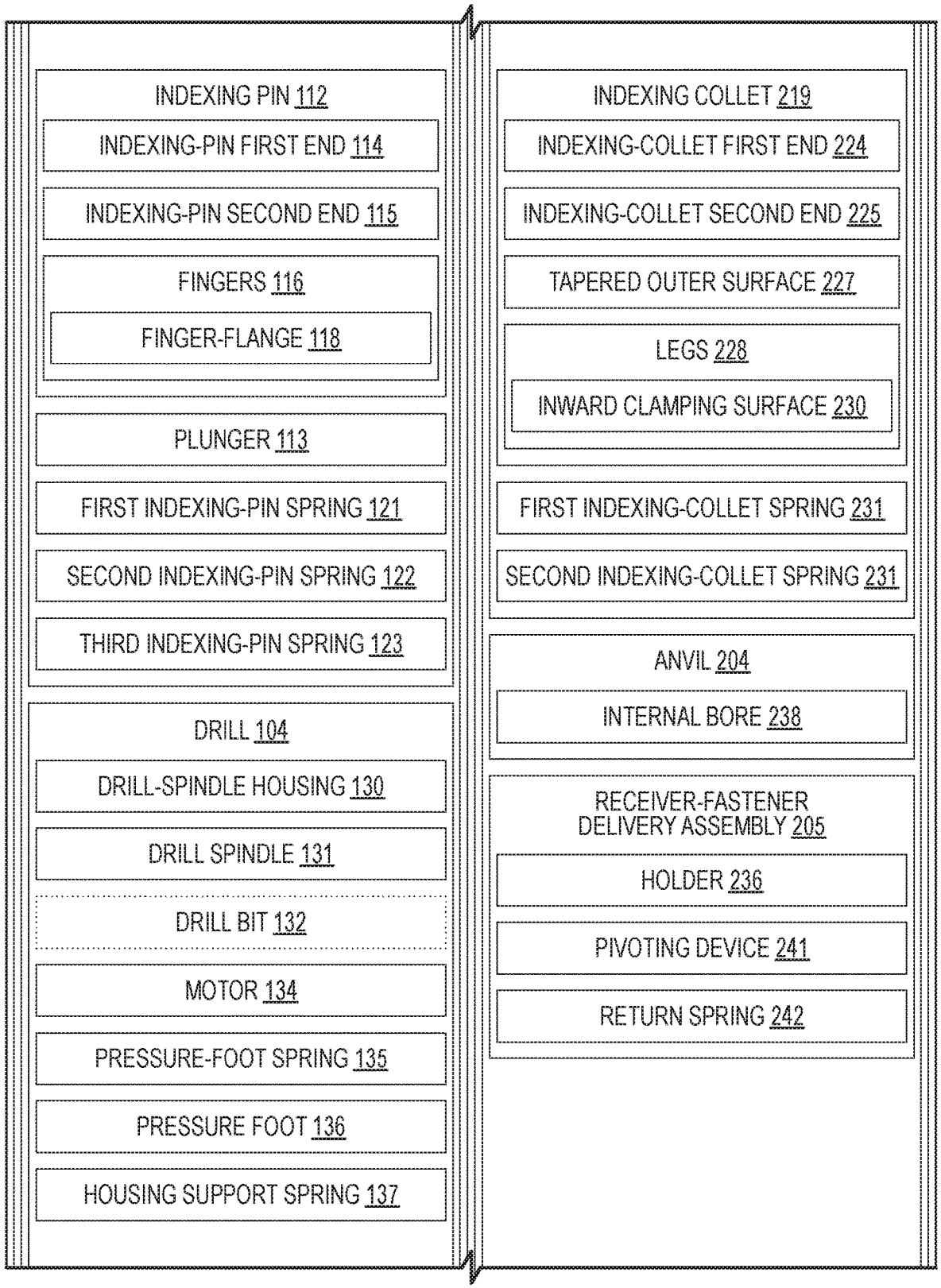
Figure 1D:
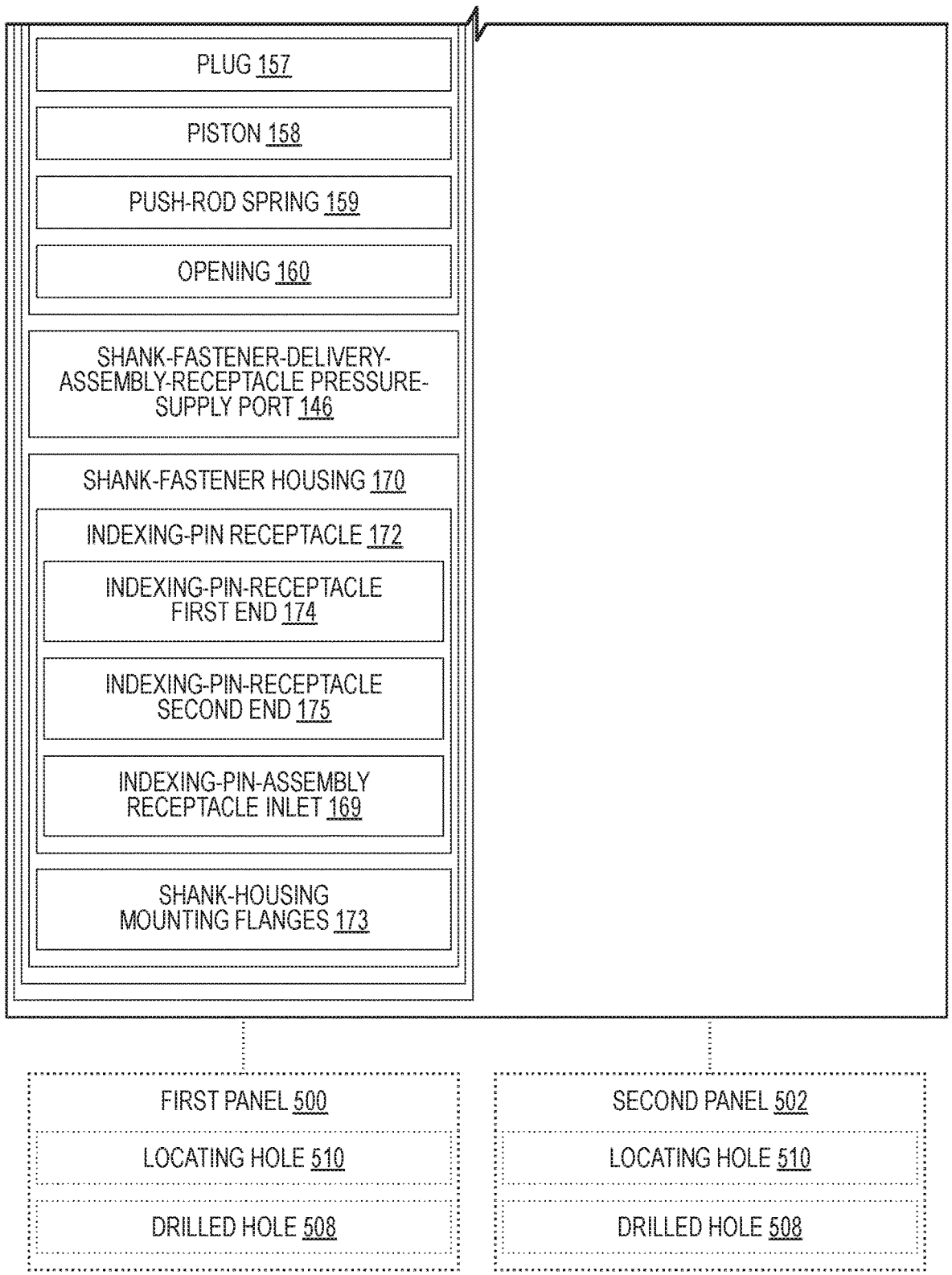
Figure 2:
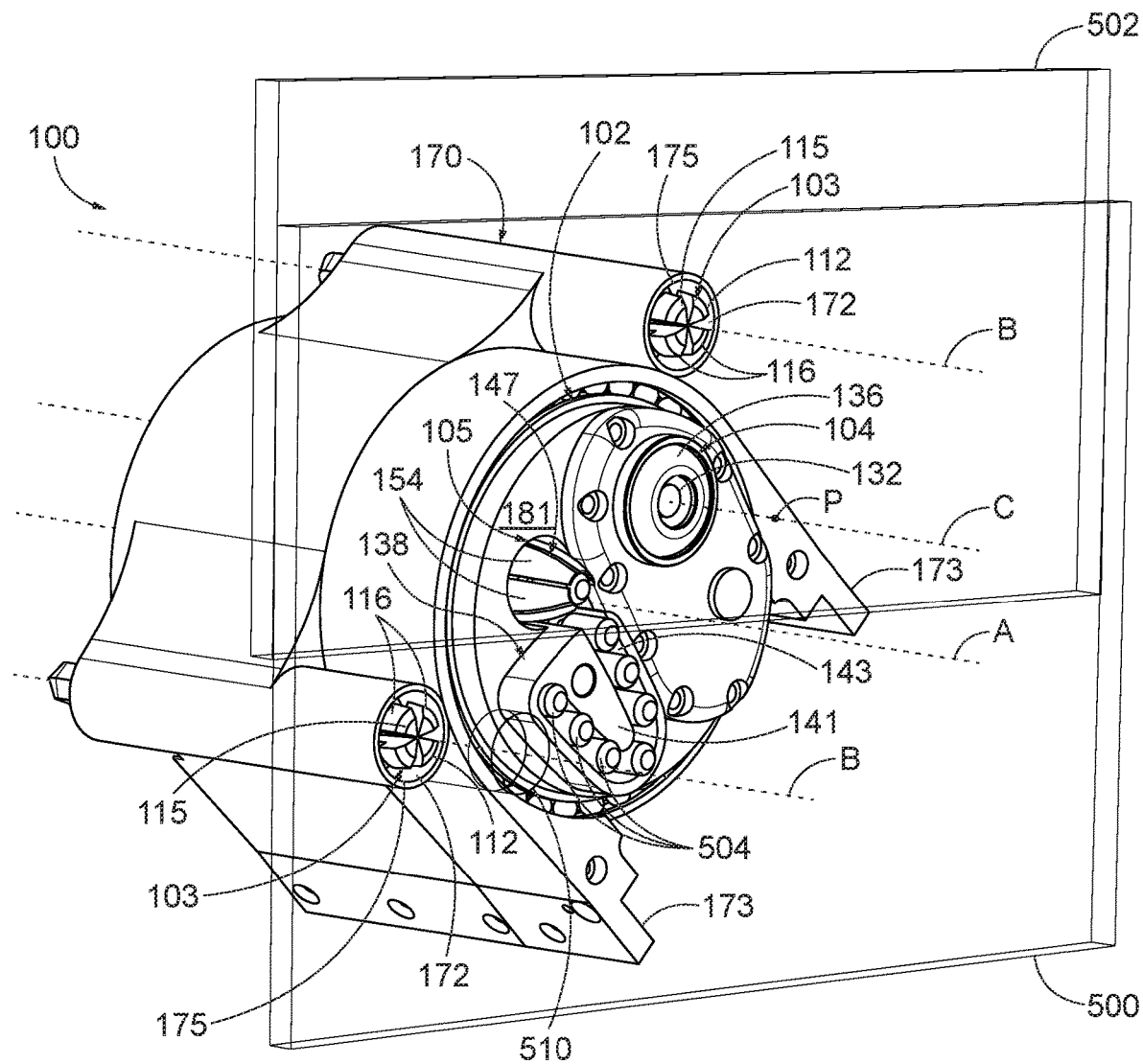
Figure 3:
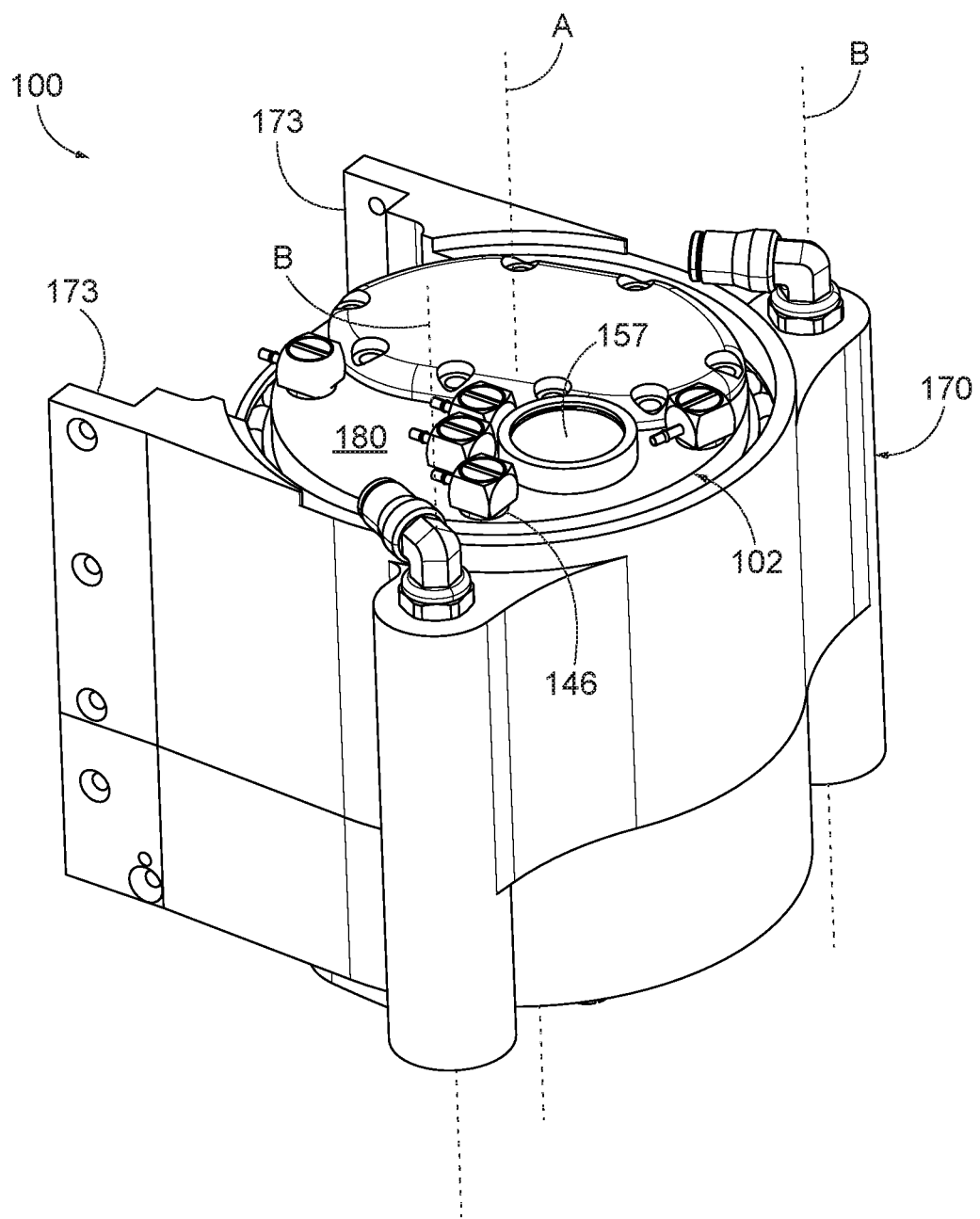
Figure 4:
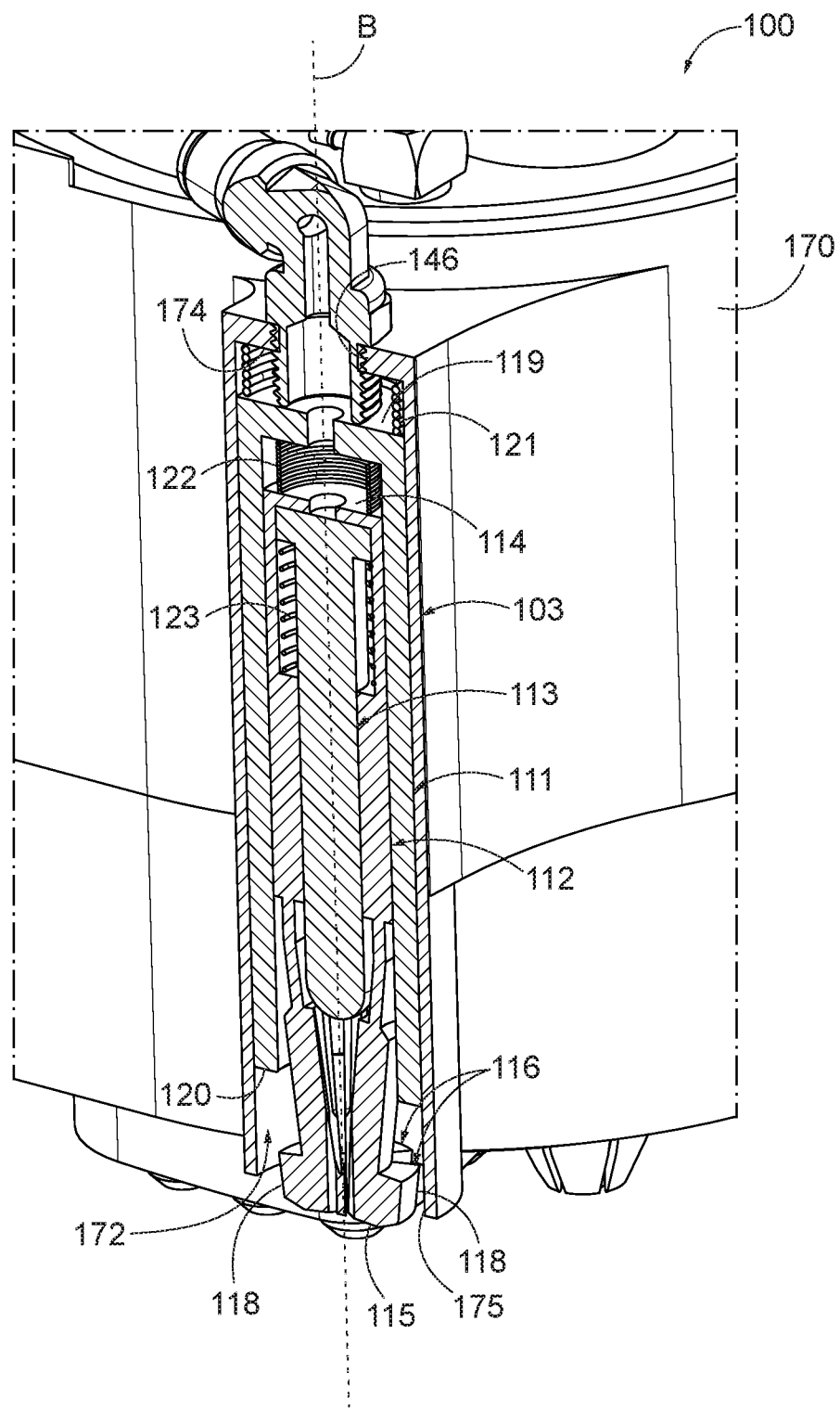
Figure 5:
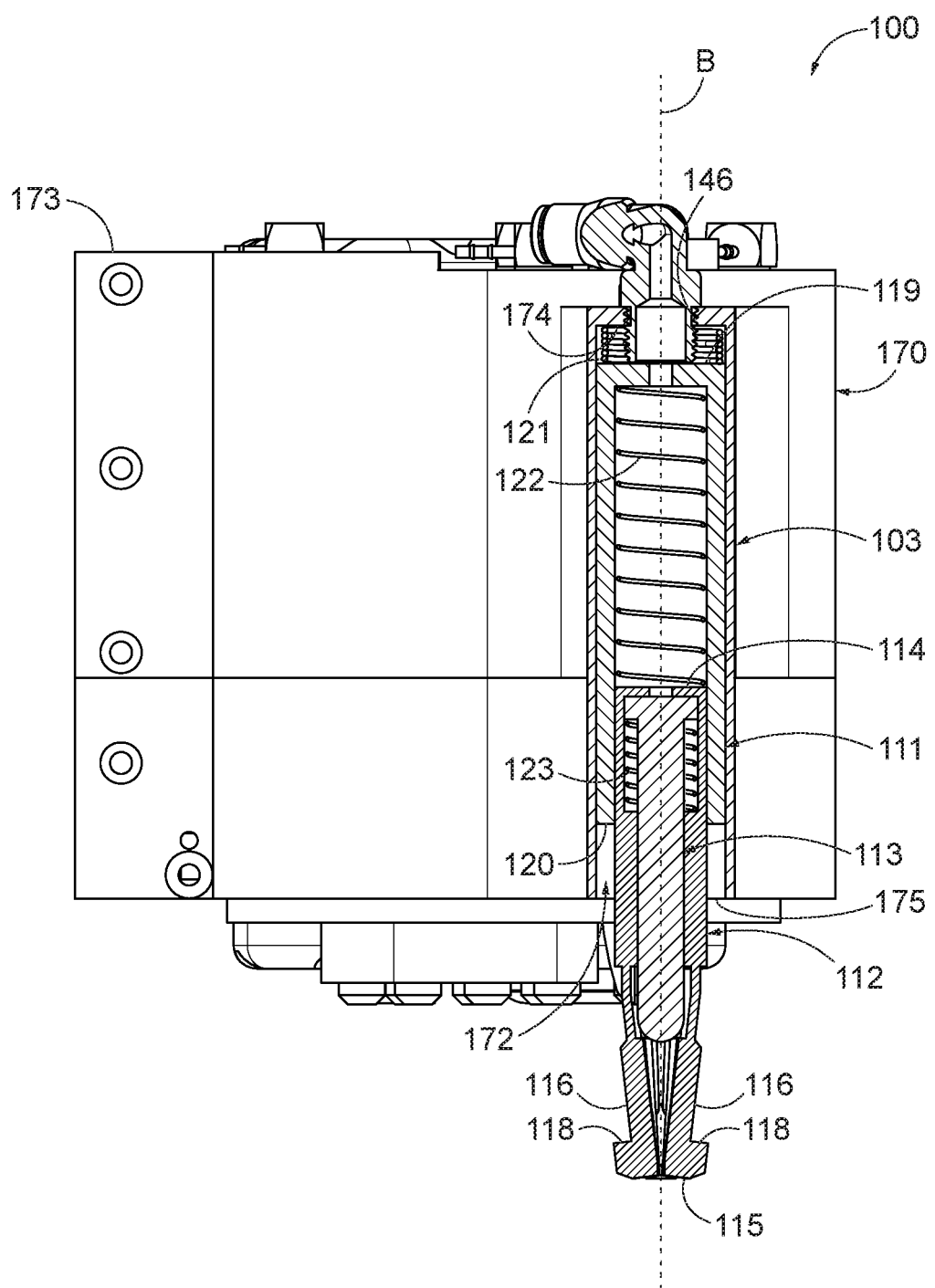
Figure 6:
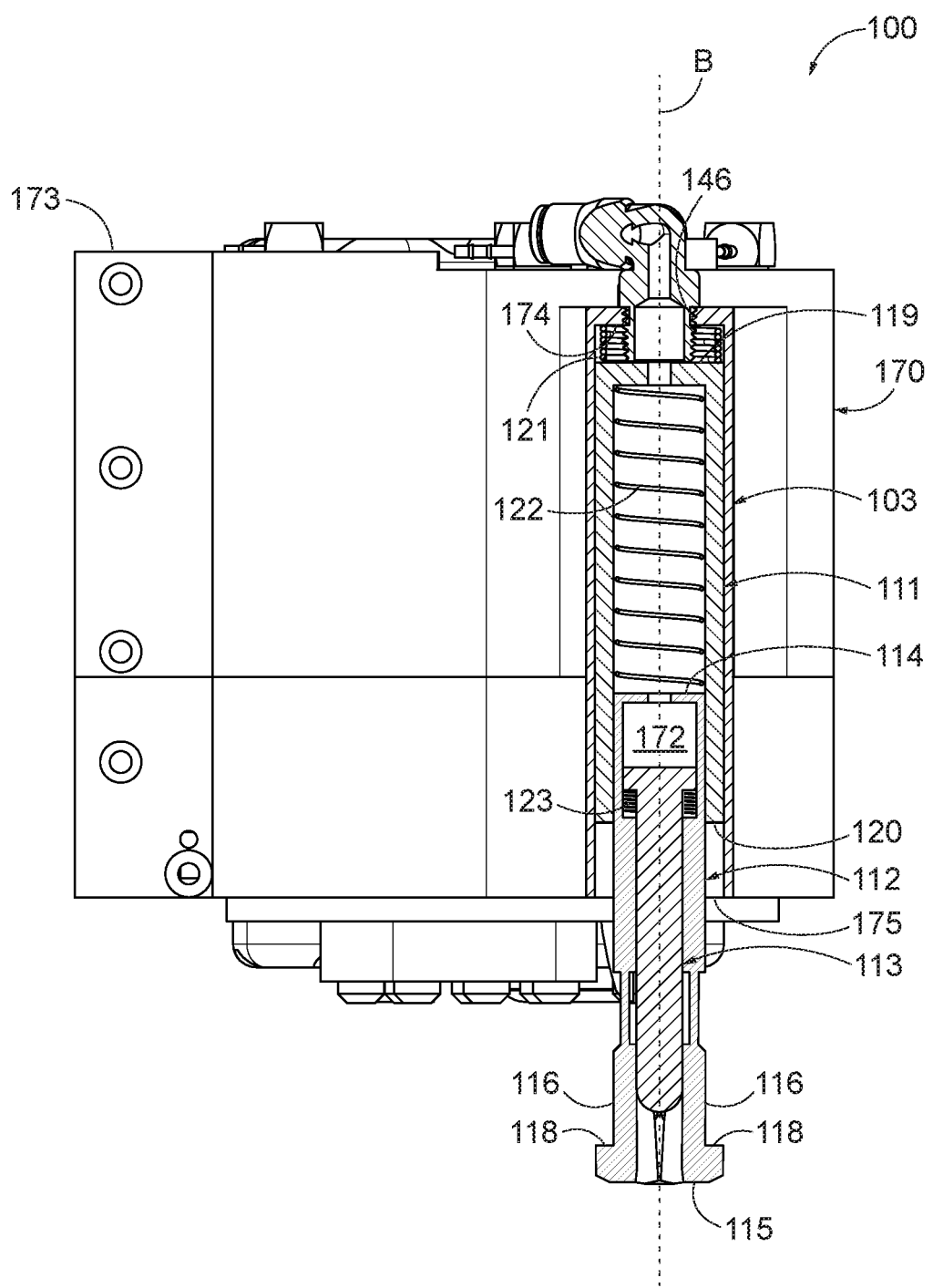
Figure 7:
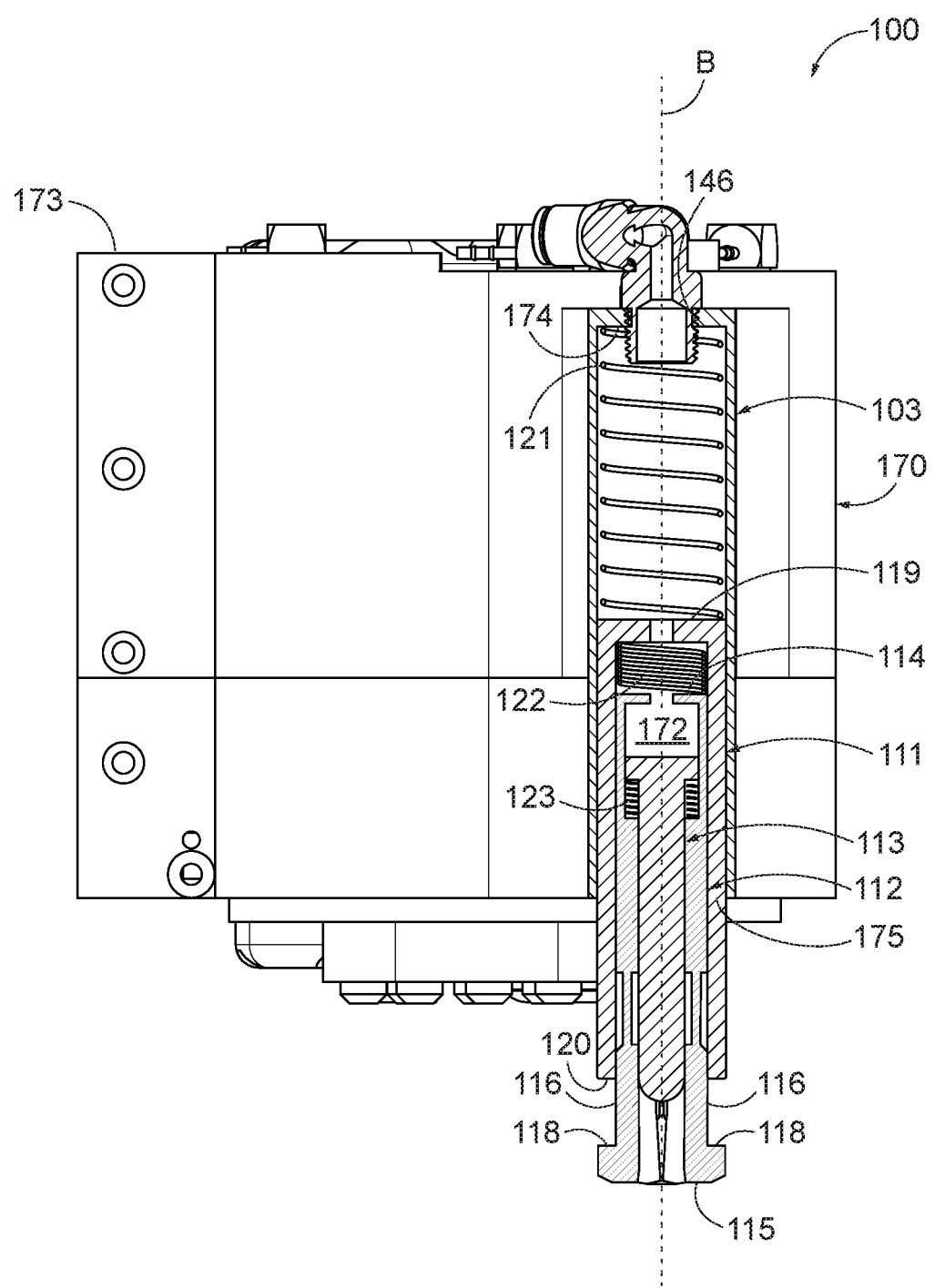
Figure 8:
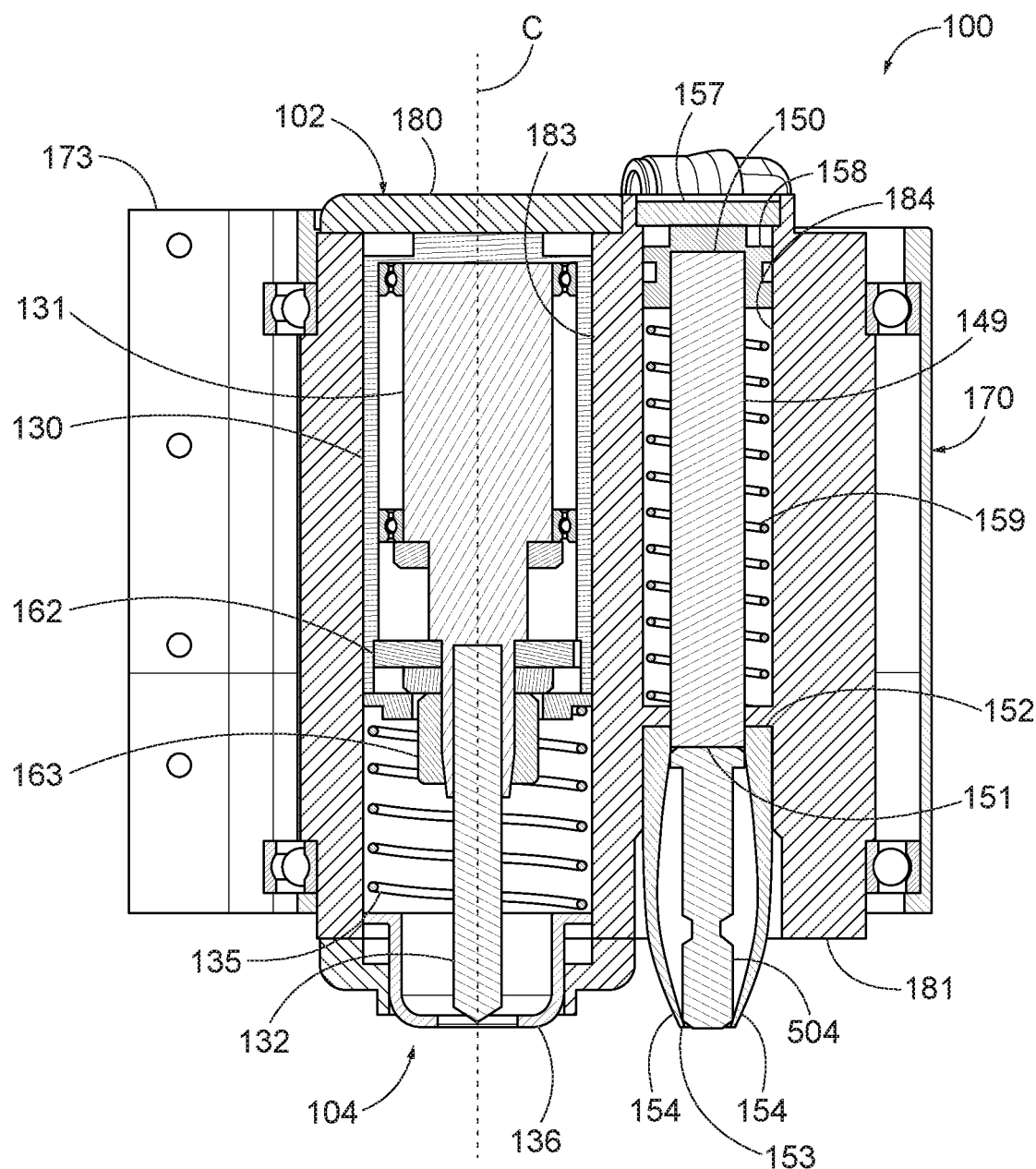
Figure 9:
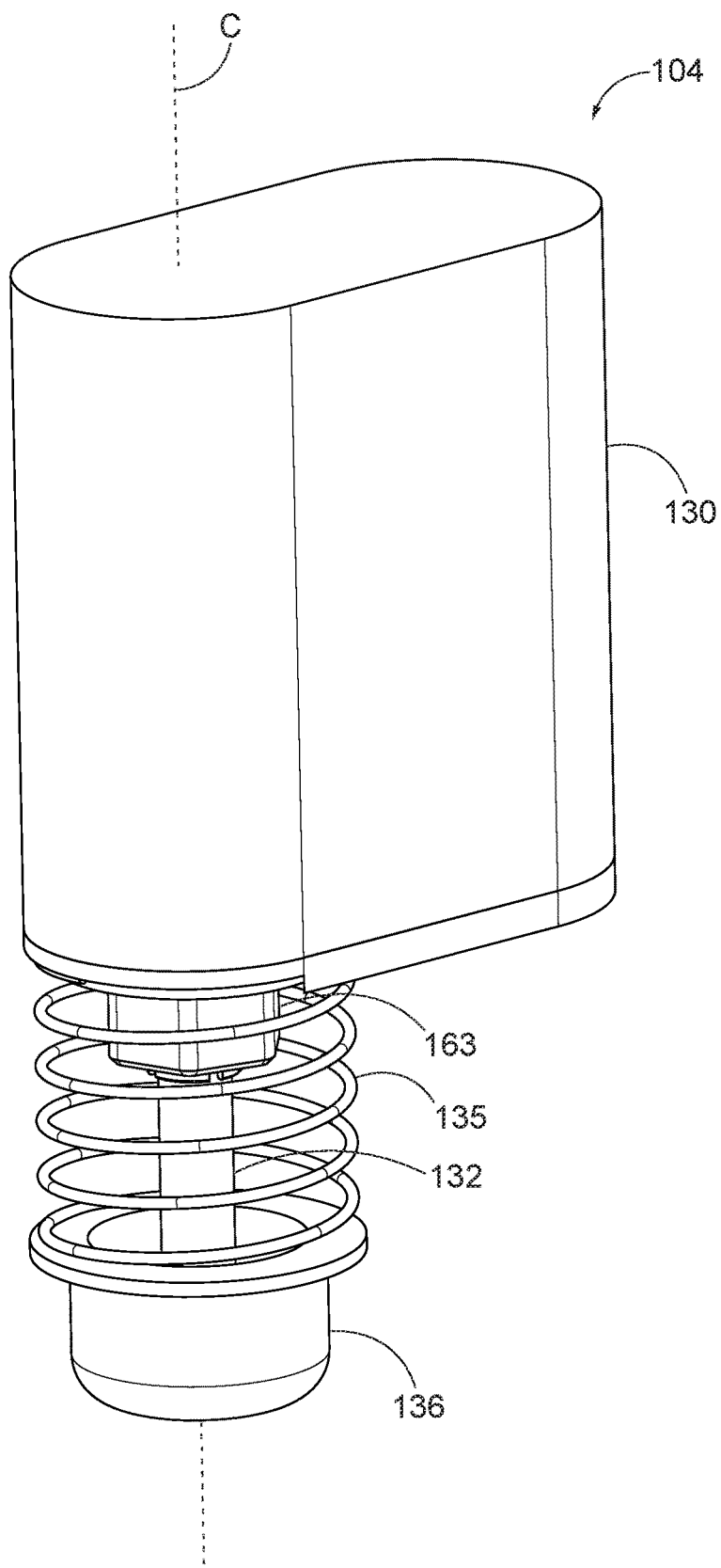
Figure 10:
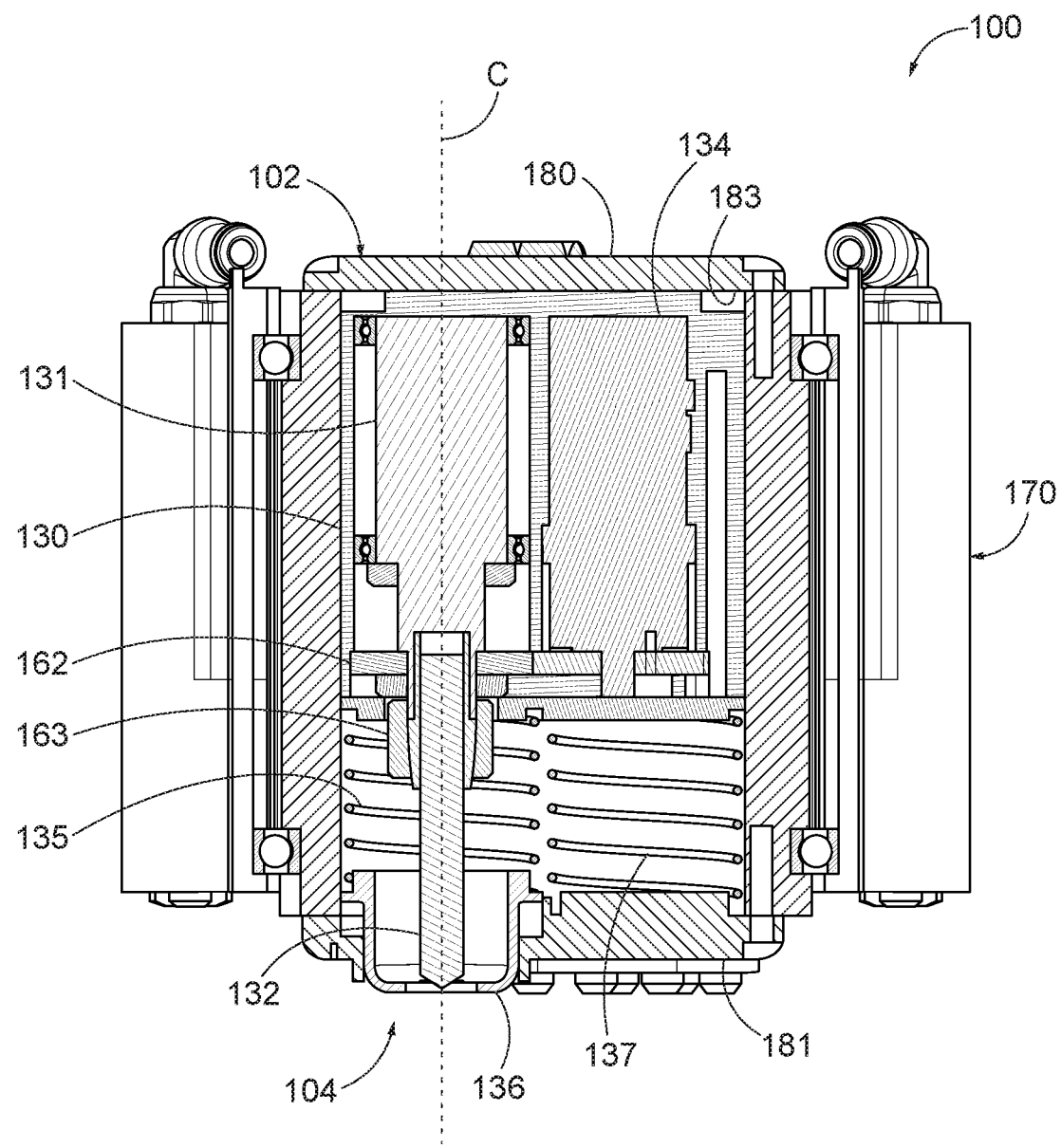
Figure 11:
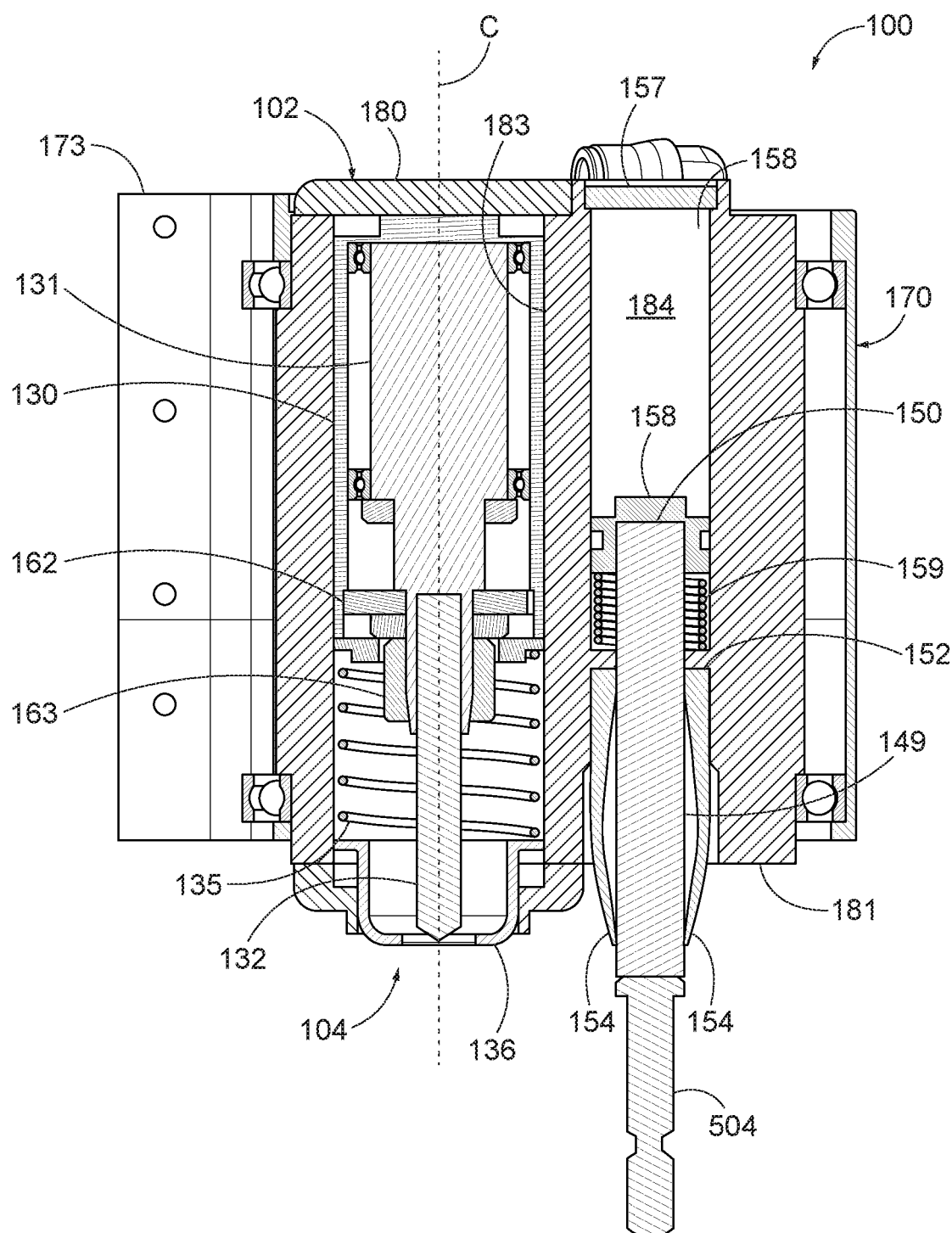
Figure 12:
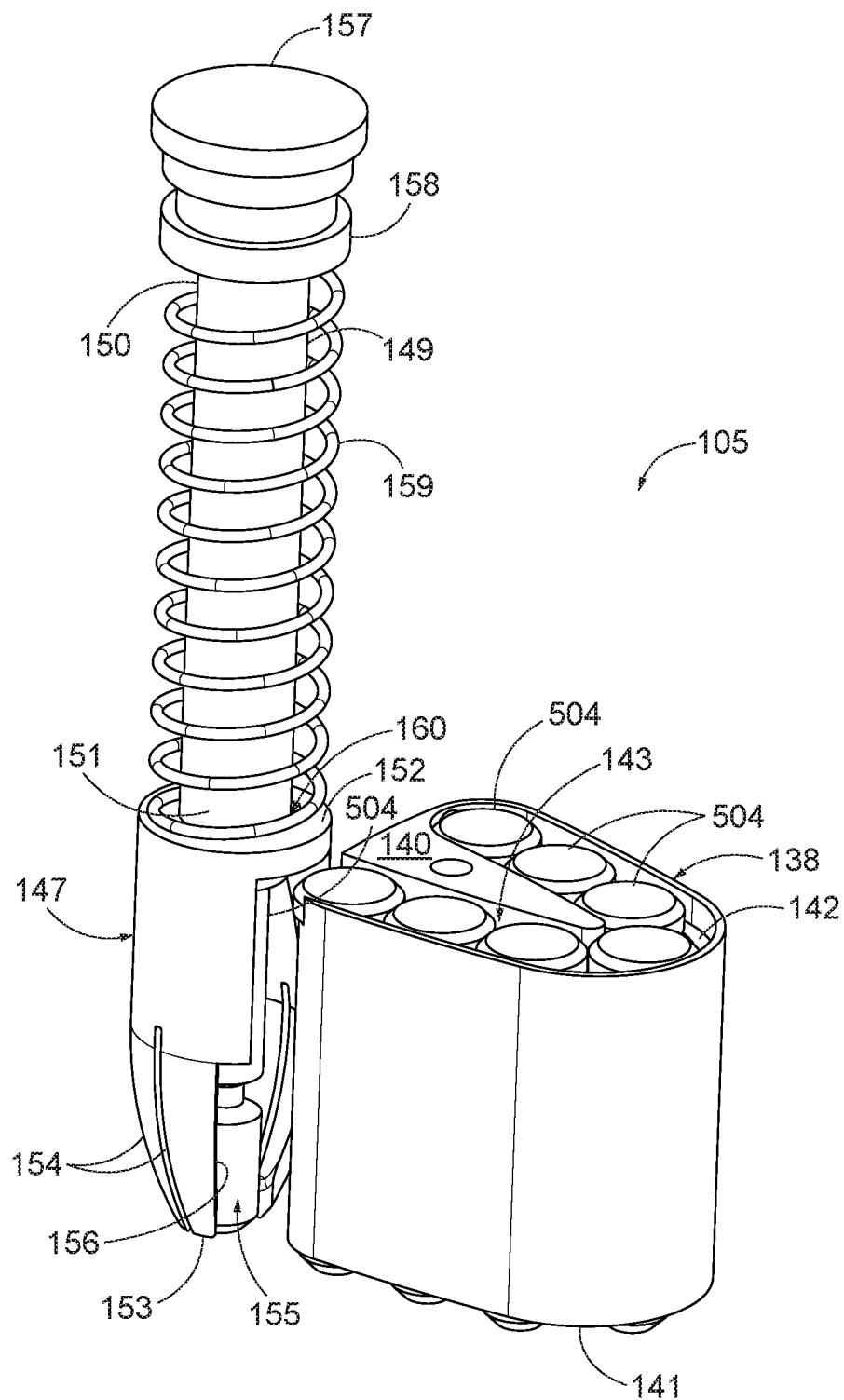
Figure 13:
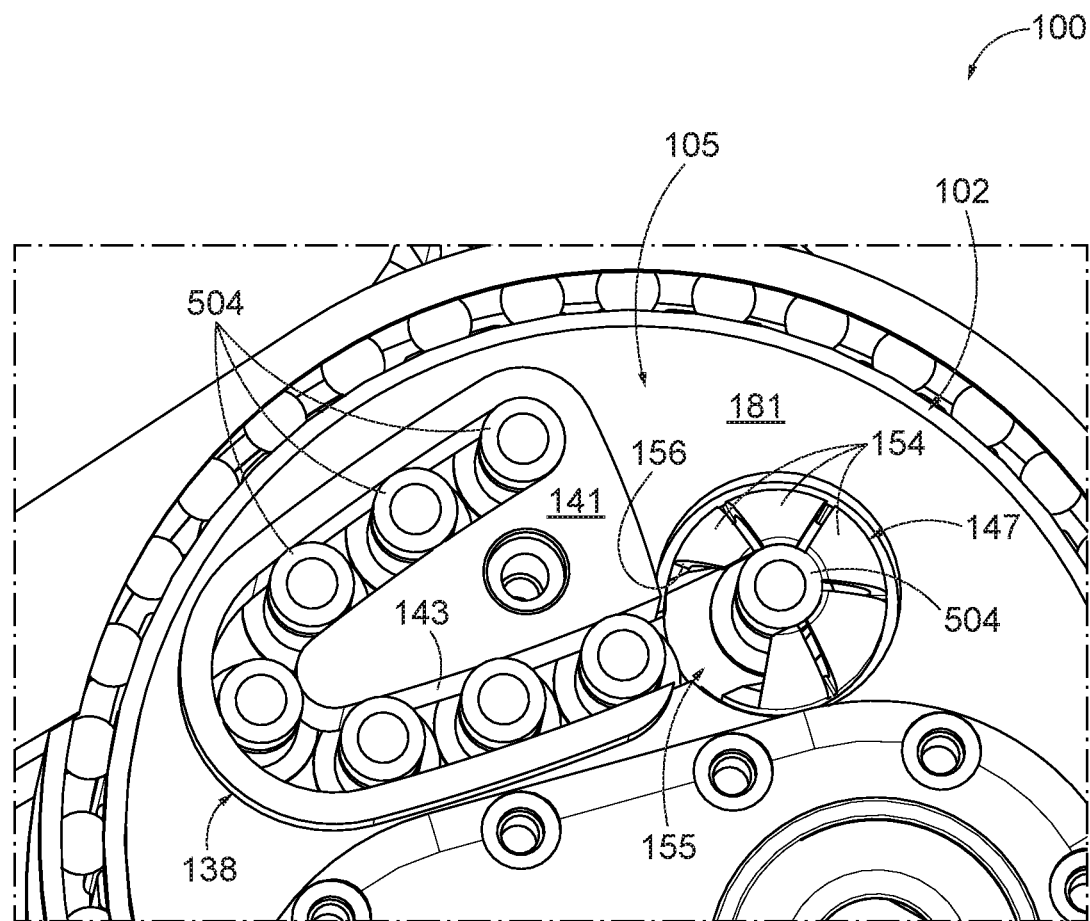
Figure 14:
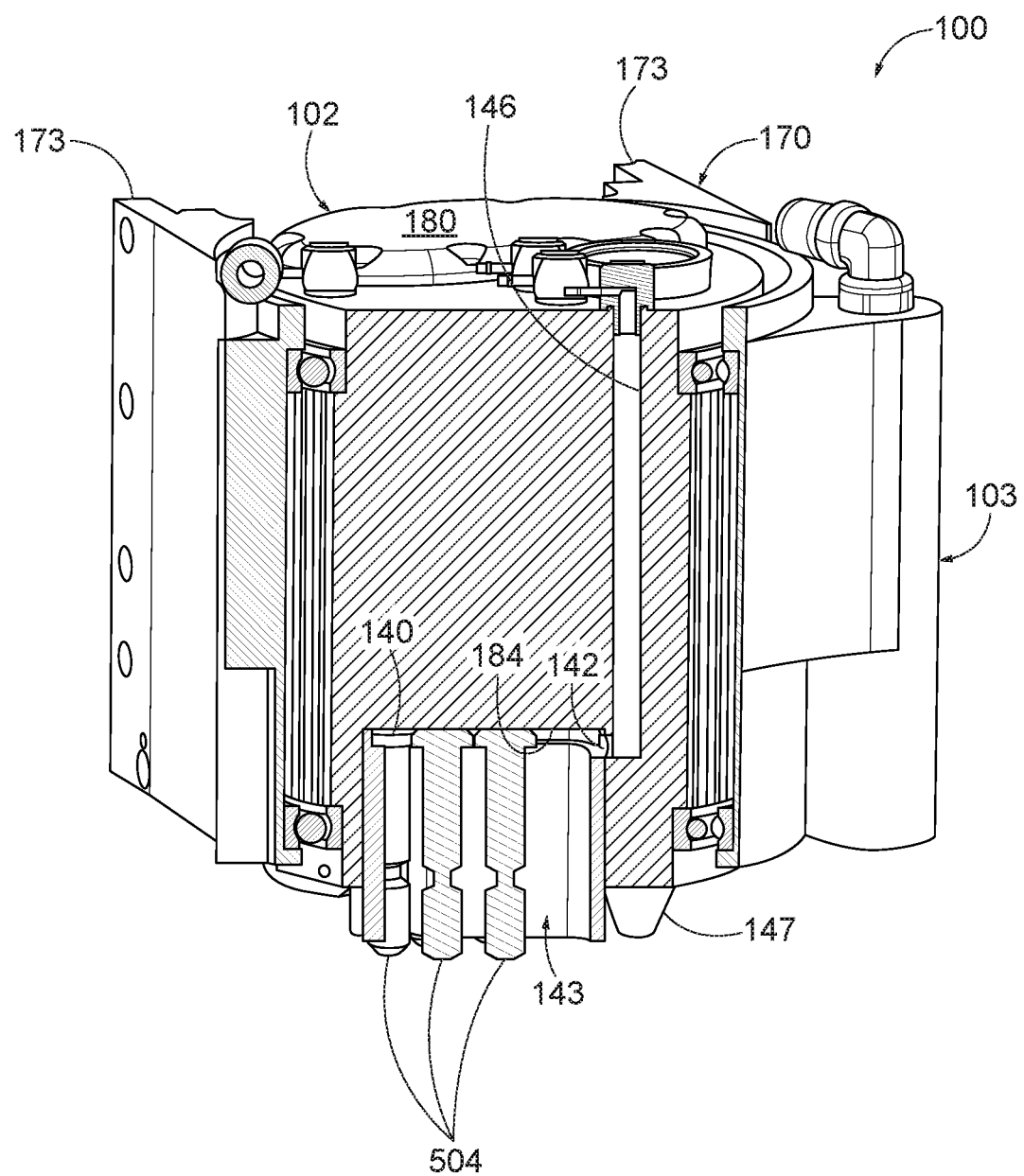
Figure 15:
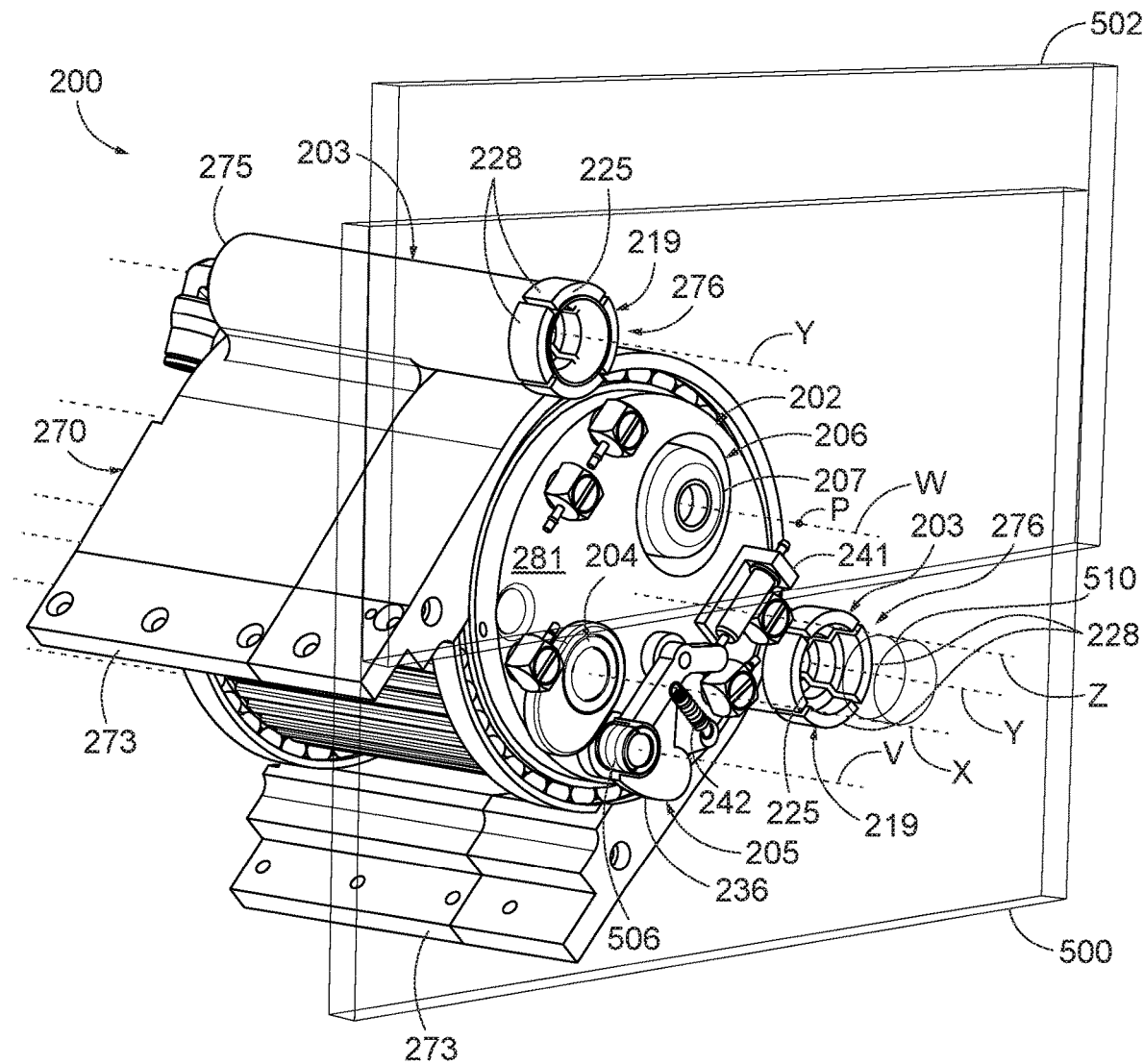
Figure 16:
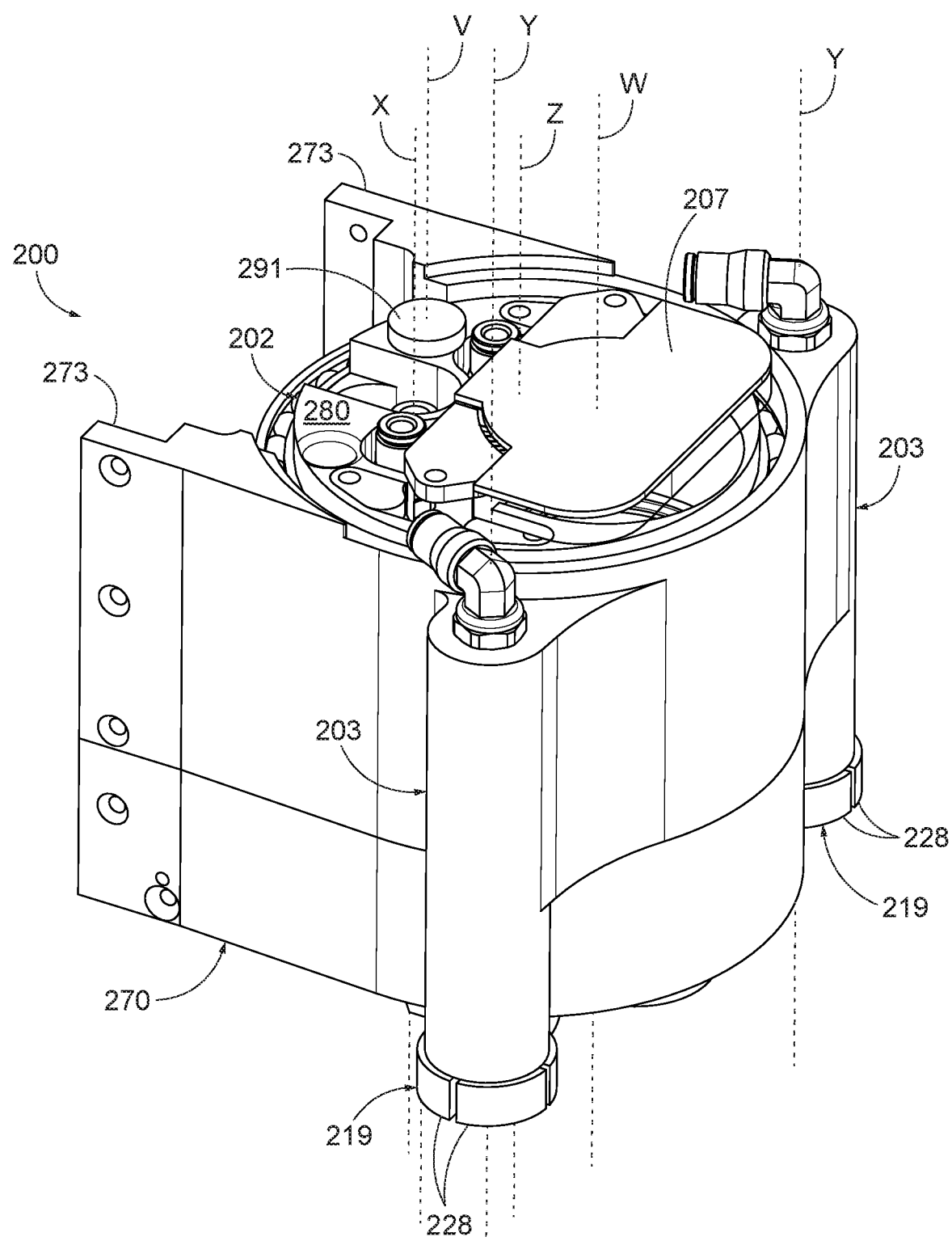
Figure 17:
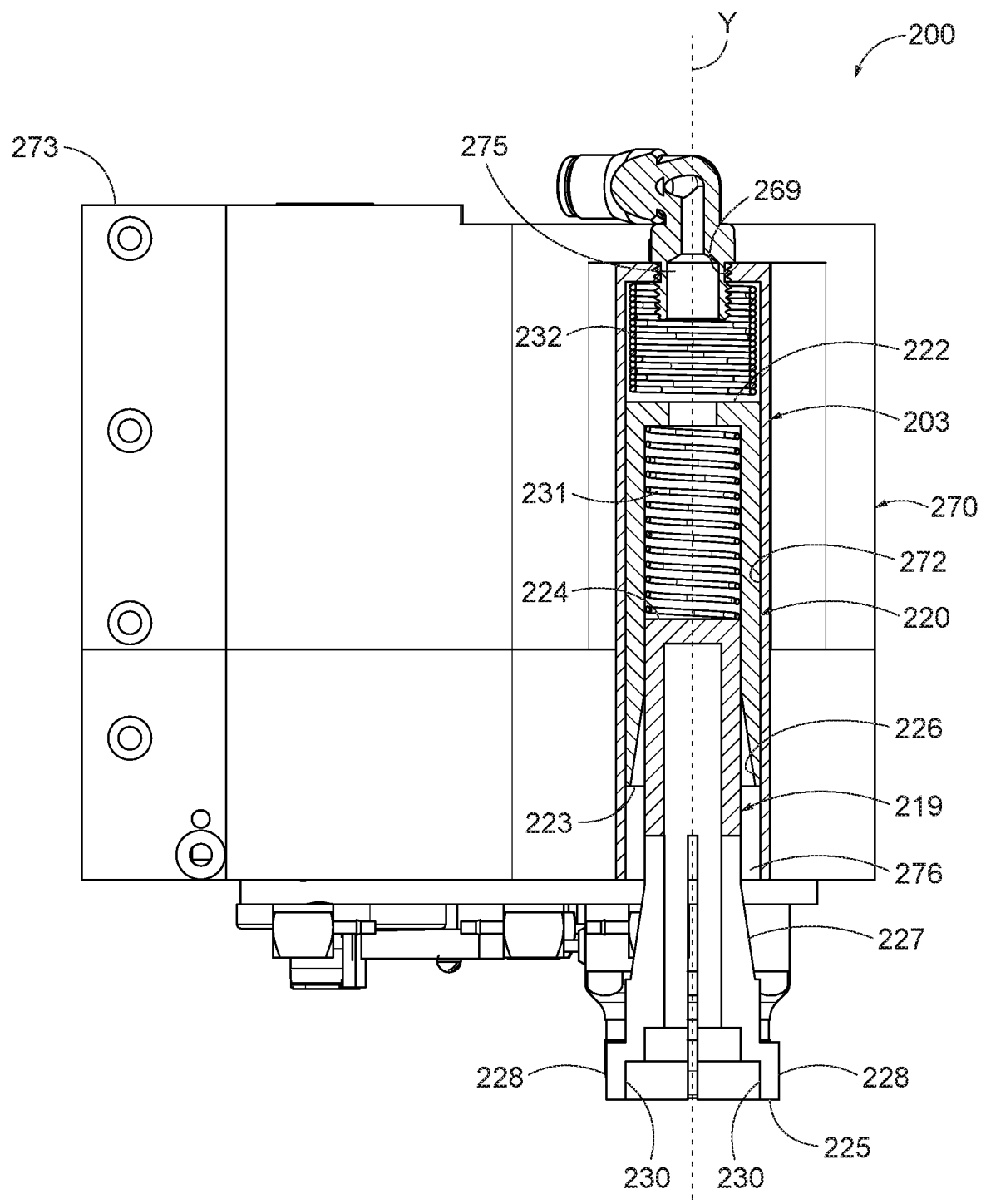
Figure 18:
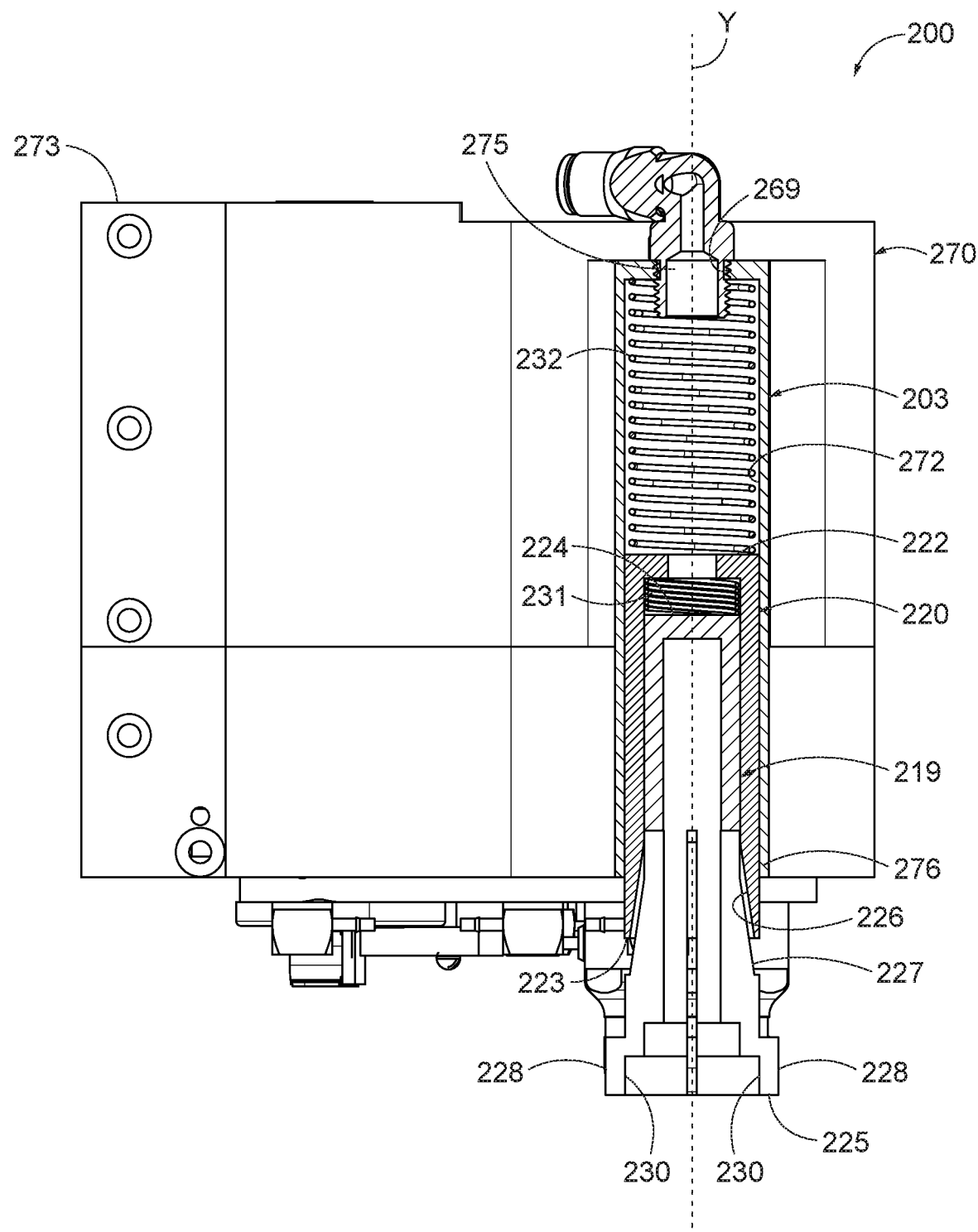
Figure 19:
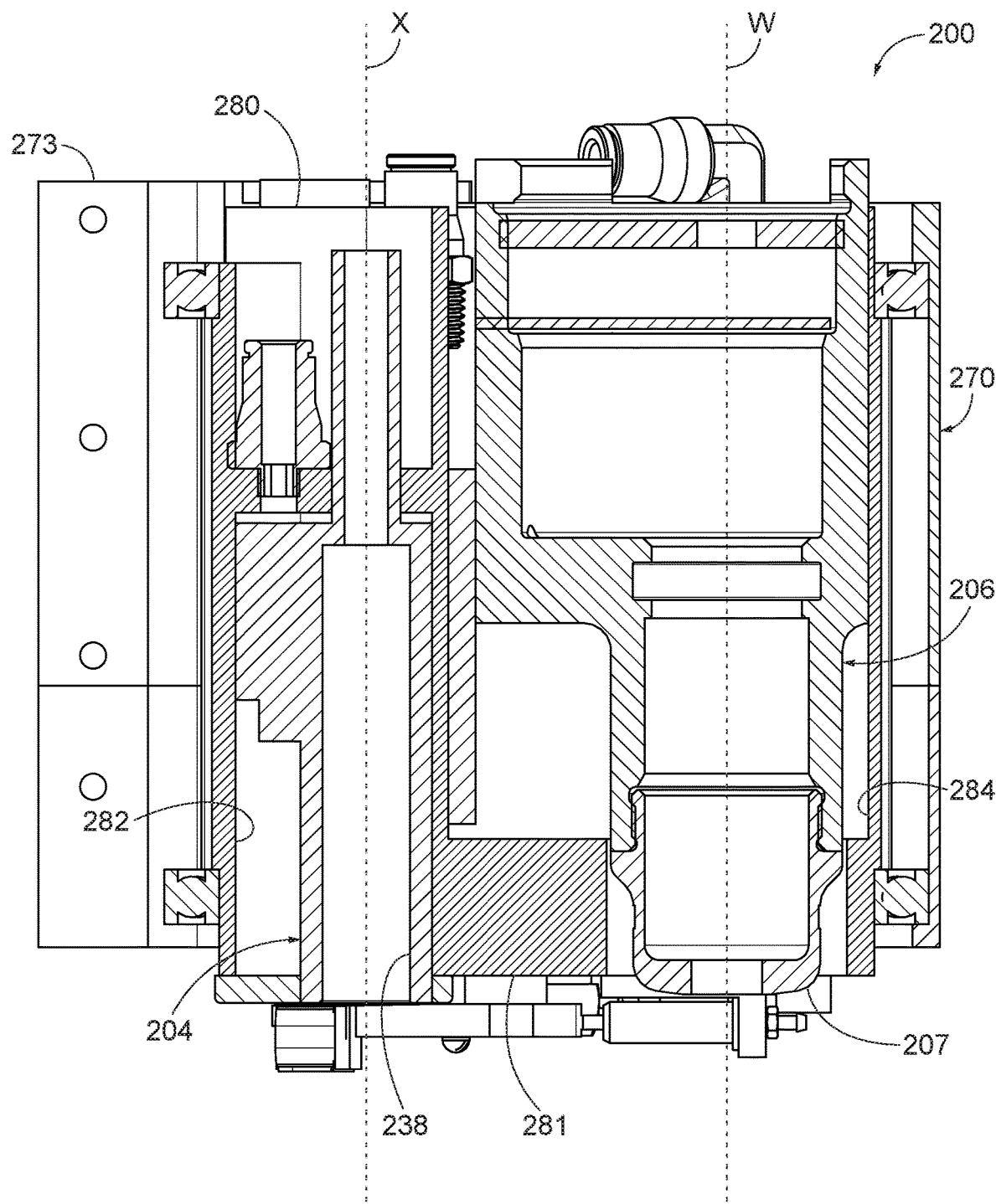
Figure 20:
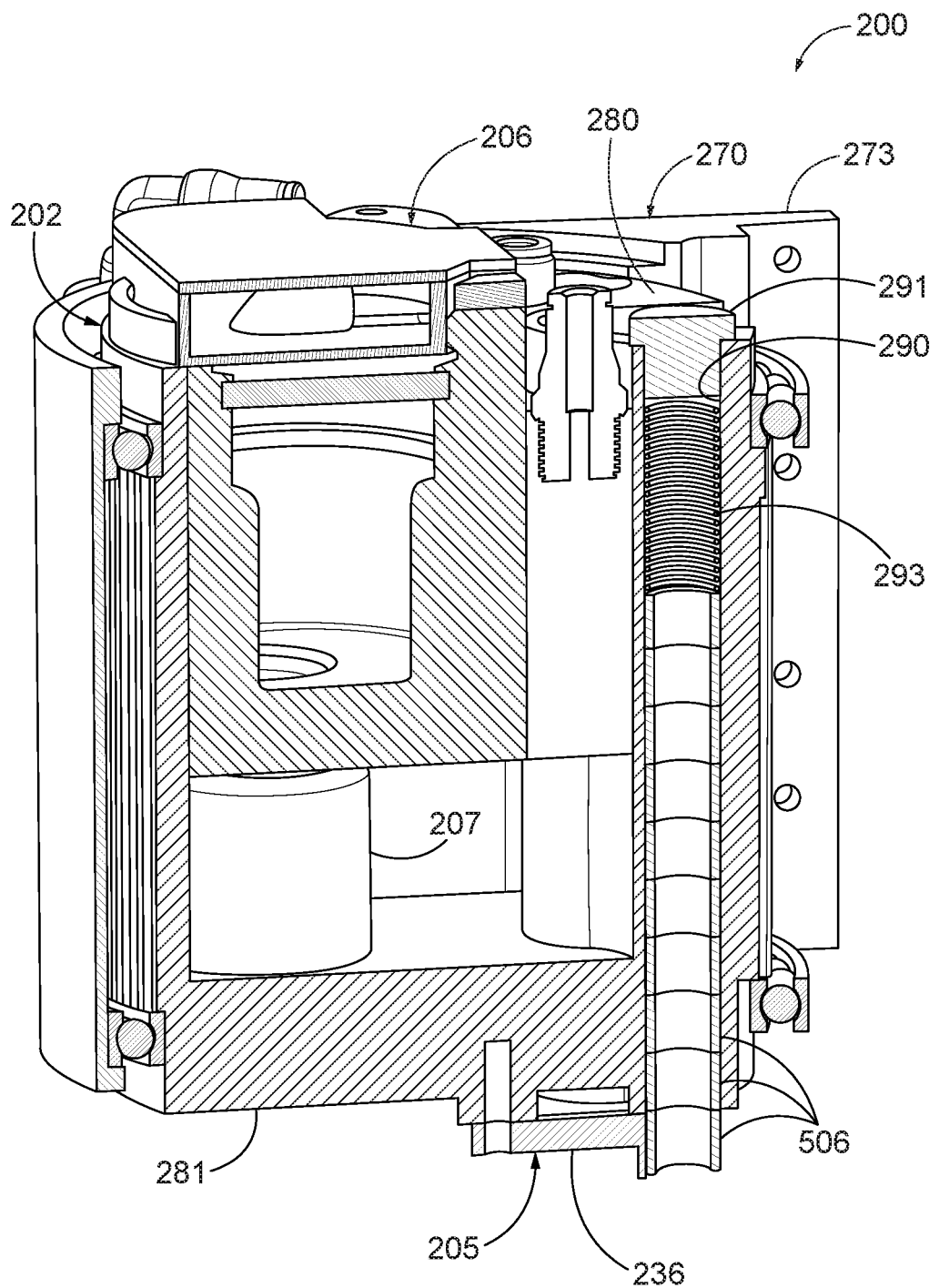
Figure 21:
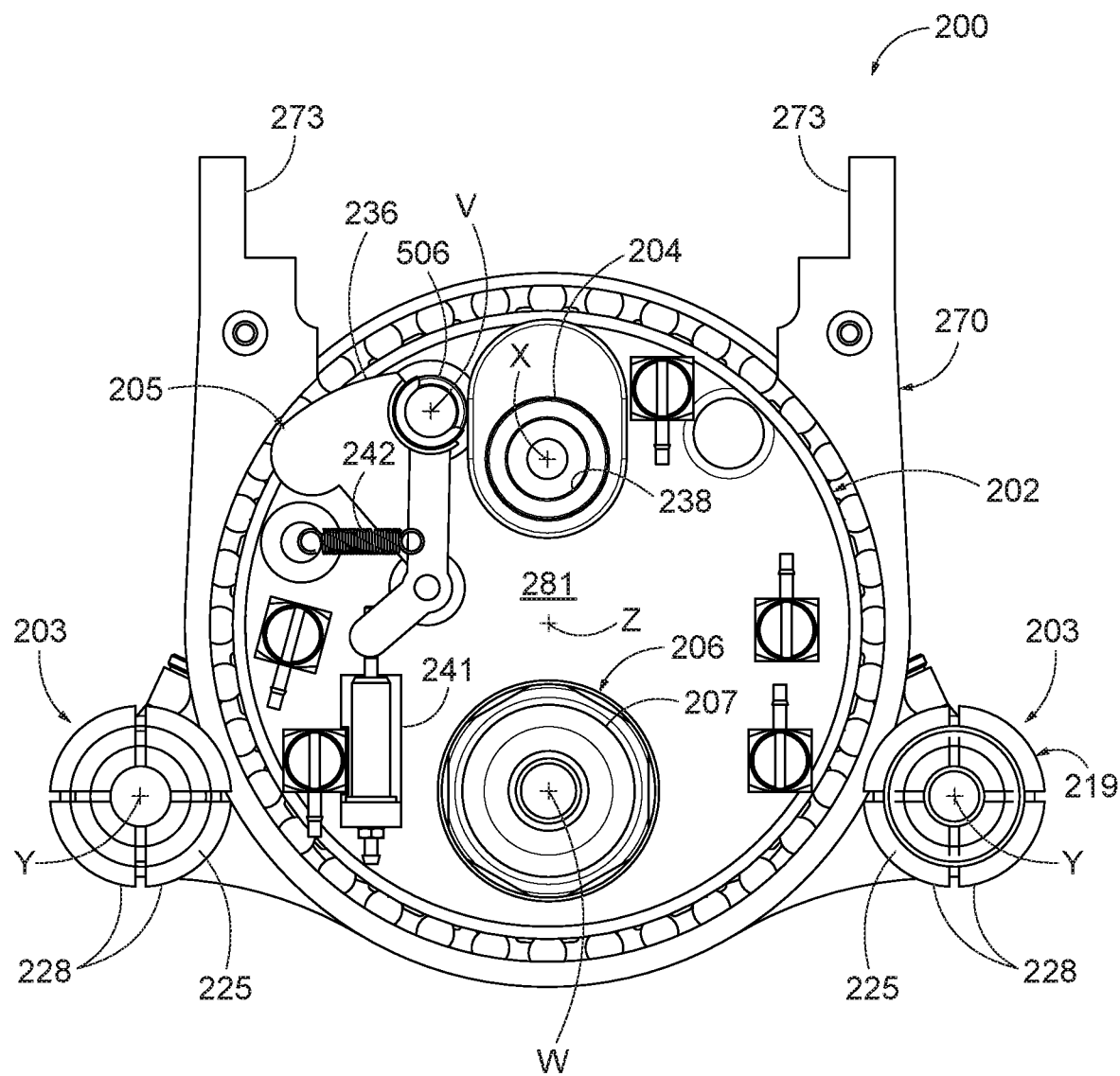
Figure 22:
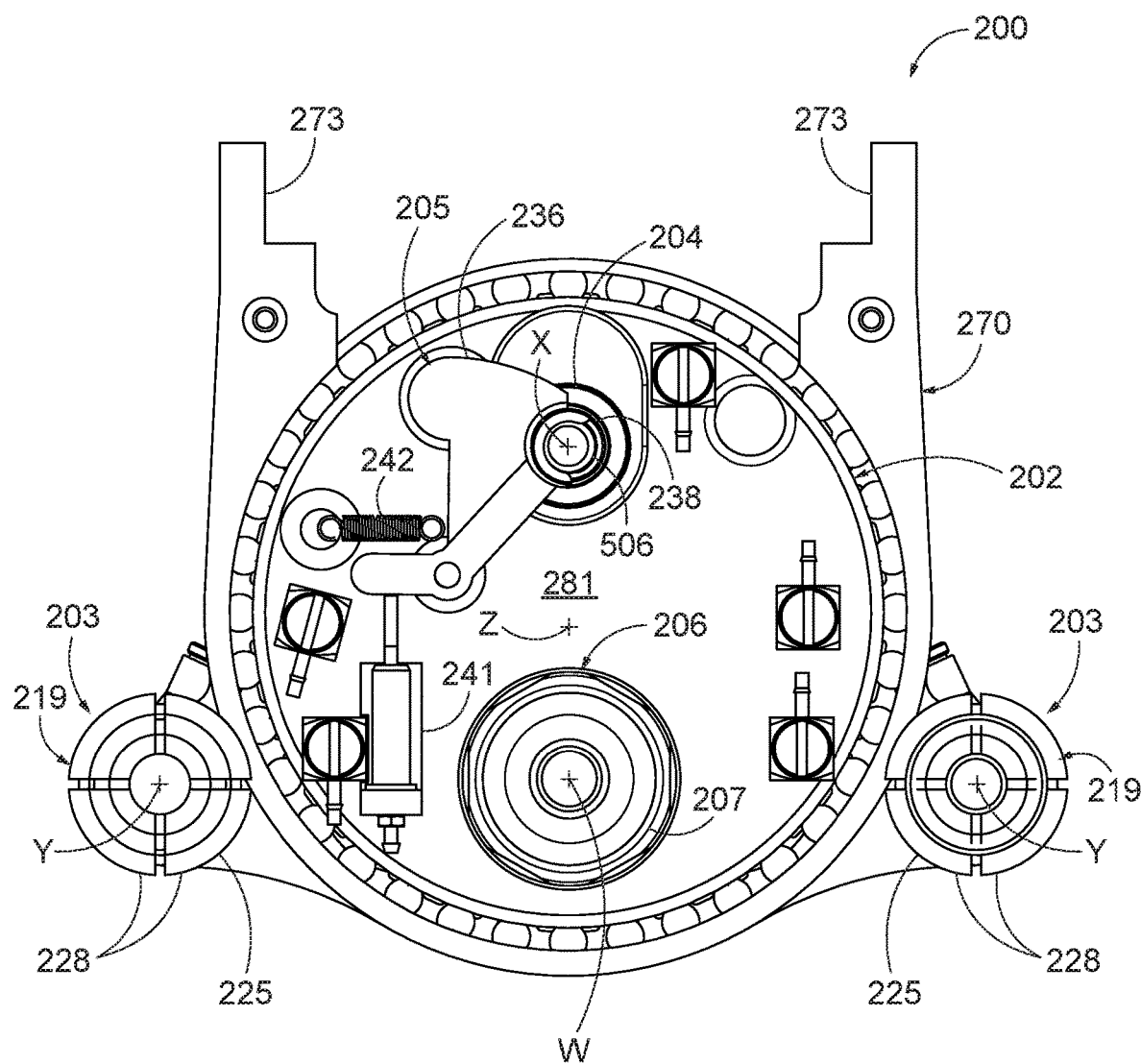
Figure 23:
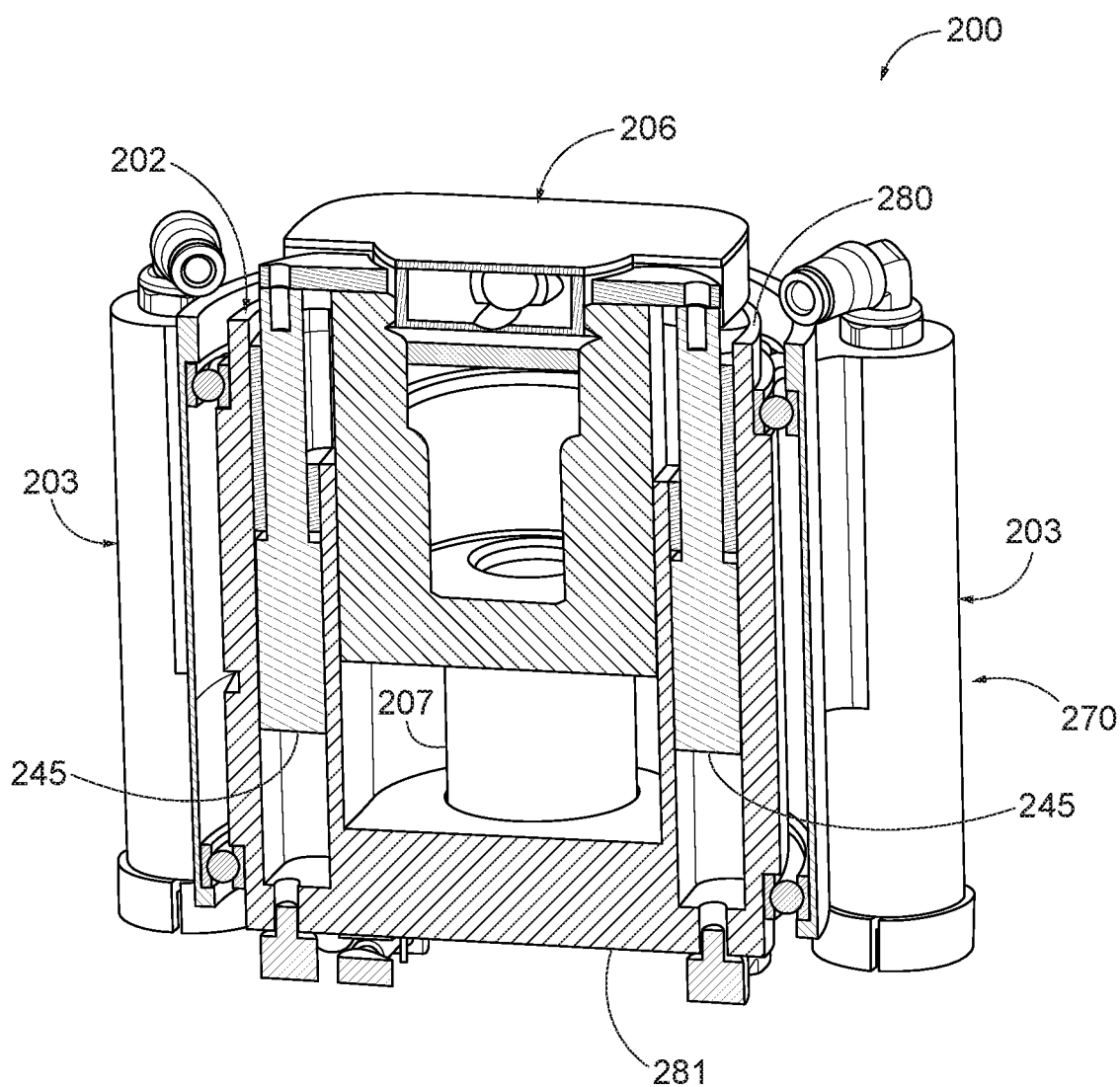
Figure 24:
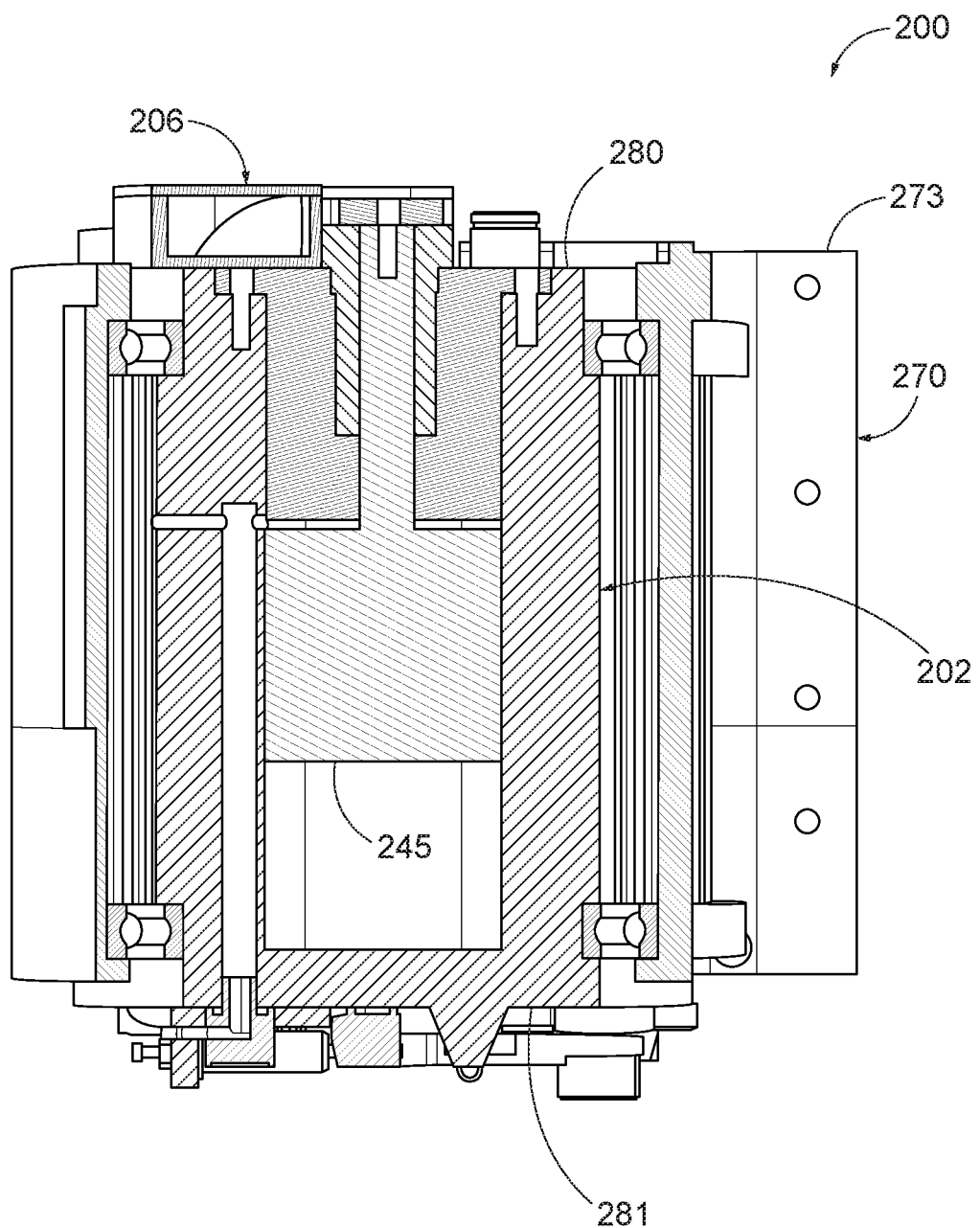
Figure 25:
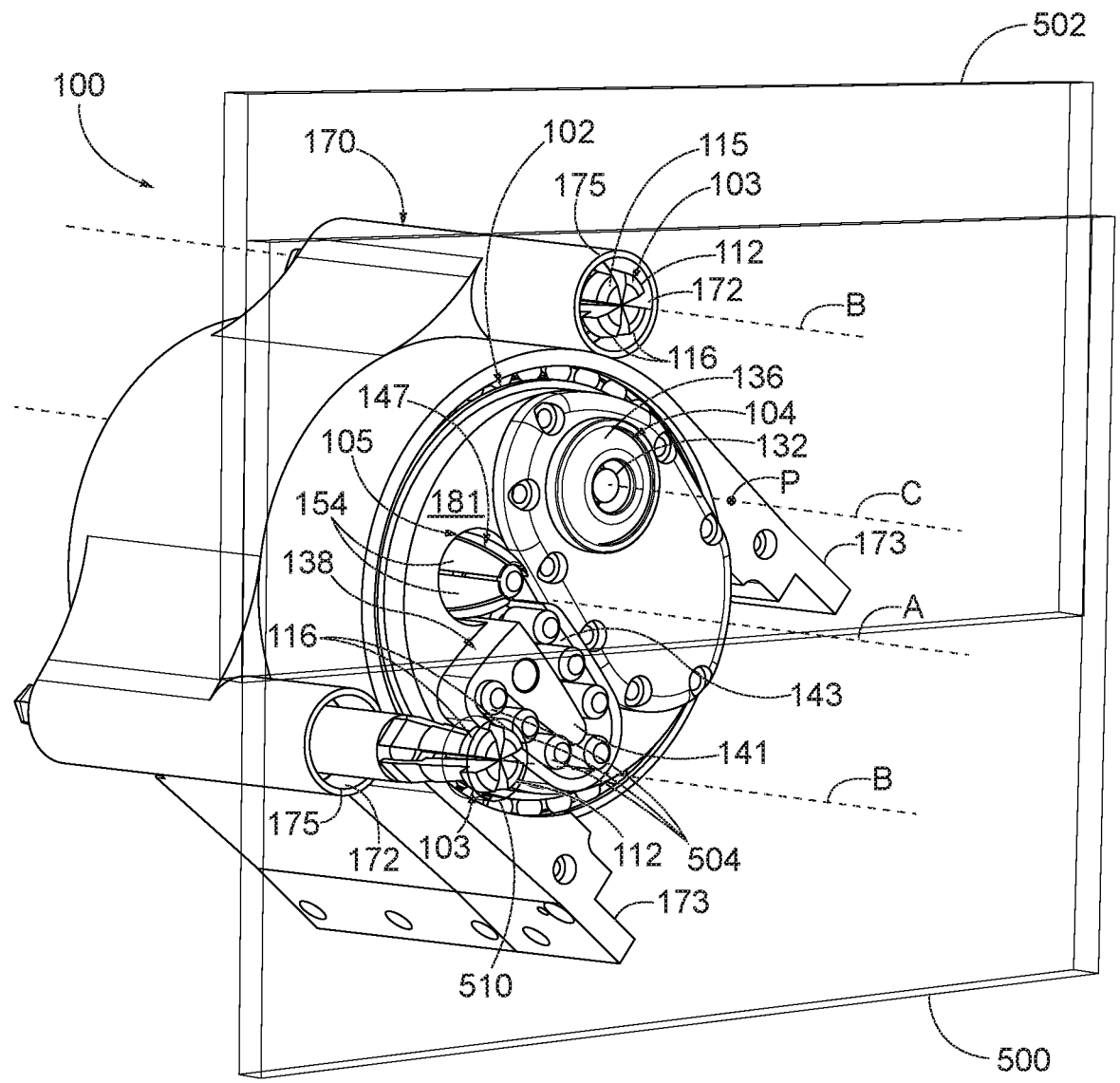
Figure 26:
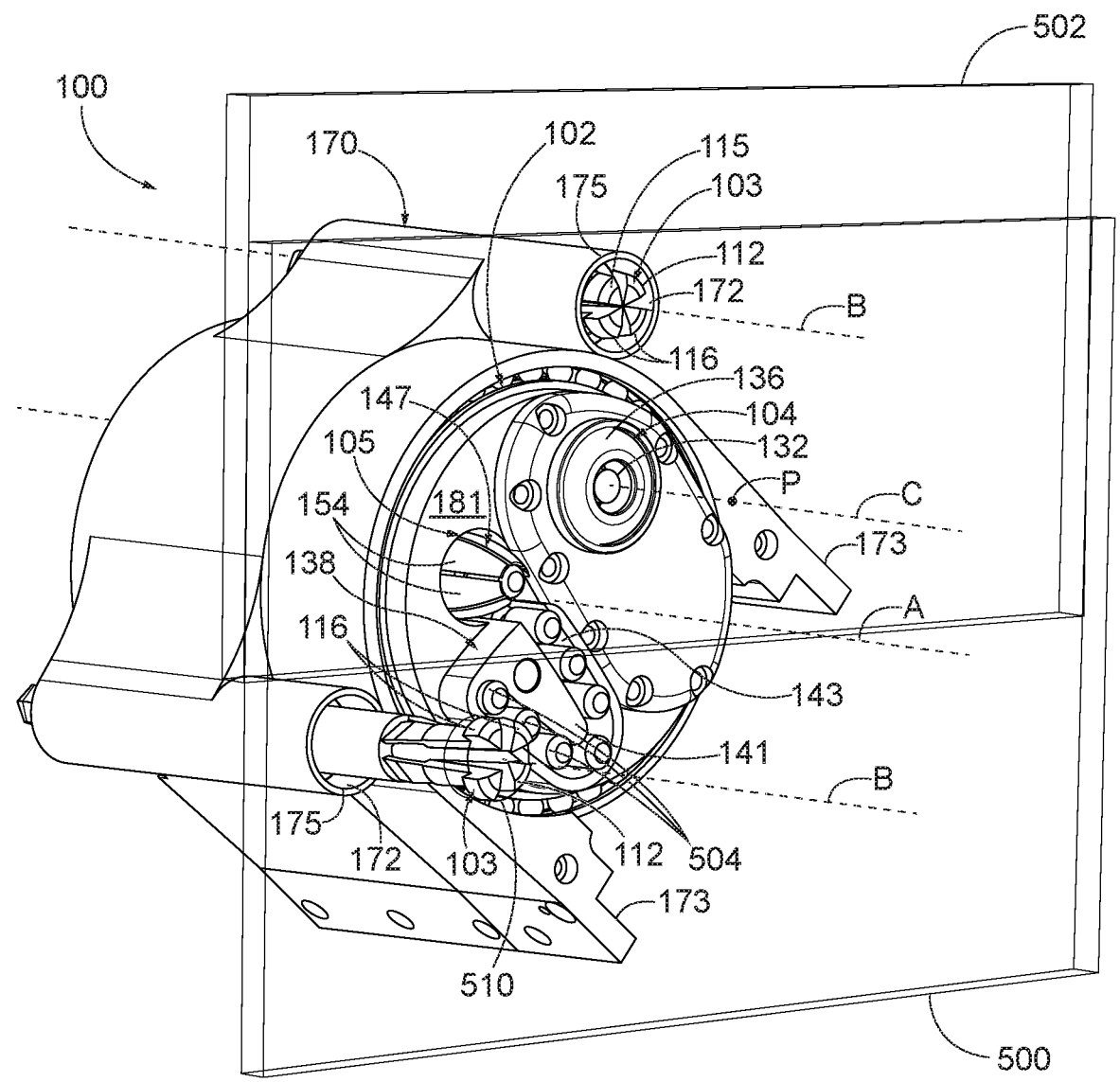
Figure 27:
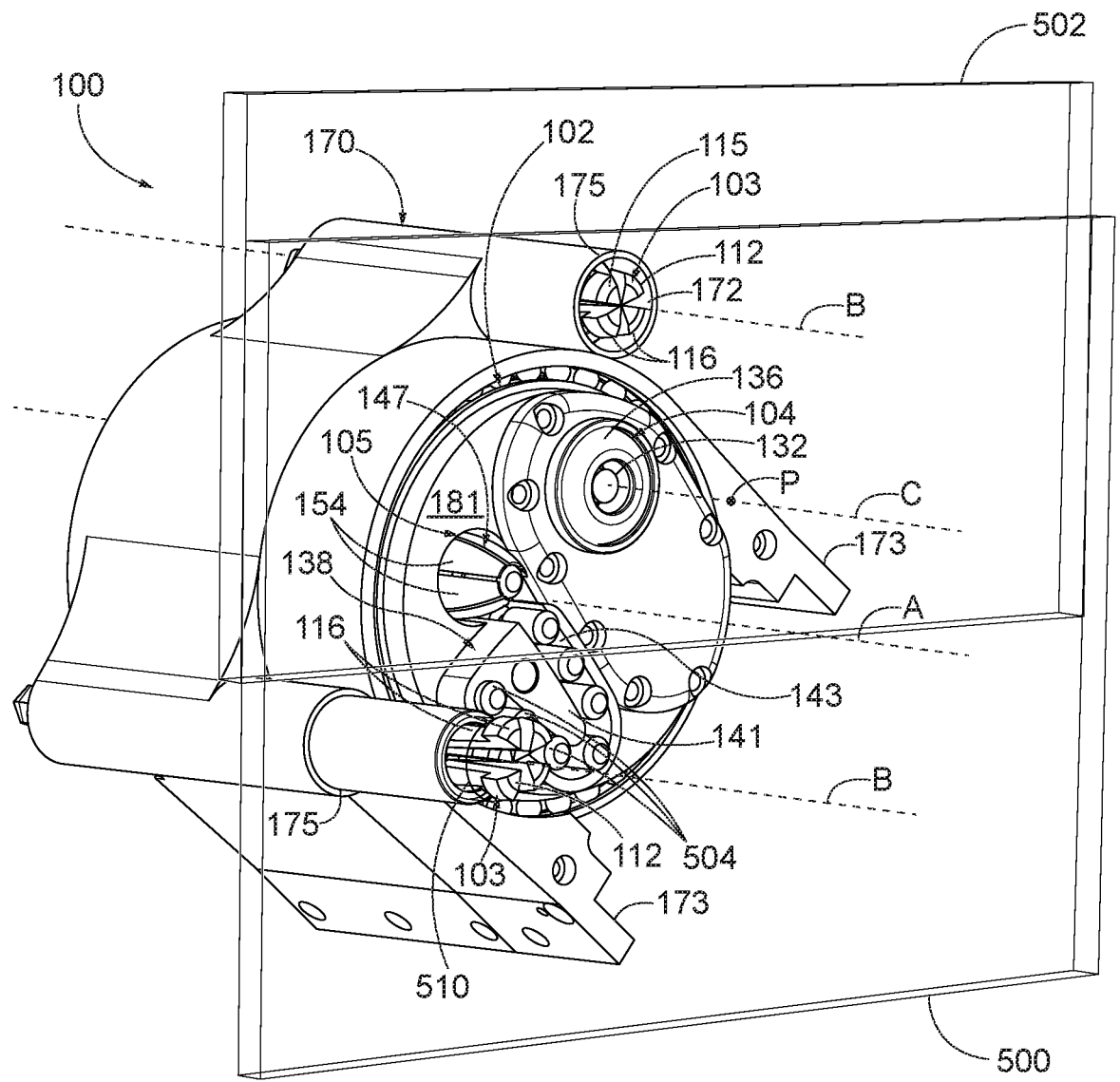
Figure 28:
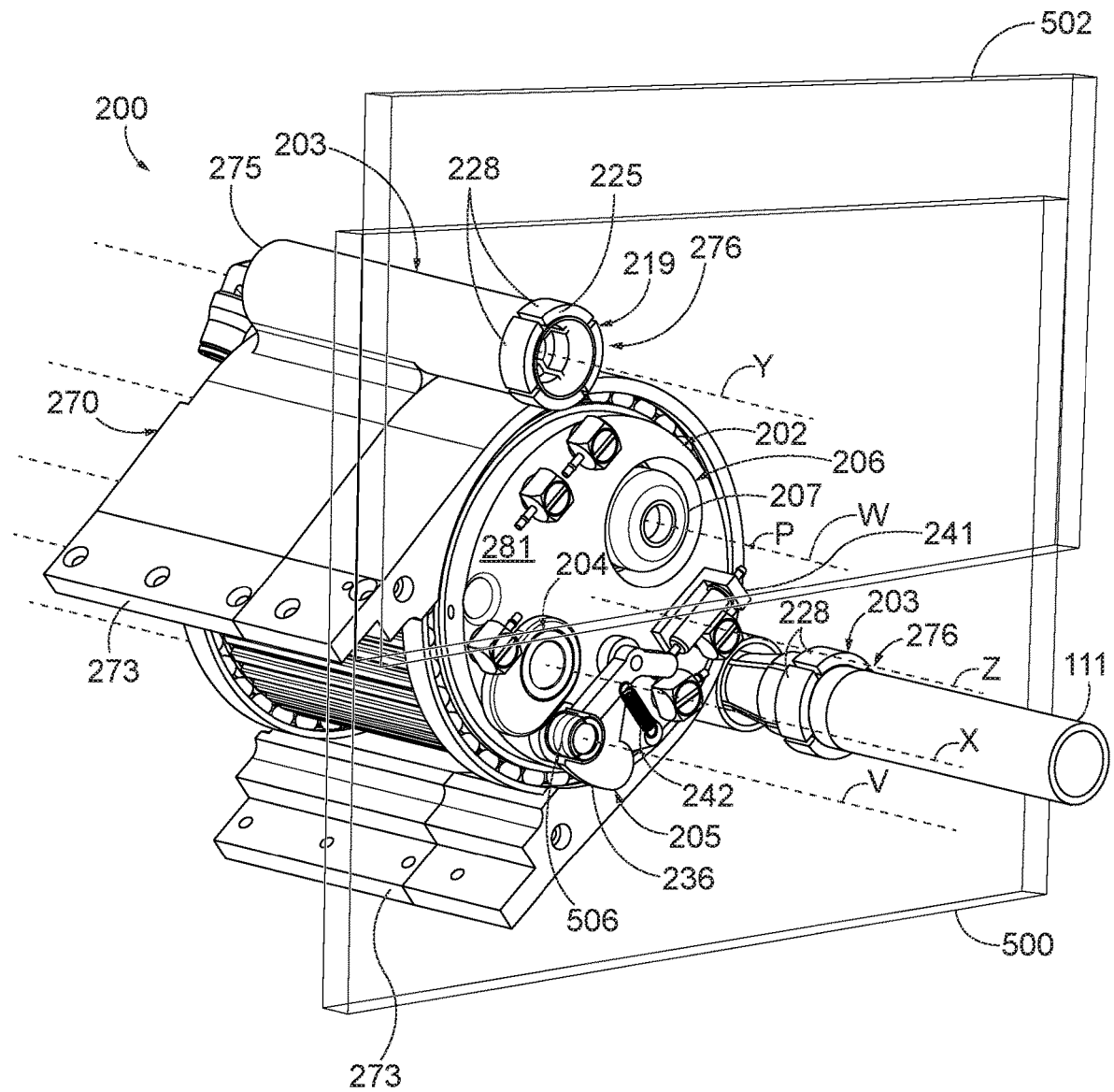
Figure 29:
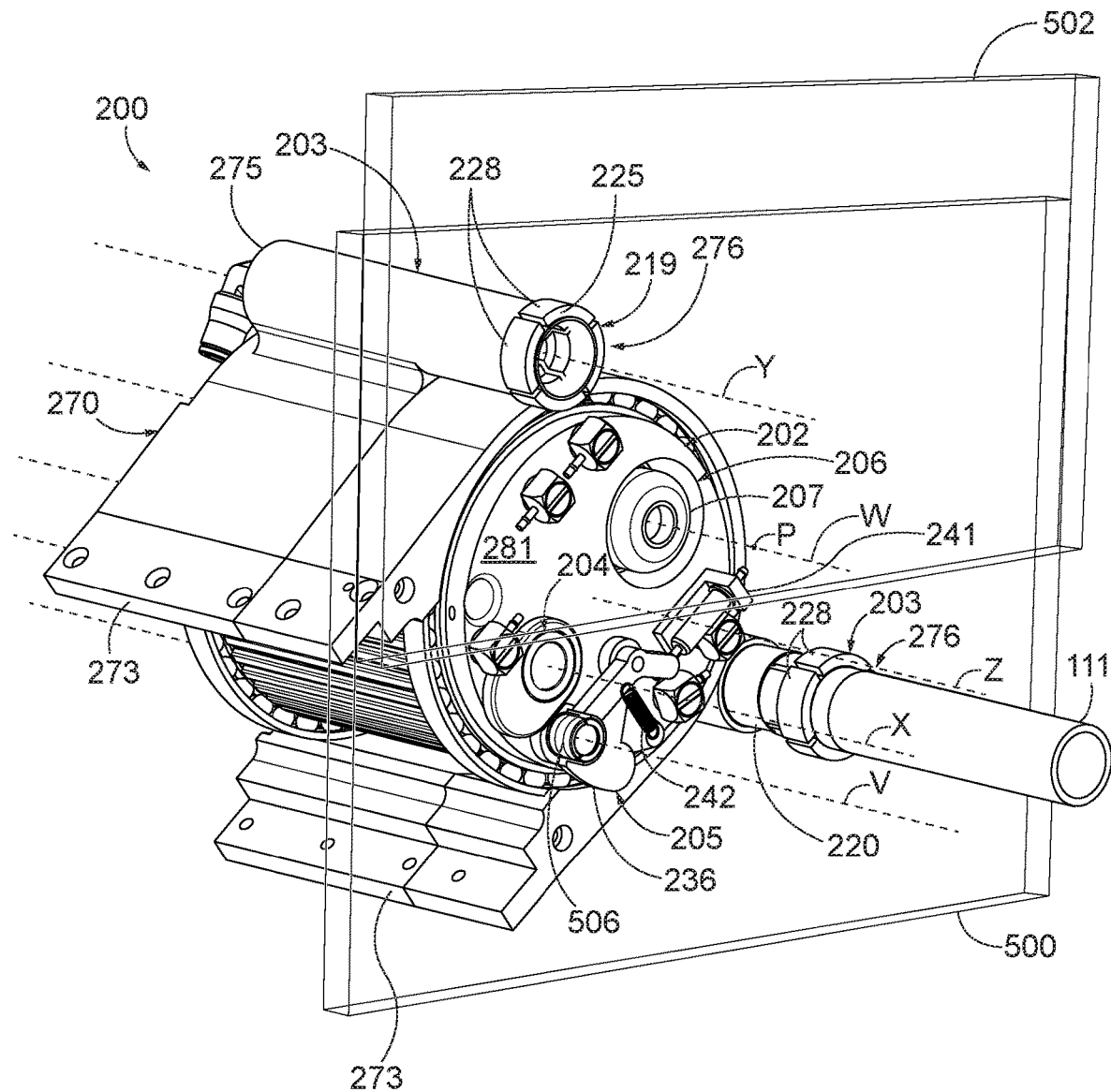
Figure 30:
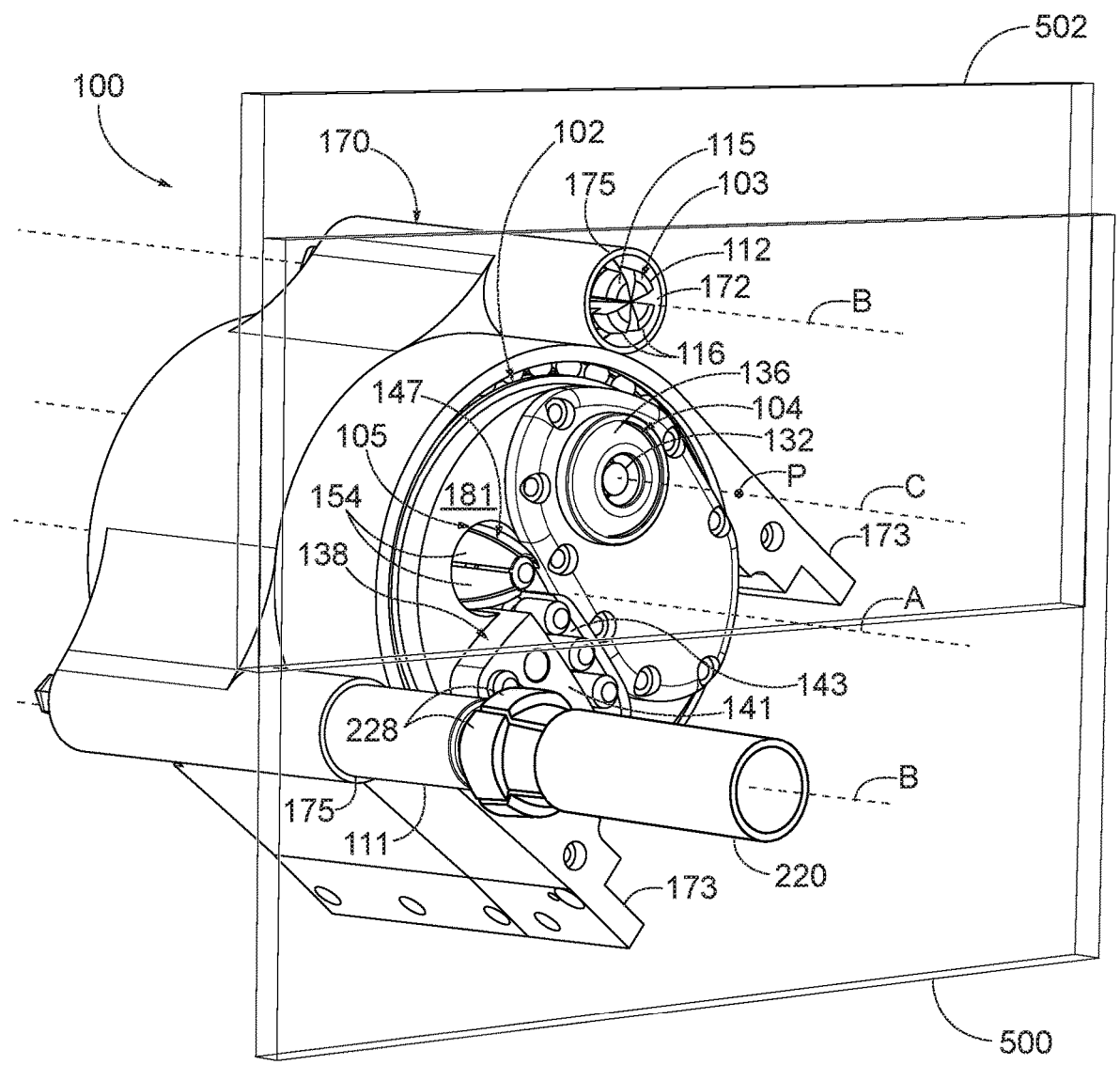
Figure 31:
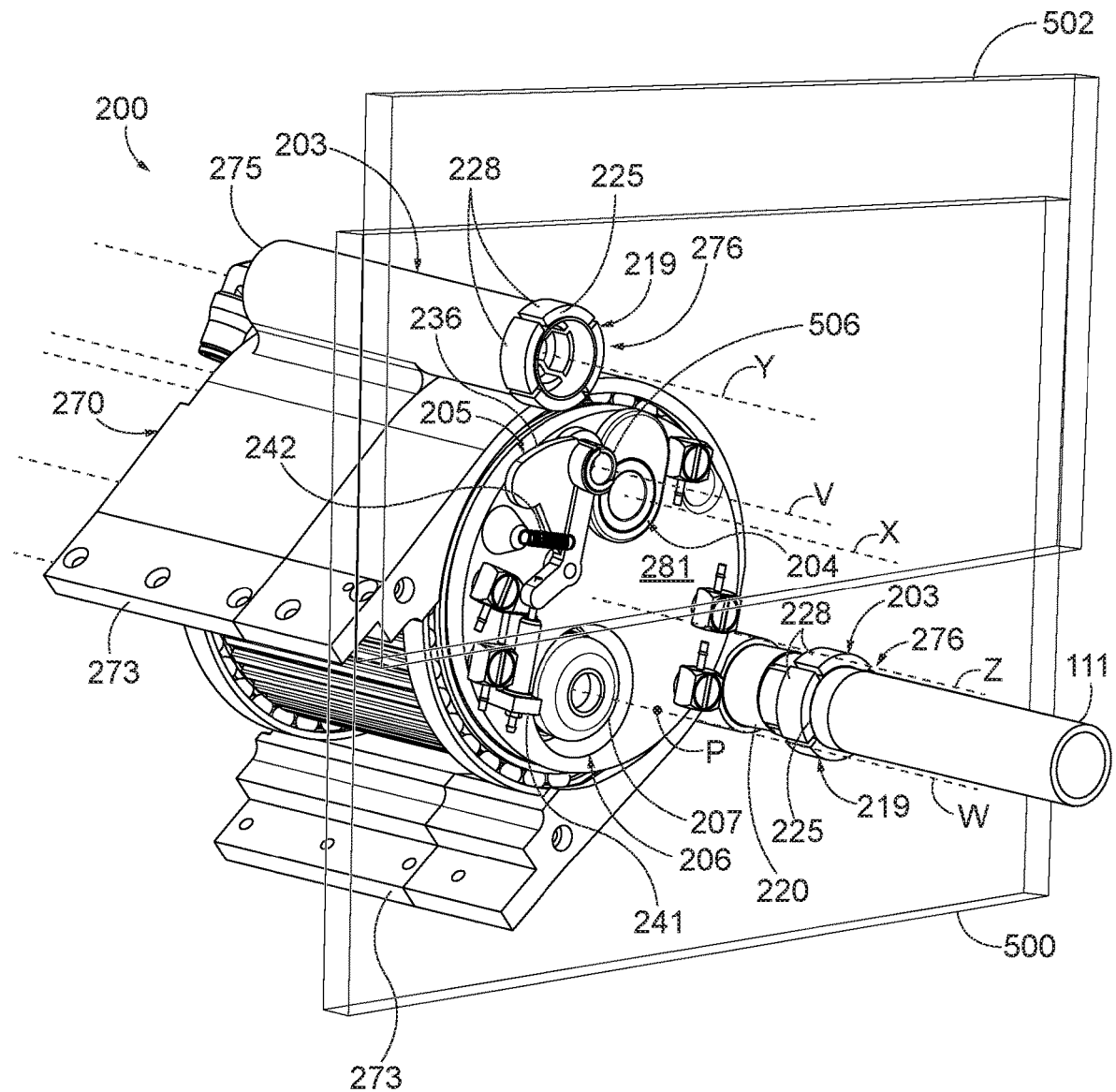
Figure 32:
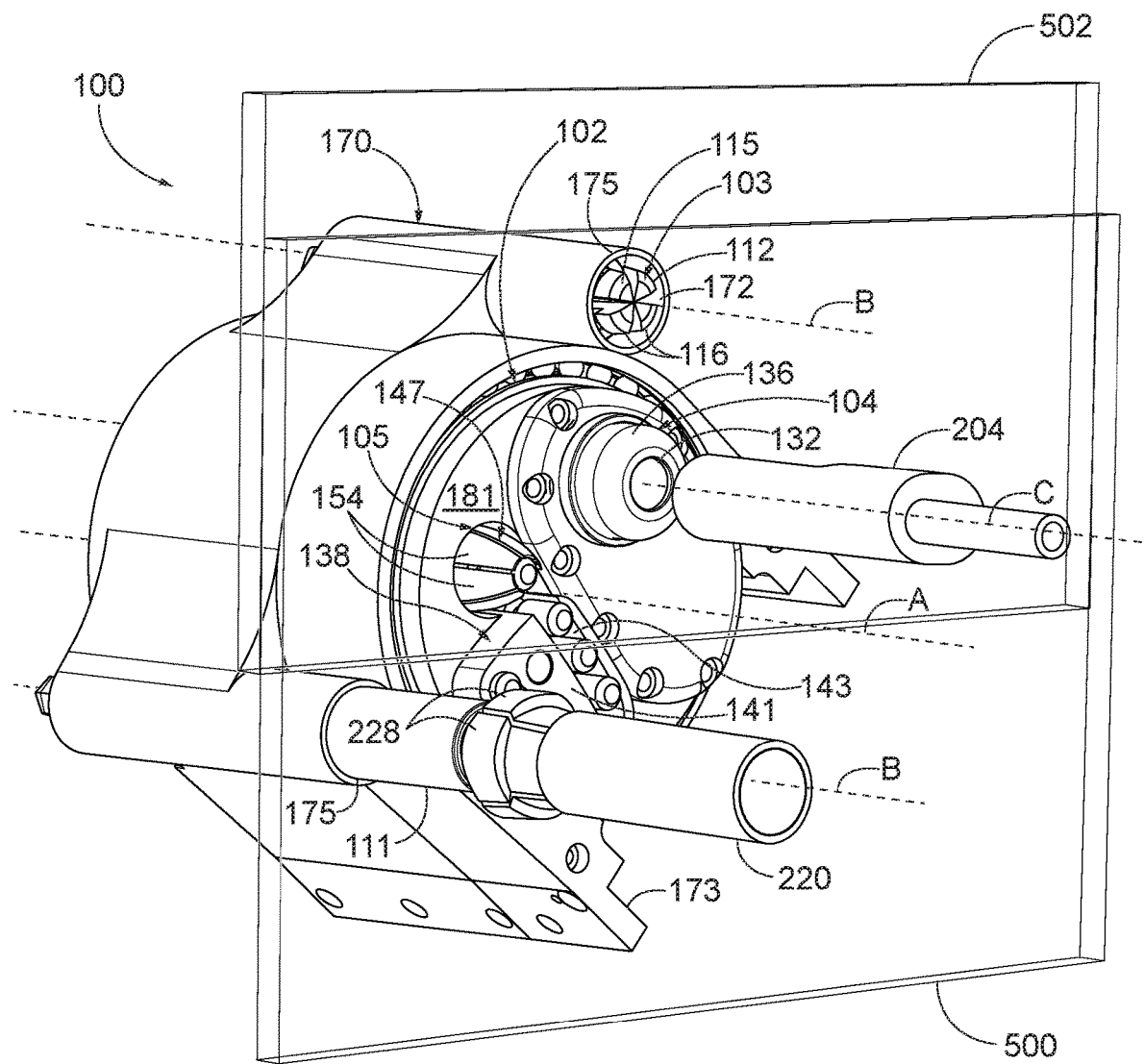
Figure 33:
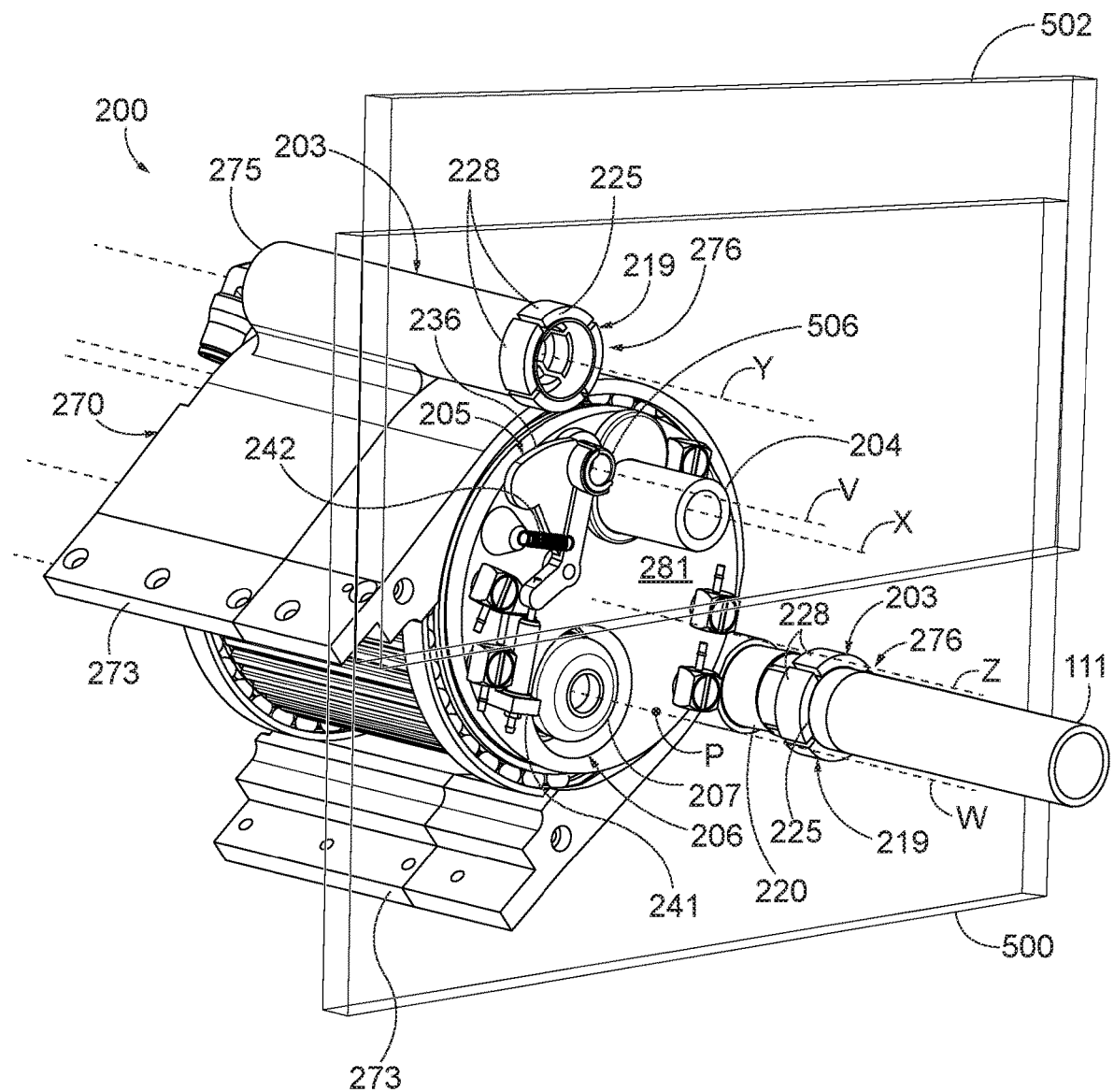
Figure 34:
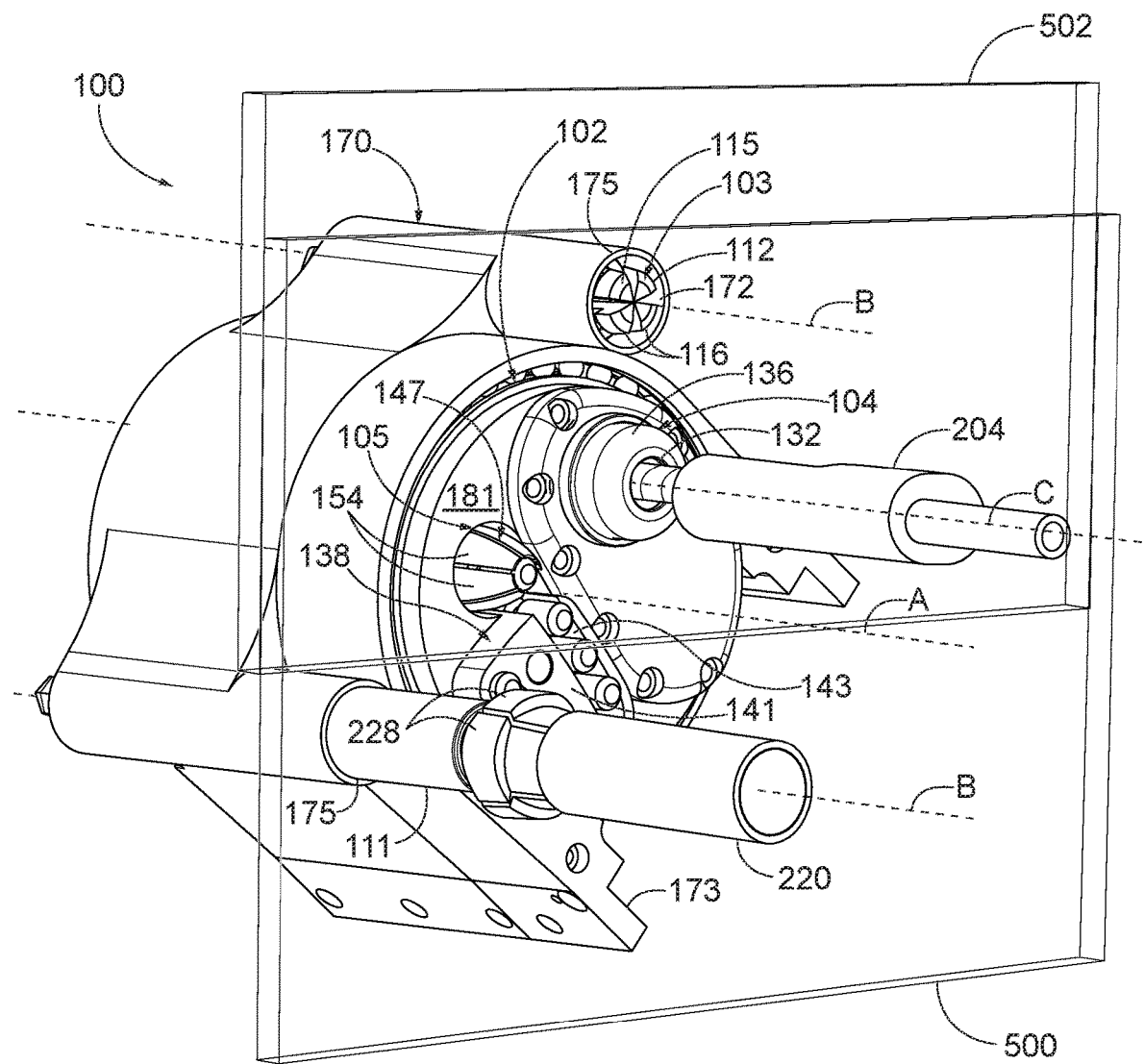
Figure 35:
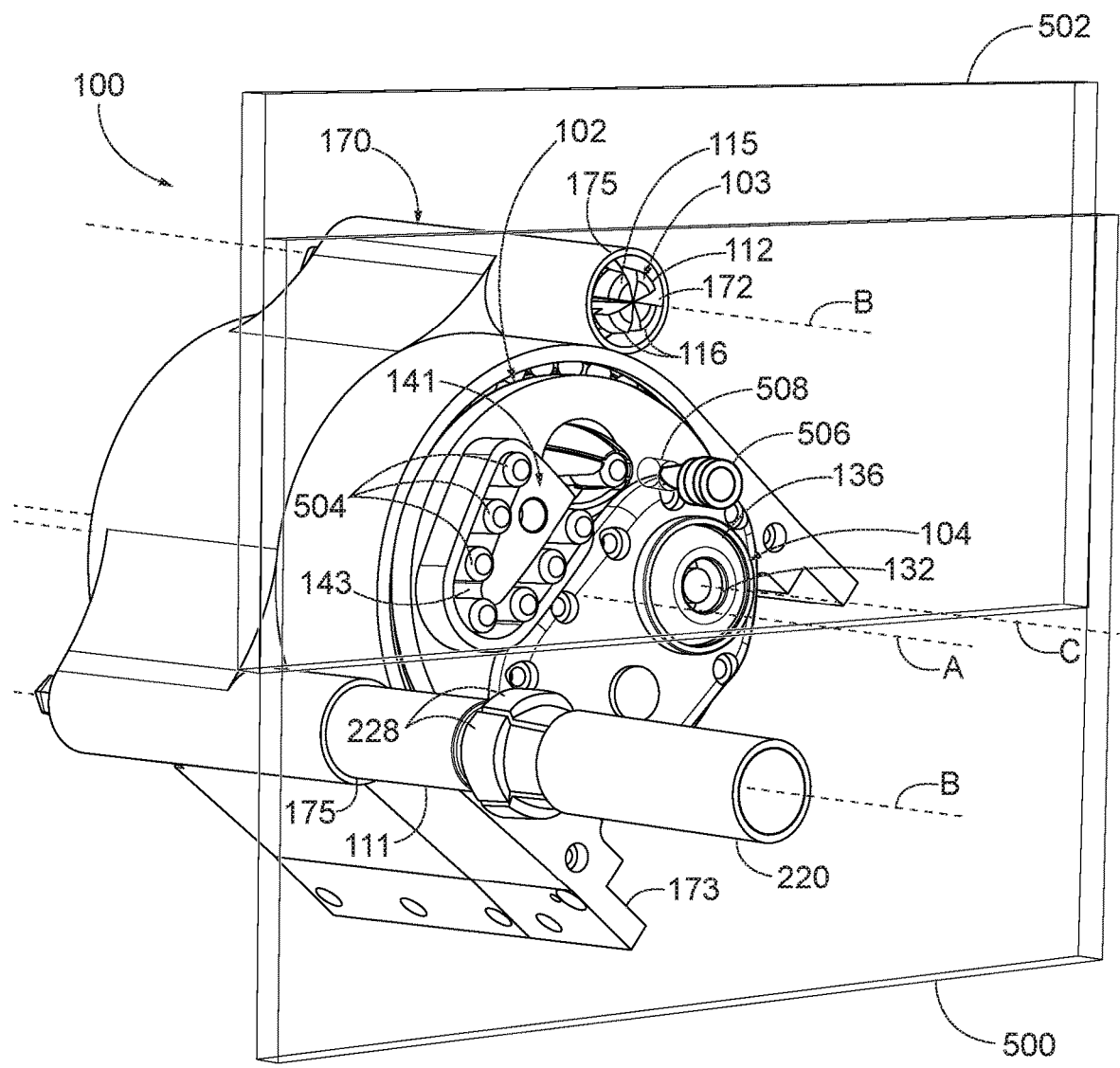
Figure 36:
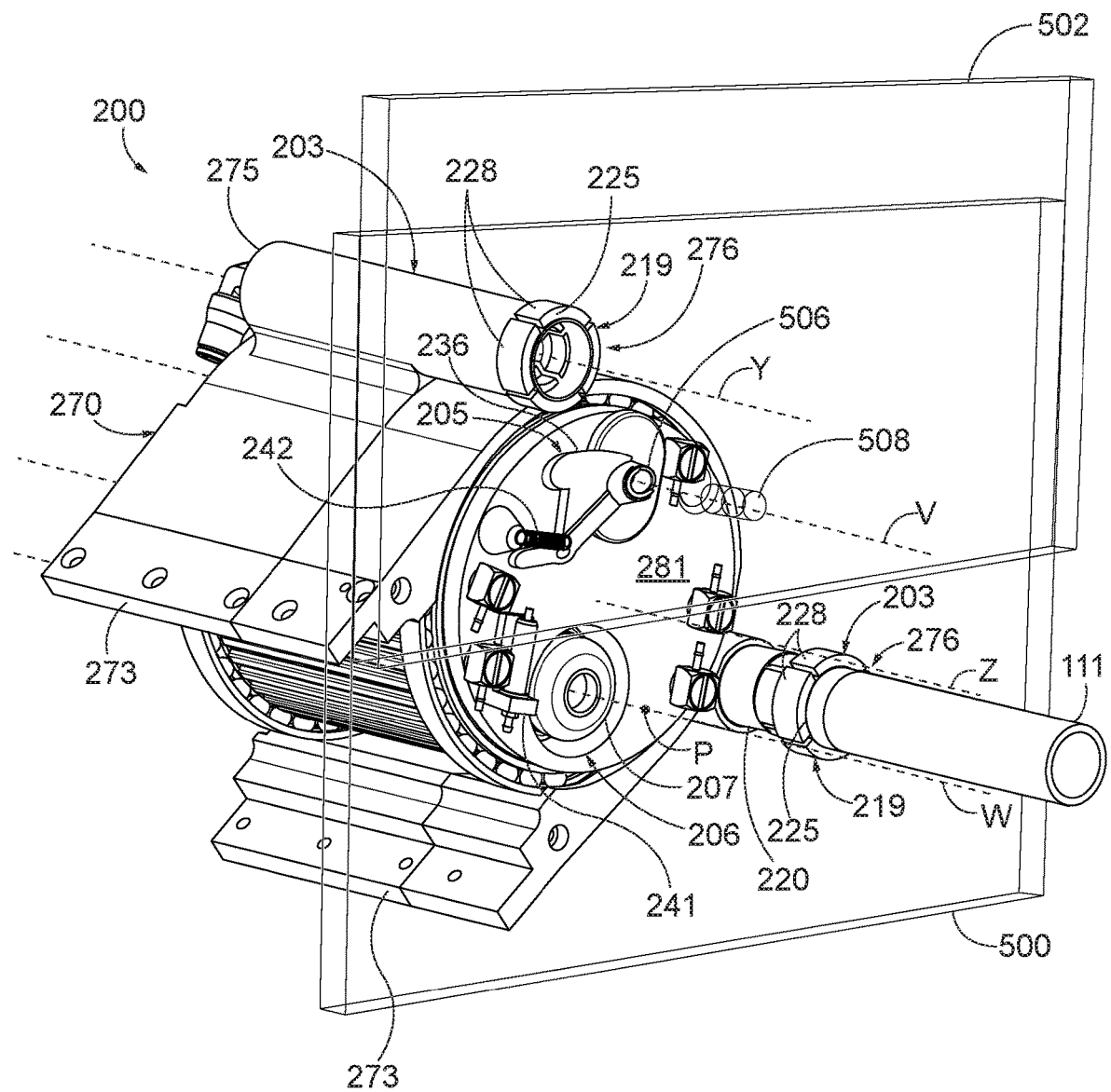
Figure 37:
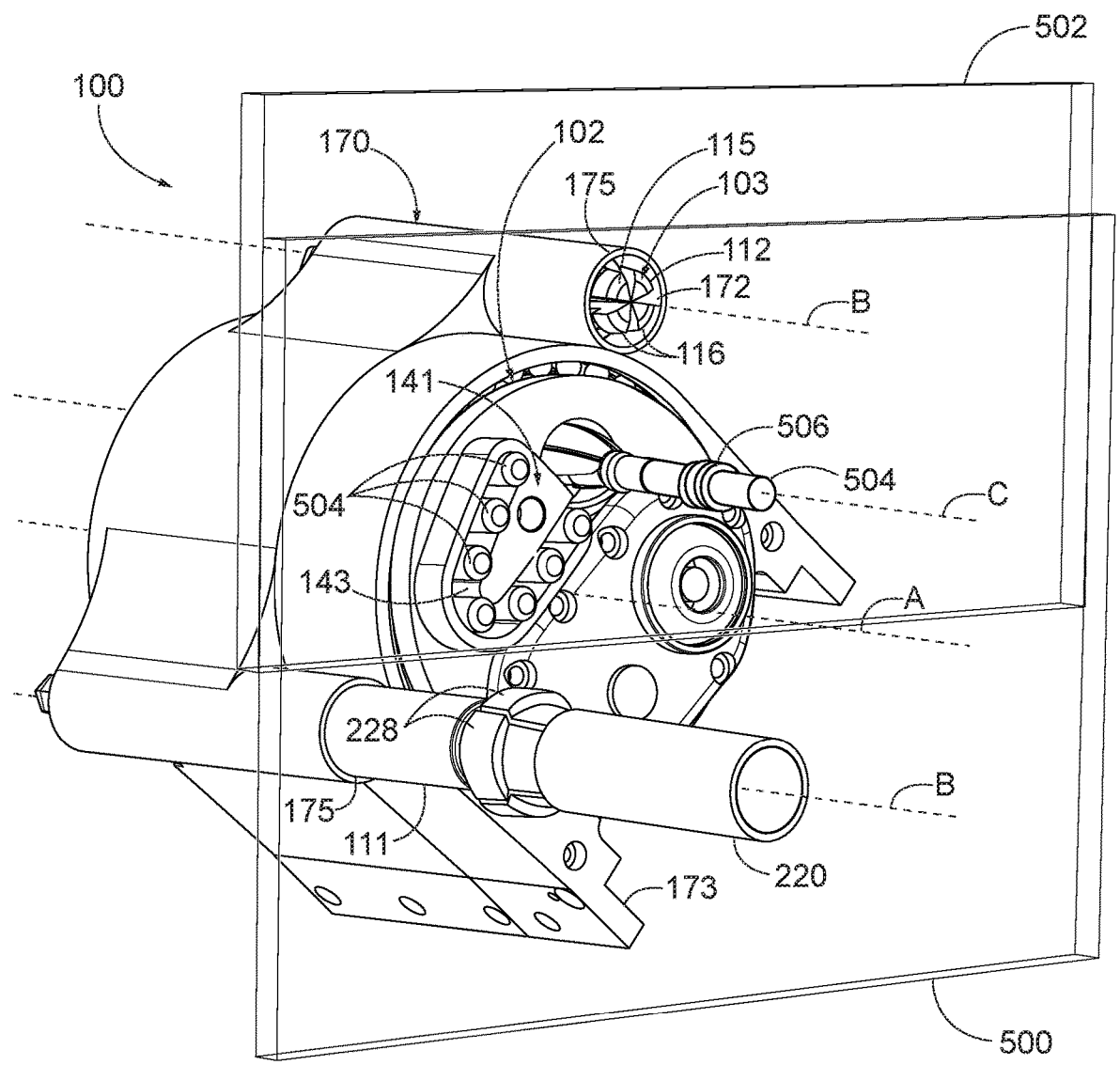
Figure 38:
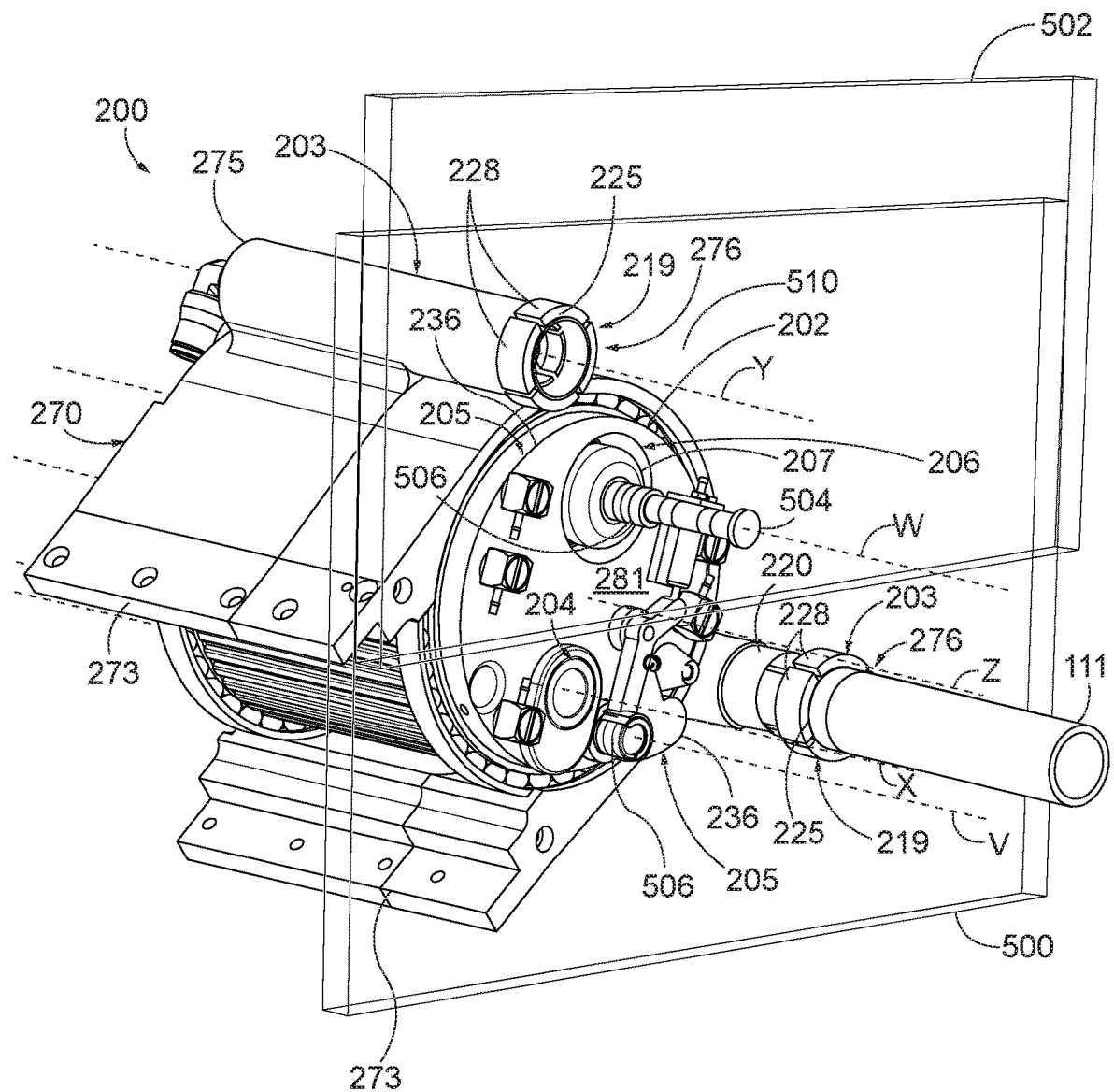
Figure 39:
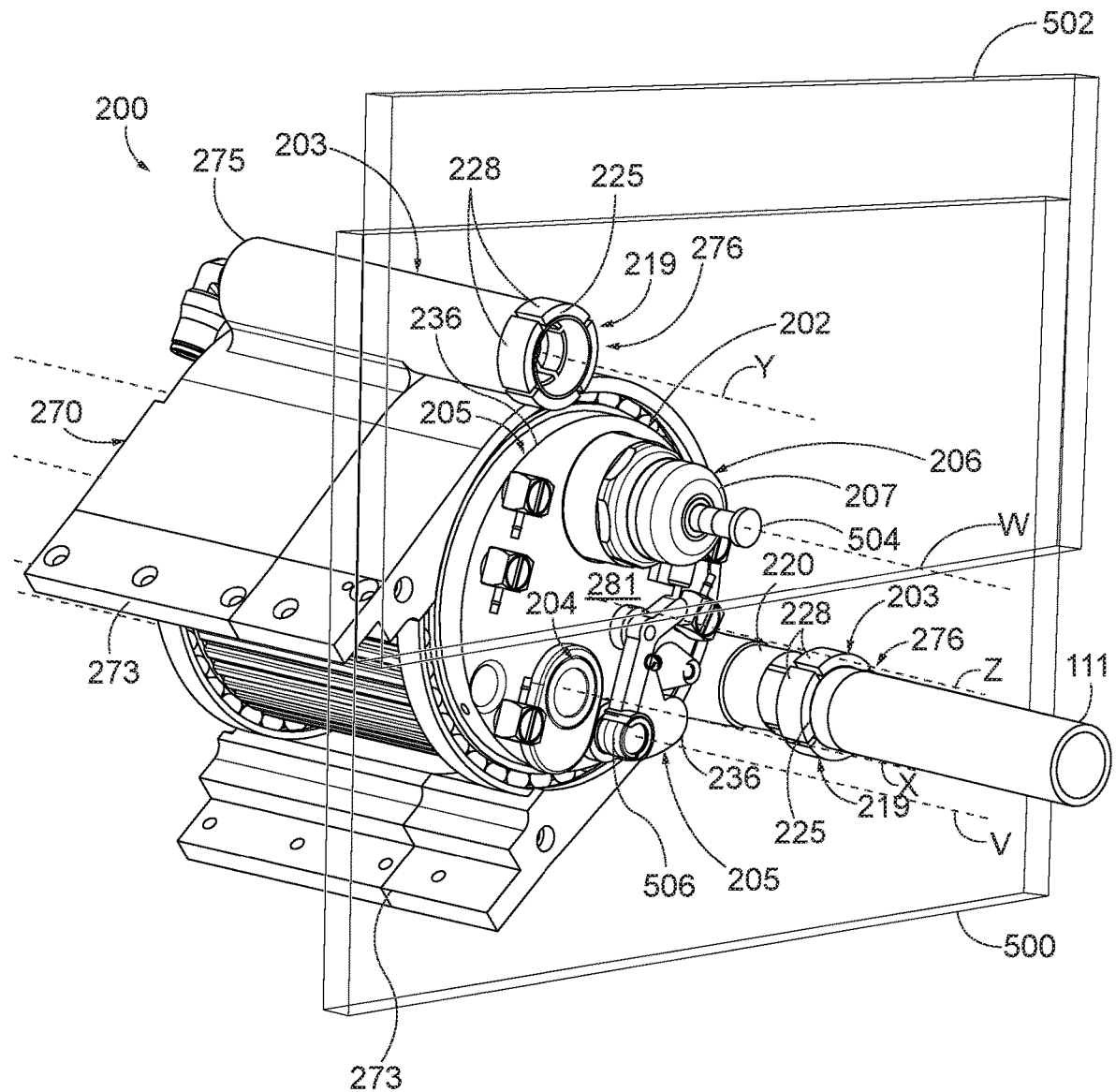
Figure 40:
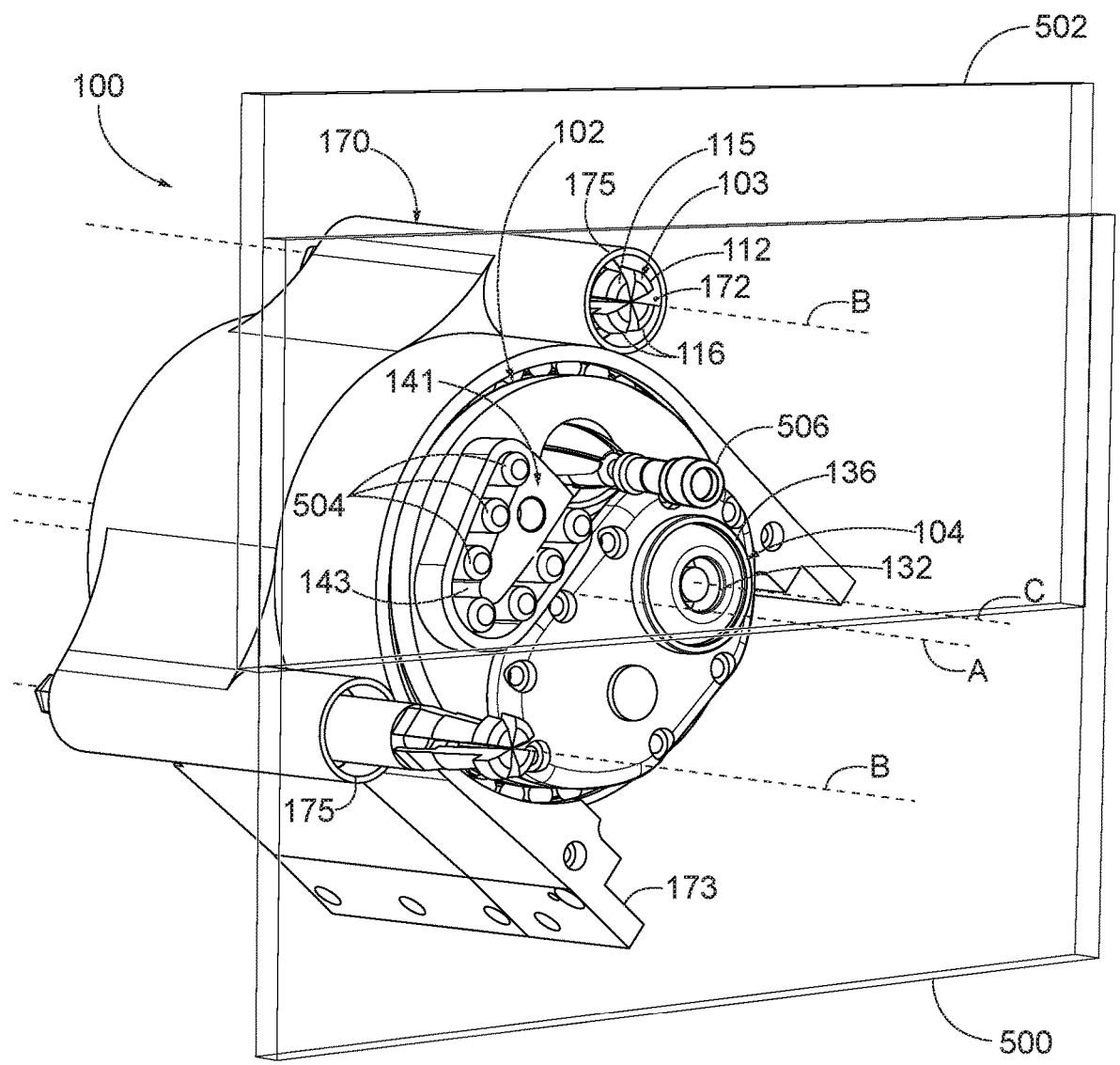
Figure 41:
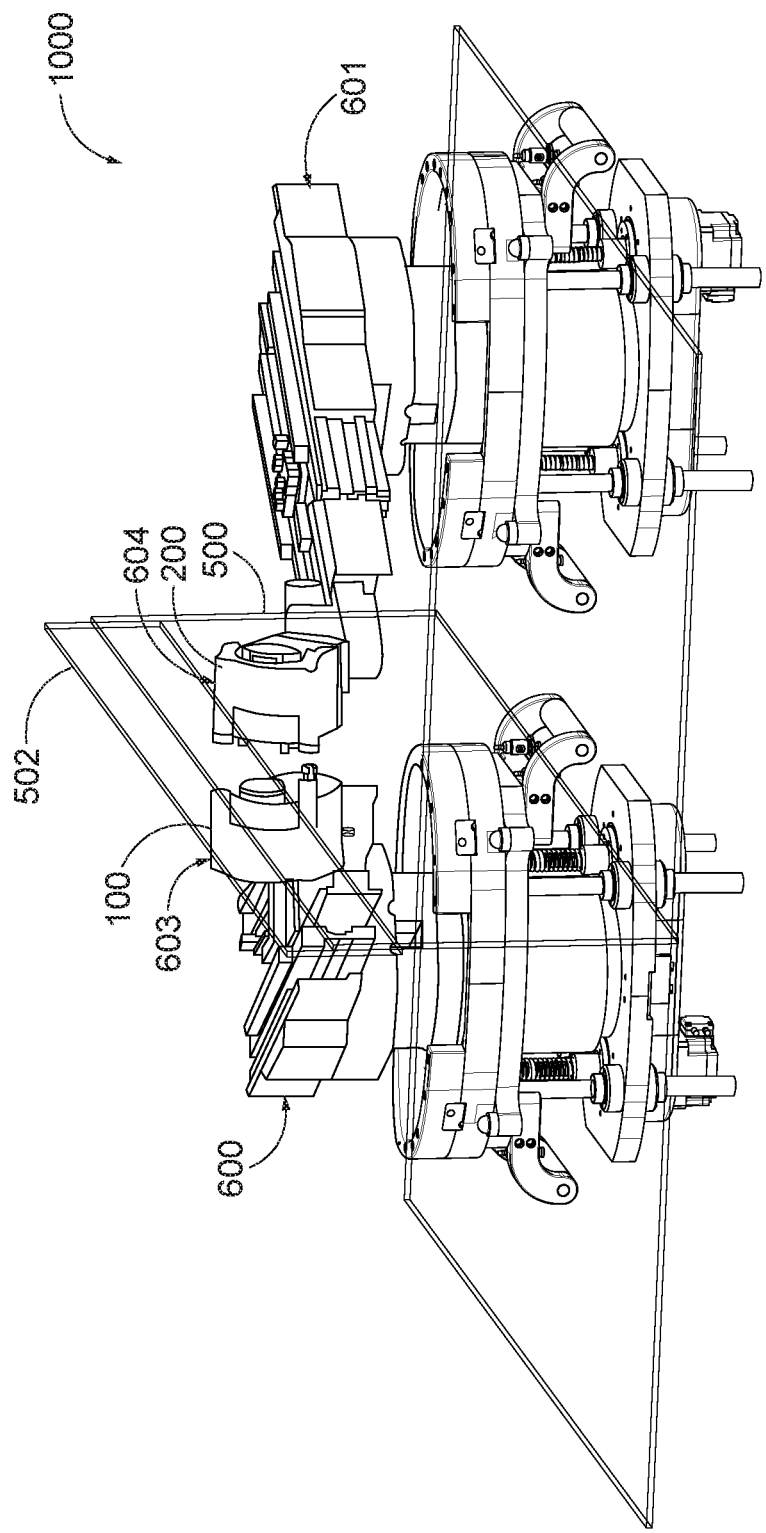
Figure 42:
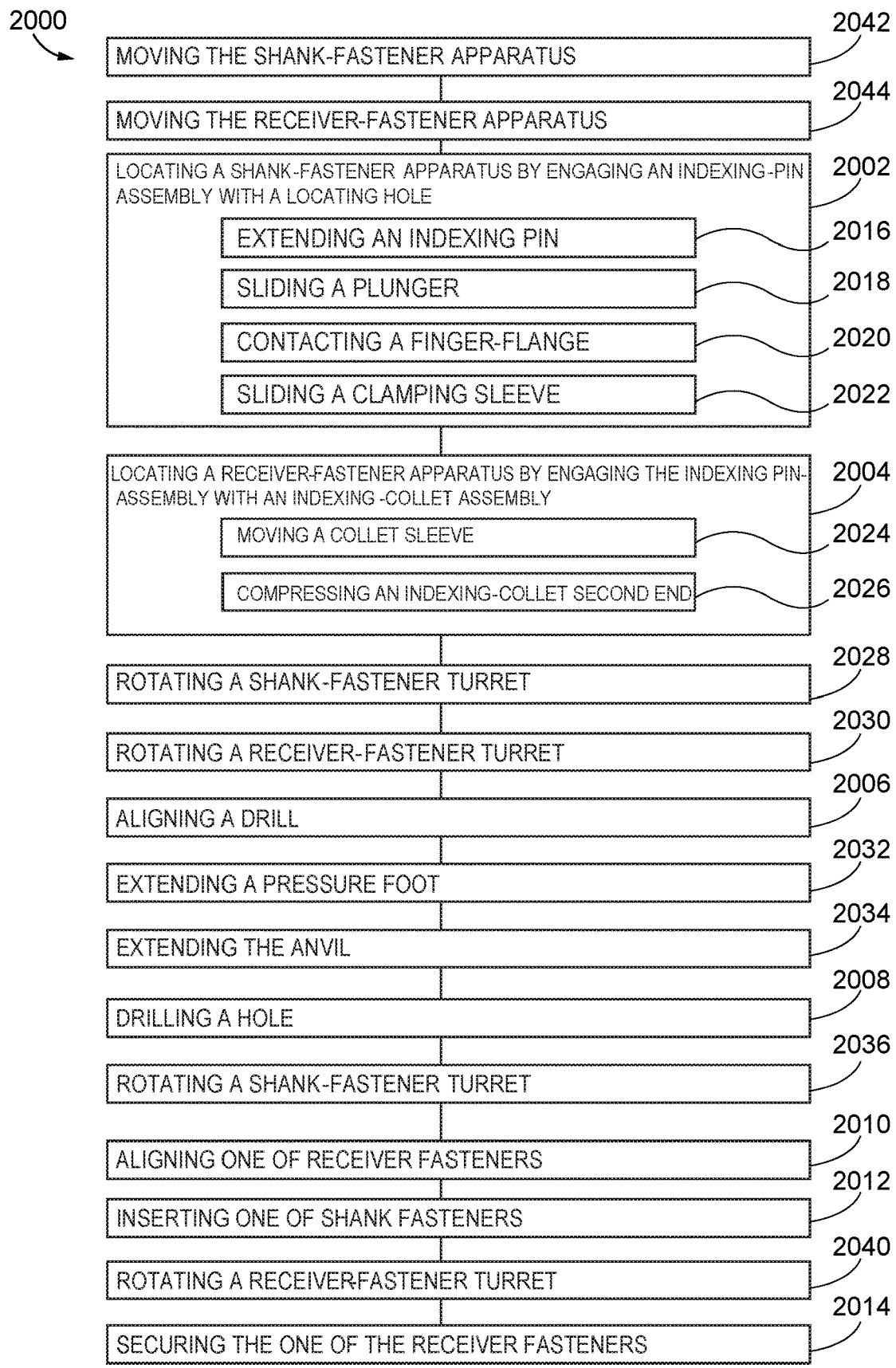
Figure 43:
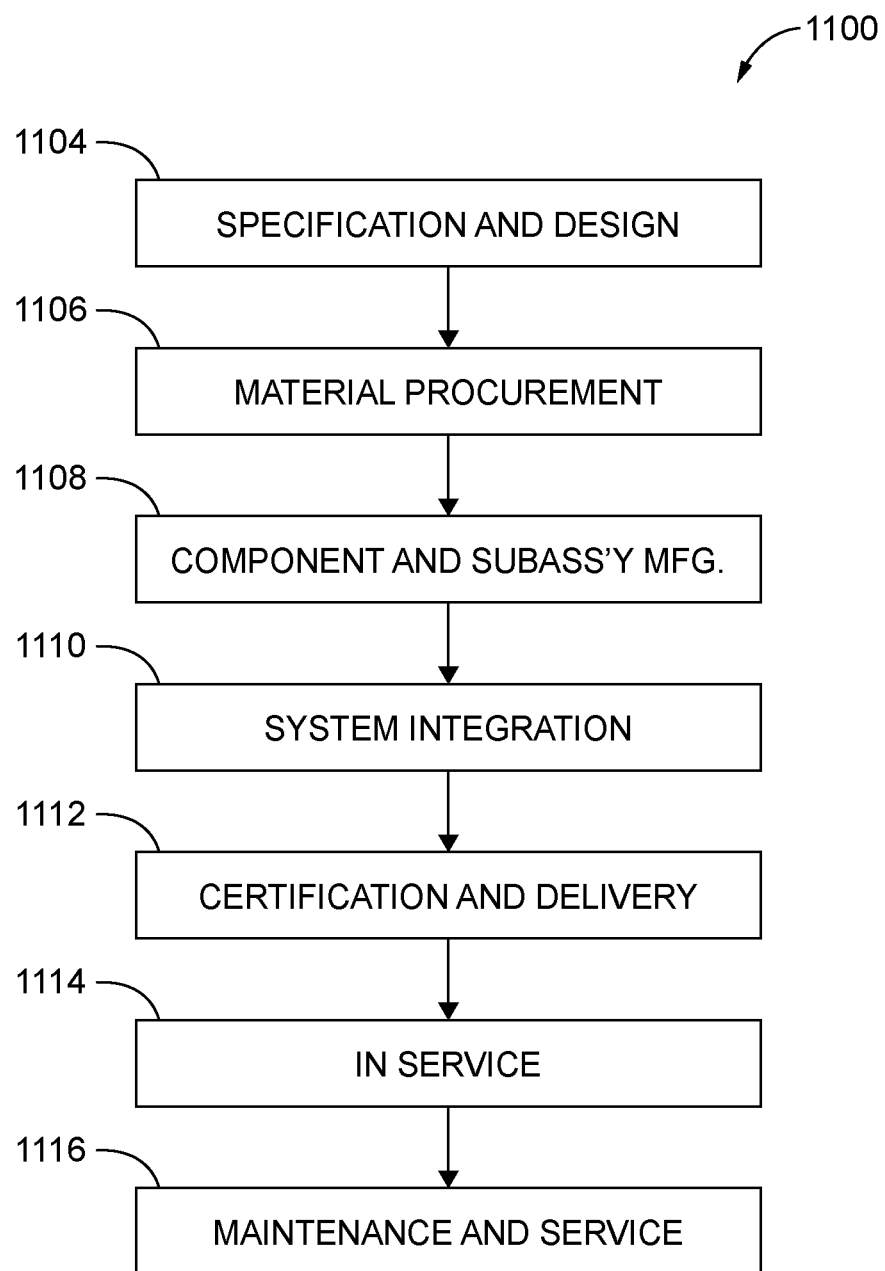

Having thus described one or more examples of the invention in general terms, reference will now be made to the accompanying drawings, which are not necessarily drawn to scale, and wherein like reference characters designate the same or similar parts throughout the several views, and wherein:

FIGS. 1A, 1B, 1C, and 1D, collectively, are a block diagram of a system for joining a first panel and a second panel, at least partially overlapping each other, according to one or more examples of the present disclosure;

FIG. 2 is a schematic, perspective view of the shank-fastener apparatus of the system of FIGS. 1A, 1B, 1C, and 1D, shown together with the first panel and the second panel, and with an indexing-pin assembly of the shank-fastener apparatus aligned with a locating hole in the first panel, according to one or more examples of the present disclosure;

FIG. 3 is a schematic, perspective view of the shank-fastener apparatus of the system of FIGS. 1A, 1B, 1C, and 1D, according to one or more examples of the present disclosure;

FIG. 4 is a schematic, perspective, cross-sectional view of a portion of the shank-fastener apparatus of the system of FIGS. 1A, 1B, 1C, and 1D, with the cross-section showing an indexing-pin assembly of the shank-fastener apparatus in an indexing-pin-assembly retracted position, according to one or more examples of the present disclosure;

FIG. 5 is a schematic, cross-sectional view of the shank-fastener apparatus of the system of FIGS. 1A, 1B, 1C, and 1D, with the cross-section showing the indexing-pin assembly of the shank-fastener apparatus transitioning toward an indexing-pin-assembly extended position relative to FIG. 4, according to one or more examples of the present disclosure;

FIG. 6 is a schematic, cross-sectional view of the shank-fastener apparatus of the system of FIGS. 1A, 1B, 1C, and 1D, with the cross-section showing the indexing-pin assembly of the shank-fastener apparatus transitioning toward the indexing-pin-assembly extended position relative to FIG. 5, according to one or more examples of the present disclosure;

FIG. 7 is a schematic, cross-sectional view of the shank-fastener apparatus of the system of FIGS. 1A, 1B, 1C, and 1D, with the cross-section showing the indexing-pin assembly of the shank-fastener apparatus in the indexing-pin-assembly extended position, according to one or more examples of the present disclosure;

FIG. 8 is a schematic, cross-sectional view of the shank-fastener apparatus of the system of FIGS. 1A, 1B, 1C, and 1D, with the cross-section showing a drill and a shank-fastener delivery assembly of the shank-fastener apparatus, according to one or more examples of the present disclosure;

FIG. 9 is a schematic, perspective view of the drill of the shank-fastener apparatus of the system of FIGS. 1A, 1B, 1C, and 1D, according to one or more examples of the present disclosure;

FIG. 10 is a schematic, cross-sectional view of the shank-fastener apparatus of the system of FIGS. 1A, 1B, 1C, and 1D, with the cross-section showing the drill of the shank-fastener apparatus, according to one or more examples of the present disclosure;

FIG. 11 is a schematic, cross-sectional view of the shank-fastener apparatus of the system of FIGS. 1A, 1B, 1C, and 1D, with the cross-section showing the shank-fastener delivery assembly of the shank-fastener apparatus delivering a shank fastener, according to one or more examples of the present disclosure;

FIG. 12 is a schematic, perspective view of the shank-fastener delivery assembly of the shank-fastener apparatus of the system of FIGS. 1A, 1B, 1C, and 1D, according to one or more examples of the present disclosure;

FIG. 13 is schematic, partial view of a portion of the shank-fastener apparatus of the system of FIGS. 1A, 1B, 1C, and 1D, showing the shank-fastener delivery assembly, according to one or more examples of the present disclosure;

FIG. 14 is a schematic, perspective cross-sectional view of the shank-fastener apparatus of the system of FIGS. 1A, 1B, 1C, and 1D, with the cross-section showing the shank fasteners housed in the magazine of the shank-fastener delivery assembly, according to one or more examples of the present disclosure;

FIG. 15 is a schematic, perspective view of the receiver-fastener apparatus of the system of FIGS. 1A, 1B, 1C, and 1D, shown together with the first panel and the second panel, and with an indexing-collet assembly of the receiver-fastener apparatus not yet aligned with the locating hole in the first panel, according to one or more examples of the present disclosure;

FIG. 16 is a schematic, perspective view of the receiver-fastener apparatus of the system of FIGS. 1A, 1B, 1C, and 1D, according to one or more examples of the present disclosure;

FIG. 17 is a schematic, cross-sectional view of the receiver-fastener apparatus of the system of FIGS. 1A, 1B, 1C, and 1D, with the cross-section showing an indexing-collet assembly of the receiver-fastener apparatus in an indexing-collet-assembly retracted position, according to one or more examples of the present disclosure;

FIG. 18 is a schematic, cross-sectional view of the receiver-fastener apparatus of the system of FIGS. 1A, 1B, 1C, and 1D, with the cross-section showing the indexing-collet assembly of the receiver-fastener apparatus toward an indexing-collet-assembly extended position relative to FIG. 17, according to one or more examples of the present disclosure;

FIG. 19 is a schematic, cross-sectional view of the receiver-fastener apparatus of the system of FIGS. 1A, 1B, 1C, and 1D, with the cross-section showing the anvil and the swager assembly, according to one or more examples of the present disclosure;

FIG. 20 is a schematic, perspective, cross-sectional view of the receiver fastener apparatus of the system of FIGS. 1A, 1B, 1C, and 1D, with the cross-section showing the swager assembly and the receiver-fastener delivery assembly, according to one or more examples of the present disclosure;

FIG. 21 is a schematic view of the receiver-fastener apparatus of the system of FIGS. 1A, 1B, 1C, and 1D, showing the holder of the receiver-fastener delivery assembly holding a receiver fastener for placement relative to the anvil, according to one or more examples of the present disclosure;

FIG. 22 is a schematic view of the receiver-fastener apparatus of the system of FIGS. 1A, 1B, 1C, and 1D, showing the holder of the receiver-fastener delivery assembly placing a receiver fastener relative to the anvil, according to one or more examples of the present disclosure;

FIG. 23 is a schematic, perspective, cross-sectional view of the receiver fastener apparatus of the system of FIGS. 1A, 1B, 1C, and 1D, with the cross-section showing the swager assembly, according to one or more examples of the present disclosure;

FIG. 24 is another schematic, perspective, cross-sectional view of the receiver fastener apparatus of the system of FIGS. 1A, 1B, 1C, and 1D, with the cross-section showing the swager assembly, according to one or more examples of the present disclosure;

FIG. 25 is a schematic, perspective view of the shank-fastener apparatus of the system of FIGS. 1A, 1B, 1C, and 1D, shown together with the first panel and the second panel, and with an indexing-pin assembly of the shank-fastener apparatus toward the indexing-pin-assembly extended position, according to one or more examples of the present disclosure;

FIG. 26 is a schematic, perspective view of the shank-fastener apparatus of the system of FIGS. 1A, 1B, 1C, and 1D, shown together with the first panel and the second panel, and with an indexing-pin assembly of the shank-fastener apparatus toward the indexing-pin-assembly extended position relative to FIG. 25, according to one or more examples of the present disclosure;

FIG. 27 a schematic, perspective view of the shank-fastener apparatus of the system of FIGS. 1A, 1B, 1C, and 1D, shown together with the first panel and the second panel, and with an indexing-pin assembly of the shank-fastener apparatus in the indexing-pin-assembly extended position, according to one or more examples of the present disclosure;

FIG. 28 a schematic, perspective view of the receiver-fastener apparatus of the system of FIGS. 1A, 1B, 1C, and 1D, shown together with the first panel and the second panel and with the indexing-pin assembly of the shank-fastener apparatus of the system of FIGS. 1A, 1B, 1C, and 1D, and with the indexing-collet assembly of the receiver-fastener apparatus engaged with the indexing-pin assembly and toward the indexing-collet-assembly extended position, according to one or more examples of the present disclosure;

FIG. 29 is a schematic, perspective view of the receiver-fastener apparatus of the system of FIGS. 1A, 1B, 1C, and 1D, shown together with the first panel and the second panel and with the indexing-pin assembly of the shank-fastener apparatus of the system of FIGS. 1A, 1B, 1C, and 1D, and with the indexing-collet assembly of the receiver-fastener apparatus engaged with the indexing-pin assembly and in the indexing-collet-assembly extended position, according to one or more examples of the present disclosure;

FIG. 30 is a schematic, perspective view of the shank-fastener apparatus of the system of FIGS. 1A, 1B, 1C, and 1D, shown together with the first panel and the second panel and with the indexing-collet assembly of the receiver-fastener apparatus of the system of FIGS. 1A, 1B, 1C, and 1D, and with the indexing-pin assembly of the shank-fastener apparatus engaged with the indexing-collet assembly and in the indexing-pin-assembly extended position, according to one or more examples of the present disclosure;

FIG. 31 is a schematic, perspective view of the receiver-fastener apparatus of the system of FIGS. 1A, 1B, 1C, and 1D, shown together with the first panel and the second panel and with the indexing-pin assembly of the shank-fastener apparatus of the system of FIGS. 1A, 1B, 1C, and 1D, with the indexing-collet assembly of the receiver-fastener apparatus engaged with the indexing-pin assembly and in the indexing-collet-assembly extended position, and with the receiver-fastener turret of the receiver-fastener apparatus rotated relative to FIG. 29 for alignment of the anvil of the receiver-fastener apparatus with the drill of the shank-fastener apparatus, according to one or more examples of the present disclosure;

FIG. 32 is a schematic, perspective view of the shank-fastener apparatus of the system of FIGS. 1A, 1B, 1C, and 1D, shown together with the first panel and the second panel and with the indexing-collet assembly and the anvil of the receiver-fastener apparatus of the system of FIGS. 1A, 1B, 1C, and 1D, with the indexing-pin assembly of the shank-fastener apparatus engaged with the indexing-collet assembly and in the indexing-pin-assembly extended position, and with the shank-fastener turret of the receiver-fastener apparatus rotated for alignment of the drill of the shank-fastener apparatus with the anvil of the receiver-fastener apparatus, according to one or more examples of the present disclosure;

FIG. 33 is a schematic, perspective view of the receiver-fastener apparatus of the system of FIGS. 1A, 1B, 1C, and 1D, shown together with the first panel and the second panel and with the indexing-pin assembly of the shank-fastener apparatus of the system of FIGS. 1A, 1B, 1C, and 1D, with the indexing-collet assembly of the receiver-fastener apparatus engaged with the indexing-pin assembly and in the indexing-collet-assembly extended position, and with the anvil of the receiver-fastener apparatus extended, according to one or more examples of the present disclosure;

FIG. 34 is a schematic, perspective view of the shank-fastener apparatus of the system of FIGS. 1A, 1B, 1C, and 1D, shown together with the first panel and the second panel and with the indexing-collet assembly and the anvil of the receiver-fastener apparatus of the system of FIGS. 1A, 1B, 1C, and 1D, with the indexing-pin assembly of the shank-fastener apparatus engaged with the indexing-collet assembly and in the indexing-pin-assembly extended position, with the shank-fastener turret of the receiver-fastener apparatus rotated for alignment of the drill of the shank-fastener apparatus with the anvil of the receiver-fastener apparatus, and with a drill bit deployed for drilling a hole through the first panel and the second panel, according to one or more examples of the present disclosure;

FIG. 35 is a schematic, perspective view of the shank-fastener apparatus of the system of FIGS. 1A, 1B, 1C, and 1D, shown together with the first panel and the second panel, with the indexing-collet assembly of the receiver-fastener apparatus of the system of FIGS. 1A, 1B, 1C, and 1D, with a receiver fastener placed by the receiver-fastener apparatus, with the indexing-pin assembly of the shank-fastener apparatus engaged with the indexing-collet assembly and in the indexing-pin-assembly extended position, and with the shank-fastener turret of the shank-fastener apparatus rotated relative to FIG. 34 for insertion of a shank fastener through the hole in the first panel and the second panel and through the receiver fastener placed by the receiver-fastener apparatus, according to one or more examples of the present disclosure;

FIG. 36 is a schematic, perspective view of the receiver-fastener apparatus of the system of FIGS. 1A, 1B, 1C, and 1D, shown together with the first panel and the second panel and with the indexing-pin assembly of the shank-fastener apparatus of the system of FIGS. 1A, 1B, 1C, and 1D, with the indexing-collet assembly of the receiver-fastener apparatus engaged with the indexing-pin assembly and in the indexing-collet-assembly extended position, and with the holder of the receiver-fastener delivery assembly holding a receiver fastener relative to the anvil for insertion of a shank fastener by the shank-fastener apparatus, according to one or more examples of the present disclosure;

FIG. 37 is a schematic, perspective view of the shank-fastener apparatus of the system of FIGS. 1A, 1B, 1C, and 1D, shown together with the first panel and the second panel, with the indexing-collet assembly of the receiver-fastener apparatus of the system of FIGS. 1A, 1B, 1C, and 1D, with a receiver fastener placed by the receiver-fastener apparatus, with the indexing-pin assembly of the shank-fastener apparatus engaged with the indexing-collet assembly and in the indexing-pin-assembly extended position, and with the shank-fastener delivery assembly inserting a shank fastener through the hole in the first panel and the second panel and through the receiver fastener, according to one or more examples of the present disclosure;

FIG. 38 is a schematic, perspective view of the receiver-fastener apparatus of the system of FIGS. 1A, 1B, 1C, and 1D, shown together with the first panel and the second panel and with the indexing-pin assembly of the shank-fastener apparatus of the system of FIGS. 1A, 1B, 1C, and 1D, with the indexing-collet assembly of the receiver-fastener apparatus engaged with the indexing-pin assembly and in the indexing-collet-assembly extended position, and with the receiver-fastener turret rotated relative to FIG. 36 for alignment of the swager assembly with the receiver fastener and the shank fastener, according to one or more examples of the present disclosure;

FIG. 39 is a schematic, perspective view of the receiver-fastener apparatus of the system of FIGS. 1A, 1B, 1C, and 1D, shown together with the first panel and the second panel and with the indexing-pin assembly of the shank-fastener apparatus of the system of FIGS. 1A, 1B, 1C, and 1D, with the indexing-collet assembly of the receiver-fastener apparatus engaged with the indexing-pin assembly and in the indexing-collet-assembly extended position, and with the swager assembly extending for swaging the receiver fastener on the shank fastener, according to one or more examples of the present disclosure;

FIG. 40 is a schematic, perspective view of the shank-fastener apparatus of the system of FIGS. 1A, 1B, 1C, and 1D, shown together with the first panel and the second panel, and with the receiver fastener swaged onto the shank fastener that extends through the hole in the first panel and the second panel, according to one or more examples of the present disclosure;

FIG. 41 is a schematic, perspective view of the shank-fastener apparatus of the system of FIGS. 1A, 1B, 1C, and 1D, shown together with the first panel and the second panel, according to one or more examples of the present disclosure;

FIG. 42 is a block diagram of a method of joining a first panel and a second panel, at least partially overlapping each other, using the system of FIGS. 1A, 1B, 1C, and 1D, according to one or more examples of the present disclosure;

FIG. 43 is a block diagram of aircraft production and service methodology; and

Figure 44:
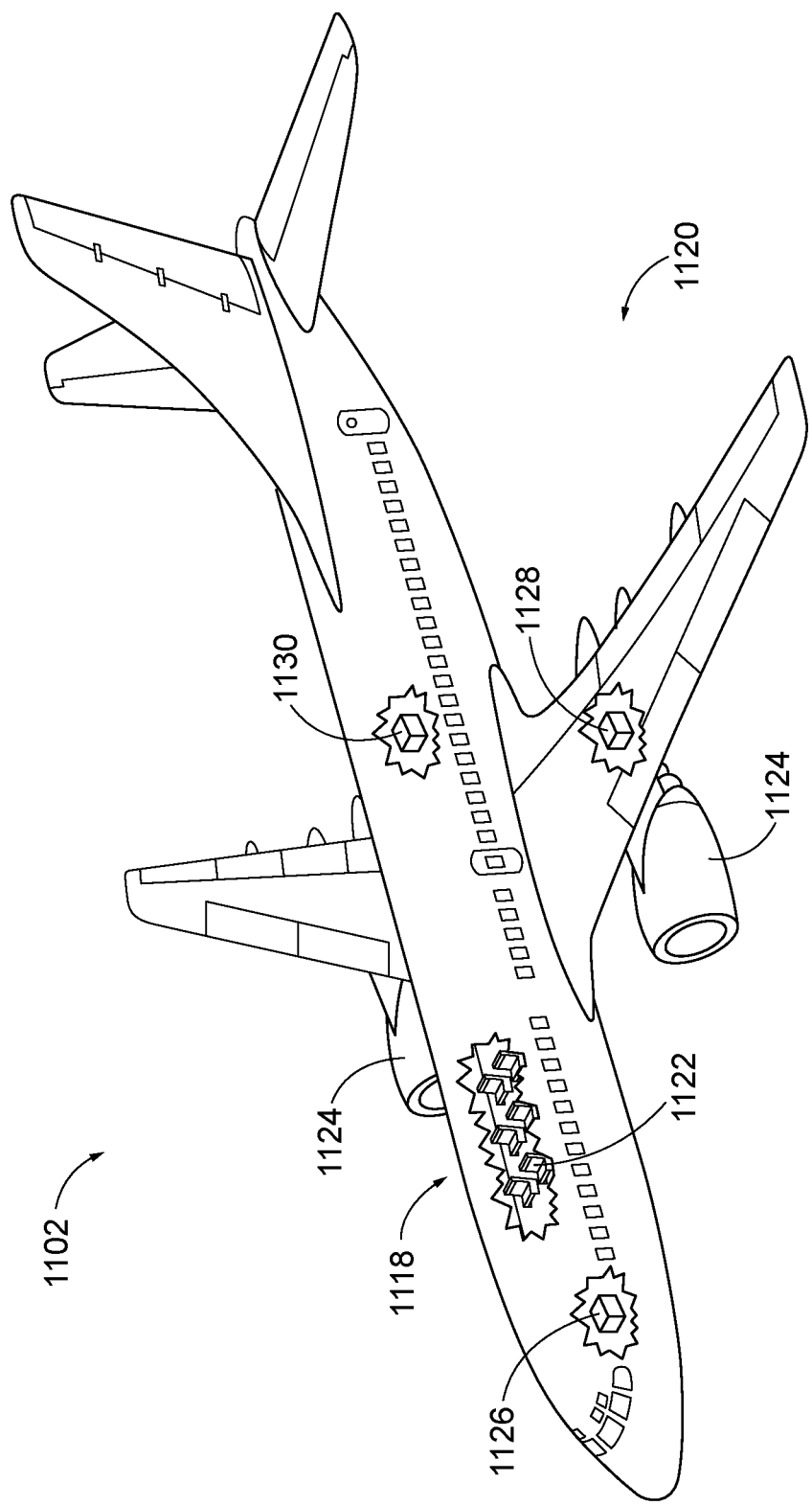

FIG. 44 is a schematic illustration of an aircraft.

DESCRIPTION

In FIGS. 1A, 1B, 1C, and 1D referred to above, solid lines, if any, connecting various elements and/or components may represent mechanical, electrical, fluid, optical, electromagnetic and other couplings and/or combinations thereof. As used herein, "coupled" means associated directly as well as indirectly. For example, a member A may be directly associated with a member B, or may be indirectly associated therewith, e.g., via another member C. It will be understood that not all relationships among the various disclosed elements are necessarily represented. Accordingly, couplings other than those depicted in the block diagrams may also exist. Dashed lines, if any, connecting blocks designating the various elements and/or components represent couplings similar in function and purpose to those represented by solid lines; however, couplings represented by the dashed lines may either be selectively provided or may relate to alternative examples of the present disclosure. Likewise, elements and/or components, if any, represented with dashed lines, indicate alternative examples of the present disclosure. One or more elements shown in solid and/or dashed lines may be omitted from a particular example without departing from the scope of the present disclosure. Environmental elements, if any, are represented with dotted lines. Virtual (imaginary) elements may also be shown for clarity. Those skilled in the art will appreciate that some of the features illustrated in FIGS. 1A, 1B, 1C, and 1D may be combined in various ways without the need to include other features described in FIGS. 1A, 1B, 1C, and 1D, other drawing figures, and/or the accompanying disclosure, even though such combination or combinations are not explicitly illustrated herein. Similarly, additional features not limited to the examples presented, may be combined with some or all of the features shown and described herein.

In FIGS. 42 and 43, referred to above, the blocks may represent operations and/or portions thereof and lines connecting the various blocks do not imply any particular order or dependency of the operations or portions thereof. Blocks represented by dashed lines indicate alternative operations and/or portions thereof. Dashed lines, if any, connecting the various blocks represent alternative dependencies of the operations or portions thereof. It will be understood that not all dependencies among the various disclosed operations are necessarily represented. FIGS. 42 and 43 and the accompanying disclosure describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or simultaneously. Additionally, those skilled in the art will appreciate that not all operations described need be performed.

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Reference herein to "one example" means that one or more feature, structure, or characteristic described in connection with the example is included in at least one implementation. The phrase "one example" in various places in the specification may or may not be referring to the same example.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification.

For purposes of this disclosure, a system, apparatus, structure, article, element, component, or hardware described as being "configured to" perform a particular function may additionally or alternatively be described as being "adapted to" and/or as being "operative to" perform that function.

Illustrative, non-exhaustive examples, which may or may not be claimed, of the subject matter according the present disclosure are provided below.

Referring generally to FIGS. 1A, 1B, 1C, and 1D (collectively referred to as FIG. 1) and particularly to, e.g., FIGS. 2-14, shank-fastener apparatus 100 is disclosed. Shank-fastener apparatus 100 is for joining, in concert with receiver-fastener apparatus 200, first panel 500 and second panel 502, at least partially overlapping each other. Shank-fastener apparatus 100 comprises shank-fastener housing 170, shank-fastener turret 102, indexing-pin assembly 103, drill 104, and shank-fastener delivery assembly 105. Shank-fastener turret 102 is supported by shank-fastener housing 170 and is selectively rotatable relative to shank-fastener housing 170 about shank-fastener-turret rotation axis A. Indexing-pin assembly 103 is supported by shank-fastener housing 170 and is selectively movable relative to shank-fastener housing 170 between an indexing-pin-assembly extended position and an indexing-pin-assembly retracted position along indexing-pin-assembly axis B that is parallel to shank-fastener-turret rotation axis A. Drill 104 is supported by shank-fastener turret 102 and is selectively movable relative to shank-fastener turret 102 along drill axis C that is parallel to shank-fastener-turret rotation axis A. Shank-fastener delivery assembly 105 is supported by shank-fastener turret 102. The preceding subject matter of this paragraph characterizes example 1 of the present disclosure.

Indexing-pin assembly 103 enables shank-fastener apparatus 100 to be temporarily fixed relative to first panel 500 and second panel 502, as well as relative to receiver-fastener apparatus 200, while the various component tools of shank-fastener apparatus 100 function. More specifically, when indexing-pin assembly 103 fixes shank-fastener apparatus 100 relative to first panel 500 and second panel 502, shank-fastener turret 102 can then be rotated relative to shank-fastener housing 170 to align drill 104 with at point P where drilled hole 508 is desired through first panel 500 and second panel 502, and subsequently rotated to align shank-fastener delivery assembly 105 with drilled hole 508 for insertion of a shank fastener through drilled hole 508.

Indexing-pin assembly 103 is configured to transition between an indexing-pin-assembly retracted position and an indexing-pin-assembly extended position so that it may be selectively inserted into locating hole 510 in one of first panel 500 and second panel 502. Once inserted into locating hole 510, indexing-pin assembly 103 secures shank-fastener apparatus 100 relative to first panel 500 and second panel 502, as discussed herein. Moreover, by having an indexing-pin-assembly retracted position, indexing-pin assembly 103 is drawn into shank-fastener housing 170, providing for a compact volume of shank-fastener apparatus 100 as it is manipulated into place for operation, which location may be confined with limited access.

Shank-fastener turret 102 is rotatable relative to shank-fastener housing 170, so that once shank-fastener apparatus 100 is secured relative to first panel 500 and second panel 502 by indexing-pin assembly 103, it is possible to selectively position the tools, supported by shank-fastener turret 102 (i.e., drill 104 and shank-fastener delivery assembly 105), relative to first panel 500 and second panel 502 for operation thereof. In other words, it is possible to position drill 104 for drilling drilled hole 508 at point P, and subsequently, it is possible to position shank-fastener delivery assembly 105 for insertion of a shank fastener through drilled hole 508 and through a receiver fastener, operatively placed by receiver-fastener apparatus 200, as discussed herein.

As indicated, shank-fastener apparatus 100 and receiver-fastener apparatus 200 are used to join first panel 500 and second panel 502 together. In one or more examples, collectively, shank-fastener apparatus 100 and receiver-fastener apparatus 200 are components of system 1000, discussed herein. More specifically, shank-fastener apparatus 100 and receiver-fastener apparatus 200 are configured to automatically join (e.g., by robotic devices) first panel 500 and second panel 502 together utilizing a two-piece fastening system, namely one that includes a shank fastener and a receiver fastener that is swaged, or crimped, onto the shank fastener. Illustrative, non-exclusive examples of two-piece fastening systems include lockbolt fastening systems. Lockbolt fastening systems utilize a lockbolt pin (e.g., a shank fastener) and a lockbolt collar (e.g., a receiver fastener). Typical lockbolt pins include a head and a grooved shaft, and lockbolt collars come in a variety of forms, including flanged and flangeless lockbolt collars. To assemble a lockbolt, the lockbolt pin is inserted through a common hole extending through at least two panels, the lockbolt collar is placed over the shaft of the lockbolt pin, and a lockbolt installation tool is used to urge the lockbolt collar against the structures being fastened and swage, or crimp, the lockbolt collar into the grooves of the lockbolt pin's shaft, thereby fixing the lockbolt pin and the lockbolt collar together. In some lockbolt systems, the swaging tool (e.g., swager assembly 206 of receiver-fastener apparatus 200) also breaks off a portion of the shaft of the lockbolt pin that extends past the lockbolt collar after the lockbolt collar is swaged onto the lockbolt pin.

In one or more examples, shank-fastener apparatus 100 illustrated herein comprises two indexing-pin assemblies. Although not required in all examples of shank-fastener apparatus 100, by having two indexing-pin assemblies, shank-fastener apparatus 100 is more versatile than if only one indexing-pin assembly 103 were included, such as depending on the location of locating hole 510 relative to point P.

Referring generally to FIG. 1 and particularly to, e.g., FIGS. 2, 3, 5-8, 10, 11, 13, and 14, shank-fastener housing 170 extends at least partially around shank-fastener turret 102 and comprises shank-fastener-housing mounting flanges 173. The preceding subject matter of this paragraph characterizes example 2 of the present disclosure, wherein example 2 also includes the subject matter according to example 1, above.

By extending at least partially around shank-fastener turret 102, shank-fastener housing 170 provides a foundation, or base, with respect to which it is possible for shank-fastener turret 102 to rotate for operative placement of drill 104 and shank-fastener delivery assembly 105. Shank-fastener-housing mounting flanges 173 provide structure for mounting shank-fastener apparatus 100 to first robotic device 600, as shown in FIG. 41.

Referring generally to FIG. 1 and particularly to, e.g., FIGS. 2 and 4-7 shank-fastener housing 170 comprises indexing-pin-assembly receptacle 172 that houses indexing-pin assembly 103. The preceding subject matter of this paragraph characterizes example 3 of the present disclosure, wherein example 3 also includes the subject matter according to example 1 or 2, above.

Indexing-pin-assembly receptacle 172 enables indexing-pin assembly 103 to be deployed and retracted between the indexing-pin-assembly retracted position and the indexing-pin-assembly extended position. Moreover, indexing-pin-assembly receptacle 172 provides structure for the linear translation of clamping sleeve 111 of indexing-pin assembly 103, as well as structure against which first indexing-pin spring 121 reacts for translation of clamping sleeve 111, as discussed herein.

Referring generally to FIG. 1 and particularly to, e.g., FIGS. 2 and 4-7, indexing-pin-assembly receptacle 172 has indexing-pin-assembly-receptacle first end 174 and indexing-pin-assembly-receptacle second end 175. Indexing-pin-assembly-receptacle second end 175 is located axially opposite indexing-pin-assembly-receptacle first end 174. Indexing-pin-assembly receptacle 172 comprises indexing-pin-assembly receptacle inlet 169. Indexing-pin-assembly receptacle inlet 169 is located at indexing-pin-assembly-receptacle first end 174 and is configured to supply pressurized fluid to indexing-pin-assembly receptacle 172 to move indexing-pin assembly 103 between the indexing-pin-assembly extended position and the indexing-pin-assembly retracted position. Indexing-pin-assembly-receptacle second end 175 is configured to enable indexing-pin assembly 103 to move to the indexing-pin-assembly extended position to engage with one of first panel 500 or second panel 502. The preceding subject matter of this paragraph characterizes example 4 of the present disclosure, wherein example 4 also includes the subject matter according to example 3, above.

Indexing-pin-assembly-receptacle second end 175 is open to permit indexing-pin assembly 103 to extend from the indexing-pin-assembly retracted position to the indexing-pin-assembly extended position. The pressurized fluid (e.g., air) enters indexing-pin-assembly-receptacle first end 174 to sequentially overcome the spring forces of second indexing-pin spring 122, first indexing-pin spring 121, third indexing-pin spring 123, and then second indexing-pin spring 122 to extend to the indexing-pin-assembly extended position, as discussed herein.

Referring generally to FIG. 1 and particularly to, e.g., FIGS. 4-7, indexing-pin assembly 103 comprises clamping sleeve 111, indexing pin 112, and plunger 113. Indexing pin 112 is positioned within clamping sleeve 111, and plunger 113 is positioned within indexing pin 112. Each of clamping sleeve 111, indexing pin 112, or plunger 113 is movable relative to another along indexing-pin-assembly axis B. The preceding subject matter of this paragraph characterizes example 5 of the present disclosure, wherein example 5 also includes the subject matter according to any one of examples 1 to 4, above.

Indexing pin 112 provides structure to engage with locating hole 510 in first panel 500. More specifically, indexing pin 112 is configured to extend through locating hole 510 and engage the side of first panel 500 opposite shank-fastener apparatus 100. Plunger 113 expands indexing-pin second end 115 when it translates within indexing pin 112 toward indexing-pin second end 115. When clamping sleeve 111 translates toward indexing-pin second end 115, first panel 500 becomes clamped between indexing-pin second end 115 and clamping sleeve 111.

Referring generally to FIG. 1 and particularly to, e.g., FIGS. 4-7, indexing pin 112 has an elongated shape and comprises an indexing-pin first end 114 and an indexing-pin second end 115. Indexing-pin second end 115 is axially opposite indexing-pin first end 114. Indexing pin 112 also comprises fingers 116 that are proximate to indexing-pin second end 115 and that are bendable relative to indexing-pin-assembly axis B. The preceding subject matter of this paragraph characterizes example 6 of the present disclosure, wherein example 6 also includes the subject matter according to example 5, above.

By being bendable, fingers 116 expand within locating hole 510 when plunger 113 translates toward indexing-pin second end 115. As a result, fingers 116 engage first panel 500 and, together with clamping sleeve 111, clamps first panel 500, thereby fixing shank-fastener apparatus 100 relative to first panel 500.

Referring generally to FIG. 1 and particularly to, e.g., FIGS. 2, 4-7, 26, and 27, each of fingers 116 comprises finger-flange 118 at indexing-pin second end 115. Finger-flange 118 of each of fingers 116 extends radially away from indexing-pin-assembly axis B. The preceding subject matter of this paragraph characterizes example 7 of the present disclosure, wherein example 7 also includes the subject matter according to example 6, above.

Because each finger-flange 118 extends radially away from indexing-pin assembly axis B, when indexing-pin second end 115 extends through locating hole 510 and when plunger 113 translates toward indexing-pin second end 115 and causes fingers 116 to expand, each finger-flange 118 will be positioned to engage first panel 500 on the side of first panel 500 that is opposite shank-fastener apparatus 100.

Referring generally to FIG. 1 and particularly to, e.g., FIGS. 4-7, clamping sleeve 111 has an elongated shape and comprises clamping-sleeve first end 119 and clamping-sleeve second end 120. Clamping-sleeve second end 120 is located axially opposite from clamping-sleeve first end 119. In the indexing-pin-assembly retracted position, clamping sleeve 111 is retracted into shank-fastener housing 170 with clamping-sleeve second end 120 positioned in shank-fastener housing 170. In the indexing-pin-assembly extended position, clamping sleeve 111 extends from shank-fastener housing 170 with clamping-sleeve second end 120 positioned outside of shank-fastener housing 170. The preceding subject matter of this paragraph characterizes example 8 of the present disclosure, wherein example 8 also includes the subject matter according to example 6 or 7, above.

In other words, clamping sleeve 111 is fully retracted into indexing-pin-assembly receptacle 172 when indexing-pin assembly 103 is in the indexing-pin-assembly retracted position. Accordingly, clamping sleeve 111 does not hinder retraction of indexing pin 112 and the compact volume of shank-fastener apparatus 100 as it is manipulated into place for operation, which location may be confined with limited access, as discussed herein.

Referring generally to FIG. 1 and particularly to, e.g., FIGS. 4-7, plunger 113 is shorter than indexing pin 112 along indexing-pin-assembly axis B. The preceding subject matter of this paragraph characterizes example 9 of the present disclosure, wherein example 9 also includes the subject matter according to any one of examples 6 to 8, above.

Because plunger 113 is shorted than indexing pin 112, it is fully contained within indexing pin 112. Moreover, when plunger 113 translates toward indexing-pin second end 115 to expand indexing-pin second end 115, plunger 113 does not extend beyond indexing-pin second end 115 and thus does not hinder operation of indexing-collet assembly 203 of receiver-fastener apparatus 200.

Referring generally to FIG. 1 and particularly to, e.g., FIGS. 4-7, indexing-pin assembly 103 further comprises first indexing-pin spring 121. First indexing-pin spring 121 is operatively connected to clamping sleeve 111. First indexing-pin spring 121 applies a first spring force to clamping sleeve 111 to bias clamping sleeve 111 along indexing-pin-assembly axis B into shank-fastener housing 170. The preceding subject matter of this paragraph characterizes example 10 of the present disclosure, wherein example 10 also includes the subject matter according to any one of examples 6 to 9, above.

As indicated, first indexing-pin spring 121 biases clamping sleeve 111 into shank-fastener housing 170, and more specifically into indexing-pin-assembly receptacle 172. Accordingly, clamping sleeve 111 remains retracted until pneumatic pressure within indexing-pin-assembly receptacle 172 sufficiently overcomes the spring force of first indexing-pin spring 121, at which point clamping sleeve 111 translates toward indexing-pin second end 115 and against first panel 500 to clamp first panel 500 together with indexing-pin second end 115. Conversely, when pneumatic pressure within indexing-pin-assembly receptacle 172 falls below the spring force of first indexing-pin spring 121, clamping sleeve 111 will retract into indexing-pin-assembly receptacle 172.

Referring generally to FIG. 1 and particularly to, e.g., FIGS. 4-7, indexing-pin assembly 103 further comprises second indexing-pin spring 122. Second indexing-pin spring 122 is operatively connected to indexing pin 112. Second indexing-pin spring 122 applies a second spring force to indexing pin 112 to bias indexing pin 112 along indexing-pin-assembly axis B into shank-fastener housing 170. The preceding subject matter of this paragraph characterizes example 11 of the present disclosure, wherein example 11 also includes the subject matter according to example 10, above.

As indicated, second indexing-pin spring 122 biases indexing pin 112 into shank-fastener housing 170, and more specifically into indexing-pin-assembly receptacle 172. Accordingly, indexing pin 112 remains retracted until pneumatic pressure within indexing-pin-assembly receptacle 172 sufficiently overcomes the spring force of second indexing-pin spring 122, at which point indexing pin 112 translates out of indexing-pin-assembly receptacle 172 (e.g., toward and into locating hole 510).

Conversely, when pneumatic pressure within indexing-pin-assembly receptacle 172 falls below the spring force of second indexing-pin spring 122, indexing pin 112 will retract into indexing-pin-assembly receptacle 172.

Referring generally to FIG. 1 and particularly to, e.g., FIGS. 4-7, indexing-pin assembly 103 further comprises third indexing-pin spring 123 that applies a third spring force to plunger 113 to bias plunger 113 away from indexing-pin second end 115. The preceding subject matter of this paragraph characterizes example 12 of the present disclosure, wherein example 12 also includes the subject matter according to example 11, above.

As indicated, third indexing-pin spring 123 biases plunger 113 away from indexing-pin second end 115. Accordingly, plunger 113 remains retracted away from indexing-pin second end 115 until pneumatic pressure within indexing-pin-assembly receptacle 172 sufficiently overcomes the spring force of third indexing-pin spring 123, at which point plunger 113 translated toward indexing-pin second end 115 and expands fingers 116 of indexing pin 112. Conversely, when pneumatic pressure within indexing-pin-assembly receptacle 172 falls below the spring force of third indexing-pin spring 123, plunger 113 will retract away from indexing-pin second end 115.

Referring generally to FIG. 1 and particularly to, e.g., FIGS. 4-7, first indexing-pin spring 121 has a first spring constant, second indexing-pin spring 122 has a second spring constant, and third indexing-pin spring 123 has a third spring constant. The first spring constant, the second spring constant, and the third spring constant are different from each other. The preceding subject matter of this paragraph characterizes example 13 of the present disclosure, wherein example 13 also includes the subject matter according to example 12, above.

By having different spring constants, first indexing-pin spring 121, second indexing-pin spring 122, and third indexing-pin spring 123 respectively will result in clamping sleeve 111, indexing pin 112, and plunger 113 moving along indexing-pin-assembly axis B as a result of different threshold pneumatic pressures within indexing-spring-assembly receptacle 172.

Referring generally to FIG. 1 and particularly to, e.g., FIGS. 4-7, the third spring constant is greater than the second spring constant and is less than the first spring constant. The preceding subject matter of this paragraph characterizes example 14 of the present disclosure, wherein example 14 also includes the subject matter according to example 13, above.

By being greater than the second spring constant and less than the first spring constant, third indexing-pin spring 123 results in plunger 113 translating toward indexing-pin second end 115 after indexing pin 112 translates away out of indexing-pin-assembly receptacle 172 and before clamping sleeve 111 translates toward indexing-pin second end 115, as pneumatic pressure in indexing-pin-assembly receptacle 172 increases. In other words, during operation of indexing-pin assembly 103, as pneumatic pressure in indexing-pin-assembly receptacle 172 is increased, first, indexing pin 112 will extend out of indexing-pin-assembly receptacle 172 and into locating hole 510, second, plunger 113 will translates toward indexing-pin second end 115 and expand fingers 116 of indexing pin 112, and third, clamping sleeve 111 will translate toward indexing-pin second end 115 and clamp first panel 500 between clamping sleeve 111 and the finger-flanges of fingers 116.

Referring generally to FIG. 1 and particularly to, e.g., FIGS. 2-8, 10, 11, 13, and 14, shank-fastener turret 102 comprises shank-fastener-turret trailing side 180 and shank-fastener-turret leading side 181. Shank-fastener-turret leading side 181 opposes shank-fastener-turret trailing side 180. Each of drill 104 and shank-fastener delivery assembly 105 is positioned in shank-fastener turret 102 to cooperate with receiver-fastener apparatus 200 at shank-fastener-turret leading side 181. The preceding subject matter of this paragraph characterizes example 15 of the present disclosure, wherein example 15 also includes the subject matter according to any one of examples 1 to 14, above.

In one or more examples, by each being positioned at shank-fastener-turret leading side 181, drill 104 and shank-fastener delivery assembly 105 cooperate with receiver-fastener apparatus 200 to operatively drill holes and install two-piece fastening systems.

Referring generally to FIG. 1 and particularly to, e.g., FIGS. 8-11, shank-fastener turret 102 further comprises drill receptacle 183 that extends into shank-fastener turret 102 from shank-fastener-turret leading side 181. Drill 104 is positioned in drill receptacle 183. Drill receptacle 183 is sized for drill 104 to move along drill axis C within drill receptacle 183. The preceding subject matter of this paragraph characterizes example 16 of the present disclosure, wherein example 16 also includes the subject matter according to example 15, above.

With drill 104 positioned in drill receptacle 183, the overall volume of shank-fastener apparatus 100 is compact.

Additionally, drill receptacle 183 forms drill chamber 182 between drill 104 and shank-fastener-turret trailing side 180 for the introduction and removal of pneumatic pressure to push drill 104 toward first panel 500 and second panel 502 for drilling drilled hole 508 through first panel 500 and second panel 502 and to retract drill 104 away from first panel 500 and second panel 502 after drilled hole 508 is drilled.

Referring generally to FIG. 1 and particularly to, e.g., FIGS. 8-11, drill 104 comprises drill housing 130, drill spindle 131, and motor 134. Drill housing 130 is positioned in drill receptacle 183 of shank-fastener turret 102. Drill spindle 131 is positioned in drill housing 130. Motor 134 is operatively connected to drill spindle 131 to apply a force to rotate drill bit 132, held by drill spindle 131. The preceding subject matter of this paragraph characterizes example 17 of the present disclosure, wherein example 17 also includes the subject matter according to example 16, above.

As mentioned, with drill 104, including drill housing 130, being positioned in drill receptacle 183, the overall volume of shank-fastener apparatus 100 is compact.

Referring generally to FIG. 1 and particularly to, e.g., FIGS. 8-11, drill 104 further comprises gear train 162 that operatively couples motor 134 and drill spindle 131. The preceding subject matter of this paragraph characterizes example 18 of the present disclosure, wherein example 18 also includes the subject matter according to example 17, above.

Gear train 162 transfers the rotational output of motor 134 to drill spindle 131 and thus to drill bit 132.

Referring generally to FIG. 1 and particularly to, e.g., FIGS. 8-11, drill 104 further comprises chuck nut 163, configured to attach drill bit 132 to drill spindle 131. The preceding subject matter of this paragraph characterizes example 19 of the present disclosure, wherein example 19 also includes the subject matter according to example 17 or 18, above.

Chuck nut 163 provides a mechanism for selective attachment and detachment of drill bit 132, making it possible to use different configurations of drill bits with shank-fastener apparatus 100.

Referring generally to FIG. 1 and particularly to, e.g., FIGS. 8-11, drill 104 further comprises housing support spring 137 that biases drill housing 130 away from shank-fastener-turret leading side 181. Housing support spring 137 is positioned between drill housing 130 and shank-fastener turret 102. The preceding subject matter of this paragraph characterizes example 20 of the present disclosure, wherein example 20 also includes the subject matter according to any one of examples 17 to 19, above.

As indicated, housing support spring 137 biases drill housing 130 away from shank-fastener-turret leading side 181, and thus toward shank-fastener-turret trailing side 180. Accordingly, when pneumatic pressure in drill chamber 182 sufficiently overcomes the spring force of housing support spring 137, drill housing 130 will translate within drill receptacle 183 toward shank-fastener-turret leading side 181. When pneumatic pressure in drill chamber 182 falls below a threshold pressure, housing support spring 137 will translate drill housing 130 back toward shank-fastener-turret trailing side 180.

Referring generally to FIG. 1 and particularly to, e.g., FIGS. 2 and 8-11, drill 104 further comprises pressure foot 136 and pressure-foot spring 135. Pressure foot 136 extends out of shank-fastener turret 102 via shank-fastener-turret leading side 181. Pressure-foot spring 135 is located between pressure foot 136 and drill housing 130 to bias pressure foot 136 away from drill housing 130. The preceding subject matter of this paragraph characterizes example 21 of the present disclosure, wherein example 21 also includes the subject matter according to example 20, above.

Pressure foot 136 provides stability to drill 104 during a drilling operation. As indicated, pressure-foot spring 135 biases pressure foot 136 away from drill housing 130. Accordingly, when drill 104 translates toward first panel 500 and second panel 502, upon pressure foot 136 engaging one of first panel 500 and second panel 502 and as drilling housing 130 continues to translate toward first panel 500 and second panel 502, pressure-foot spring 135 compresses and thereby applies a stabilizing force to drill housing 130 relative to first panel 500 and second panel 502.

Referring generally to FIG. 1 and particularly to, e.g., FIG. 11, shank-fastener turret 102 further comprises shank-fastener-delivery-assembly receptacle 184 that extends into shank-fastener-turret leading side 181. Shank-fastener delivery assembly 105 is positioned in shank-fastener-delivery-assembly receptacle 184. The preceding subject matter of this paragraph characterizes example 22 of the present disclosure, wherein example 22 also includes the subject matter according to any one of examples 15 to 21, above.

With shank-fastener delivery assembly 105 positioned in shank-fastener-delivery-assembly receptacle 184, the overall volume of shank-fastener apparatus 100 is compact. Additionally, shank-fastener-delivery-assembly receptacle 184 forms piston chamber 186 for the introduction and removal of pneumatic pressure for operation of push rod 149, as discussed herein.

Referring generally to FIG. 1 and particularly to, e.g., FIGS. 3 and 11, shank-fastener apparatus 100 further comprises shank-fastener-delivery-assembly-receptacle pressure-supply port 146 that extends between shank-fastener-delivery-assembly receptacle 184 and shank-fastener-turret trailing side 180. Shank-fastener-delivery-assembly-receptacle pressure-supply port 146 is configured to move pressurized fluid into shank-fastener-delivery-assembly receptacle 184. The preceding subject matter of this paragraph characterizes example 23 of the present disclosure, wherein example 23 also includes the subject matter according to example 22, above.

When pressurized fluid (e.g., air) enters shank-fastener-delivery-assembly receptacle 184 via shank-fastener-delivery-assembly-receptacle pressure-supply port 146 and overcomes the spring force of push-rod spring 159, push rod 149 translates away from shank-fastener-turret trailing side 180 to operatively deliver one of shank fasteners 504 into drilled hole 508.

Referring generally to FIG. 1 and particularly to, e.g., FIGS. 3, 8, 11, and 12, shank-fastener delivery assembly 105 comprises plug 157 that seals shank-fastener-delivery-assembly receptacle 184 toward shank-fastener-turret trailing side 180. The preceding subject matter of this paragraph characterizes example 24 of the present disclosure, wherein example 24 also includes the subject matter according to example 22 or 23, above.

As indicated, plug 157 seals shank-fastener-delivery-assembly receptacle 184. Accordingly, when pneumatic pressure is introduced into shank-fastener-delivery-assembly receptacle 184 via shank-fastener-delivery-assembly-receptacle pressure-supply port 146, the pneumatic pressure will act on plug 157, together with the walls of shank-fastener-delivery-assembly receptacle 184 and piston 158, to translate piston 158, push rod 149, and retainer 147 toward first panel 500 and second panel 502 for operative delivery of one of shank fasteners 504 into drilled hole 508.

Referring generally to FIG. 1 and particularly to, e.g., FIGS. 2, 8, and 11-14, shank-fastener delivery assembly 105 comprises magazine 138 and retainer 147. Magazine 138 is sized to hold shank fasteners 504, and retainer 147 is positioned adjacent to magazine 138 to receive one of shank fasteners 504 from magazine 138. The preceding subject matter of this paragraph characterizes example 25 of the present disclosure, wherein example 25 also includes the subject matter according to any one of examples 15 to 24, above.

Magazine 138 holds a supply of shank fasteners 504 so that, in one or more examples, shank-fastener apparatus 100, together with receiver-fastener apparatus 200, is used to install multiple two-piece fastening systems before needing to reload shank-fastener apparatus 100 with shank fasteners 504. Retainer 147 is the structure of shank-fastener delivery assembly 105 that receives an individual one of shank fasteners 504 from magazine 138 and operatively delivers it to drilled hole 508, responsive to piston 158 and push rod 149 translating away from shank-fastener-turret trailing side 180, against the spring force of push-rod spring 159, responsive to the introduction of pneumatic pressure within shank-fastener-delivery-assembly receptacle 184.

Referring generally to FIG. 1 and particularly to, e.g., FIGS. 2, 12, and 13, magazine 138 comprises magazine body 148, shank-fastener outlet 145, and magazine slot 143, which extends into magazine body 148 from shank-fastener outlet 145. The preceding subject matter of this paragraph characterizes example 26 of the present disclosure, wherein example 26 also includes the subject matter according to example 25, above.

Magazine slot 143 retains shank fasteners 504 in a single file line within magazine body 148 for sequential delivery to retainer 147 via shank-fastener outlet 145.

In one or more examples, magazine slot 143 comprises shelf 142 for engagement with the flanges of shank fasteners 504.

In one or more examples, such as illustrated in the drawings, magazine slot 143 is open on one or both of first magazine side 140 or second magazine side 141. When magazine slot 143 is open on first magazine side 140, in one or more examples, shank fasteners 504 is inserted into magazine slot 143 via first magazine side 140 when magazine 138 is removed from shank-fastener turret 102. When magazine slot 143 is open on second magazine side 141, shank fasteners 504 are visible via shank-fastener-turret leading side 181 so that visual inspection of shank-fastener apparatus 100 communicates whether or not magazine 138 needs to be refilled with additional ones of shank fasteners 504.

With reference to FIG. 14, shank-fastener turret 102 comprises magazine pressure-supply port 139 extending from shank-fastener-turret trailing side 180 to magazine slot 143 for delivery of pneumatic pressure in the form of an air jet for pushing shank fasteners 504 held in magazine slot 143 toward shank-fastener outlet 145.

Referring generally to FIG. 1 and particularly to, e.g., FIGS. 2 and 13, retainer 147 is positioned at shank-fastener-turret leading side 181. The preceding subject matter of this paragraph characterizes example 27 of the present disclosure, wherein example 27 also includes the subject matter according to example 25 or 26, above.

By being positioned at shank-fastener-turret leading side 181, retainer 147 is positioned to easily deliver one of shank fasteners 504 to drilled hole 508. That is, the travel of piston 158 and push rod 149 is minimized.

Referring generally to FIG. 1 and particularly to, e.g., FIG. 12, retainer 147 comprises first retainer side 152 and second retainer side 153 that is opposite first retainer side 152. Retainer 147 also comprises hollow interior space 155 that extends between first retainer side 152 and second retainer side 153 and that is sized to contain one of shank fasteners 504 from magazine 138. The preceding subject matter of this paragraph characterizes example 28 of the present disclosure, wherein example 28 also includes the subject matter according to any one of examples 25 to 27, above.

Hollow interior space 155 therefore is configured to receive a single one of shank fasteners 504 from magazine 138 for operative delivery to drilled hole 508.

Referring generally to FIG. 1 and particularly to, e.g., FIG. 12, retainer 147 further comprises retainer slot 156 that extends into hollow interior space 155. Retainer slot 156 is aligned with magazine 138 to enable one of shank fasteners 504 to move from magazine 138, through retainer slot 156, and into hollow interior space 155. The preceding subject matter of this paragraph characterizes example 29 of the present disclosure, wherein example 29 also includes the subject matter according to example 28, above.

By being aligned with magazine 138, and more specifically with magazine slot 143, shank fasteners 504 are easily transferred directly from magazine 138 to retainer 147 for subsequent delivery to drilled hole 508 by shank-fastener delivery assembly 105.

Referring generally to FIG. 1 and particularly to, e.g., FIGS. 12 and 13, magazine 138 is configured to contain shank fasteners 504 in a row that is aligned with retainer slot 156. The preceding subject matter of this paragraph characterizes example 30 of the present disclosure, wherein example 30 also includes the subject matter according to example 29, above.

As mentioned, by being in a single file line, or row, within magazine 138, shank fasteners 504 are positioned for sequential delivery to retainer 147 and subsequent insertion through drilled hole 508.

Referring generally to FIG. 1 and particularly to, e.g., FIGS. 2, 8, and 11-13, retainer 147 further comprises flaps 154 at second retainer side 153. Flaps 154 are partially circumferentially spaced about hollow interior space 155 to temporarily retain one of shank fasteners 504 in an operative position. Two of flaps 154 at least partially define retainer slot 156. The preceding subject matter of this paragraph characterizes example 31 of the present disclosure, wherein example 31 also includes the subject matter according to example 29 or 30, above.

Flaps 154, which are biased radially inward toward, engage the shaft of the shank fastener being held by retainer 147 and expand as the flange of the shank fastener passes out of hollow interior space 155 when the shank fastener is being delivered to drilled hole 508.

Referring generally to FIG. 1 and particularly to, e.g., FIGS. 8, 11, and 12, shank-fastener delivery assembly 105 further comprises push rod 149. Push rod 149 is aligned with retainer 147 and is configured to contact one of shank fasteners 504 in retainer 147 and to drive the one of shank fasteners 504 from hollow interior space 155 of retainer 147. The preceding subject matter of this paragraph characterizes example 32 of the present disclosure, wherein example 32 also includes the subject matter according to example 31, above.

That is, push rod 149 engages the shank fastener being held by retainer 147 and pushes it out hollow interior space 155 of retainer 147 for insertion into drilled hole 508.

Referring generally to FIG. 1 and particularly to, e.g., FIGS. 8, 11, and 12, push rod 149 has an elongated shape and comprises first push-rod end 150 and second push-rod end 151 that is axially opposite to first push-rod end 150. Shank-fastener delivery assembly 105 further comprises piston 158, positioned at second push-rod end 151. The preceding subject matter of this paragraph characterizes example 33 of the present disclosure, wherein example 33 also includes the subject matter according to example 32, above.

Piston 158 reacts against pneumatic pressure within piston chamber 186 of shank-fastener-delivery-assembly receptacle 184 to force push rod 149 away from shank-fastener-turret trailing side 180.

Referring generally to FIG. 1 and particularly to, e.g., FIGS. 8, 11, and 12, shank-fastener delivery assembly 105 further comprises push-rod spring 159 that biases push rod 149 away from retainer 147 and toward shank-fastener-turret trailing side 180. The preceding subject matter of this paragraph characterizes example 34 of the present disclosure, wherein example 34 also includes the subject matter according to example 32 or 33, above.

Push-rod spring 159 forces push rod 149 and piston 158 back toward shank-fastener-turret trailing side 180 upon reduction of pneumatic pressure within piston chamber 186, so that a subsequent one of shank fasteners 504 may then translate into retainer 147 for its subsequent insertion into a drilled hole.

Referring generally to FIG. 1 and particularly to, e.g., FIGS. 8, 11, and 12, retainer 147 comprises opening 160 in first retainer side 152. Opening 160 is sized to receive push rod 149 when push rod 149 drives one of shank fasteners 504 from hollow interior space 155 of retainer 147 and away from shank-fastener-turret trailing side 180. The preceding subject matter of this paragraph characterizes example 35 of the present disclosure, wherein example 35 also includes the subject matter according to any one of examples 32 to 34, above.

Accordingly, in one or more examples, push rod 149 fully drives shank fastener 504 from hollow interior space 155 and into drill hole 508.

Referring generally to FIG. 1 and particularly to, e.g., FIGS. 15-24, receiver-fastener apparatus 200 is disclosed. Receiver-fastener apparatus 200 is for joining, in concert with shank-fastener apparatus 100, first panel 500 and second panel 502, at least partially overlapping each other. Receiver-fastener apparatus 200 comprises receiver-fastener housing 270, receiver-fastener turret 202, indexing-collet assembly 203, anvil 204, receiver-fastener delivery assembly 205, and swager assembly 206. Receiver-fastener turret 202 is supported by receiver-fastener housing 270 and is selectively rotatable relative to receiver-fastener housing 270 about receiver-fastener-turret rotation axis Z. Indexing-collet assembly 203 is supported by receiver-fastener housing 270 and is selectively movable relative to receiver-fastener housing 270 between an indexing-collet-assembly extended position and an indexing-collet-assembly retracted position along indexing-collet-assembly axis Y that is parallel to receiver-fastener-turret rotation axis Z. Anvil 204 is supported by receiver-fastener turret 202 and is selectively movable relative to receiver-fastener turret 202 along anvil axis X that is parallel to receiver-fastener-turret rotation axis Z. Receiver-fastener delivery assembly 205 is supported by receiver-fastener turret 202 and is configured to operatively position receiver fasteners 506 for operative placement on shank fasteners 504, corresponding to receiver fasteners 506. Swager assembly 206 also is supported by receiver-fastener turret 202 and is movable relative to receiver-fastener turret 202 along swaging axis W that is parallel to receiver-fastener-turret rotation axis Z. The preceding subject matter of this paragraph characterizes example 36 of the present disclosure.

Indexing-collet assembly 203 enables receiver-fastener apparatus 200 to be temporarily fixed to shank-fastener apparatus 100, and thus relative to first panel 500 and second panel 502, while the various component tools of receiver-fastener apparatus 200 function. More specifically, indexing-collet assembly 203 is configured to couple to indexing-pin assembly 103 of shank-fastener apparatus 100 when indexing-pin assembly 103 is secured to locating hole 510. In addition, when indexing-collet assembly 203 is coupled to indexing-pin assembly 103, and thus when both of shank-fastener apparatus 100 and receiver-fastener apparatus 200 are fixed relative to first panel 500 and second panel 502, receiver-fastener turret 202 can then be rotated relative to receiver-fastener housing 270 to align anvil 204 with drill 104 and for placement of one of receiver fasteners 506 for insertion of one of shank fasteners 504 via drill hole 508, and subsequently rotated to align swager assembly 206 with the placed receiver fastener for swaging onto the shank fastener.

Indexing-collet assembly 203 is configured to transit between an indexing-collet-assembly extended position and an indexing-collet-assembly retracted position so that it may be selectively extended to be coupled to indexing-pin assembly 103 of shank-fastener apparatus 100 at locating hole 510. Moreover, by having an indexing-collet-assembly retracted position, indexing-collet assembly 203 is drawn into receiver-fastener turret 202, providing for a compact volume of receiver-fastener apparatus 200 as it is manipulated into place for operation, which location may be confined with limited access.

Receiver-fastener turret 202 is rotatable relative to receiver-fastener housing 270, so that once receiver-fastener apparatus 200 is coupled to shank-fastener apparatus 100 and thus is secured relative to first panel 500 and second panel 502 by indexing-collet assembly 203, it is possible to selectively position the tools, supported by receiver-fastener turret 202 (i.e., anvil 204, receiver-fastener delivery assembly 205, and swager assembly 206), relative to first panel 500 and second panel 502 for operation thereof. That is, in one or more examples, anvil 204 is positioned for countering the force of drill 104 and for operative placement of one of receiver fasteners 506, and subsequently receiver-fastener delivery assembly 205 is positioned for swager assembly 206 to swage a receiver fastener onto a shank fastener, extending through the receiver fastener, as discussed herein.

In one or more examples, receiver-fastener apparatus 200 illustrated herein comprises two indexing-collet assemblies. Although not required in all examples of receiver-fastener apparatus 200, by having two indexing-collet assemblies, receiver-fastener apparatus 200 is more versatile than if only one indexing-collet assembly 203 were included, such as depending on the location of locating hole 510 relative to point P.

In one or more examples, anvil 204 comprises internal bore 238 extending therethrough. When present, internal bore 238 provides a volume into which drill bit 132 operated by drill 104 of shank-fastener apparatus 100 extends during a drilling of drilled hole 508. In addition, internal bore 238 provides a volume into which chips (or swarf) resulting from a drilling operation may be collected and removed.

Referring generally to FIG. 1 and particularly to, e.g., FIGS. 15-24, receiver-fastener housing 270 extends at least partially around receiver-fastener turret 202 and comprises receiver-fastener-housing mounting flanges 273. The preceding subject matter of this paragraph characterizes example 37 of the present disclosure, wherein example 37 also includes the subject matter according to example 36, above.

By extending at least partially around receiver-fastener turret 202, receiver-fastener housing 270 provides a foundation, or base, with respect to which it is possible for receiver-fastener turret 202 to rotate for operative placement of anvil 204, receiver-fastener delivery assembly 205, and swager assembly 206. Receiver-fastener-housing mounting flanges 273 provide structure for mounting receiver-fastener apparatus 200 to second robotic device 602, as shown in FIG. 41.

Referring generally to FIG. 1 and particularly to, e.g., FIGS. 15, 17, and 18, receiver-fastener housing 270 comprises indexing-collet-assembly receptacle 272 that houses indexing-collet assembly 203. The preceding subject matter of this paragraph characterizes example 38 of the present disclosure, wherein example 38 also includes the subject matter according to example 36 or 37, above.

Indexing-collet-assembly receptacle 272 enables indexing-collet assembly 203 to be deployed and retracted between the indexing-collet-assembly retracted positon and the indexing-collet-assembly extended position. Moreover, indexing-collet-assembly receptacle 272 provides structure for the linear translation of collet sleeve 220 of indexing-collet assembly 203, as well as structure against which second indexing-collet spring 232 reacts for translation of collet sleeve 220, as discussed herein.

Referring generally to FIG. 1 and particularly to, e.g., FIGS. 17 and 18, indexing-collet-assembly receptacle 272 comprises indexing-collet-assembly-receptacle first end 275 and indexing-collet-assembly-receptacle second end 276. Indexing-collet-assembly-receptacle second end 276 is located axially opposite first indexing-collet-assembly-receptacle first end 275. Indexing-collet-assembly receptacle 272 comprises indexing-collet-assembly-receptacle inlet 269. Indexing-collet-assembly-receptacle inlet 269 is located at indexing-collet-assembly-receptacle first end 275 and is configured to supply pressurized fluid to indexing-collet-assembly receptacle 272 to move indexing-collet assembly 203 between the indexing-collet-assembly extended position and the indexing-collet-assembly retracted position. Indexing-collet-assembly-receptacle second end 276 is configured to enable indexing-collet assembly 203 to move to the indexing-collet-assembly extended position. The preceding subject matter of this paragraph characterizes example 39 of the present disclosure, wherein example 39 also includes the subject matter according to example 38, above.

Indexing-collet-assembly-receptacle second end 276 is open to permit indexing-collet assembly 203 to extend from the indexing-collet-assembly retracted position to the indexing-collet-assembly extended position. The pressurized fluid (e.g., air) enters indexing-collet-assembly-receptacle first end 275 via indexing-collet-assembly-receptacle inlet 269 to sequentially overcome the spring forces of first indexing-collet spring 231 and second indexing-collet spring 232 to cause indexing-collet assembly 203 to transition to the indexing-collet-assembly extended position, as discussed herein.

Referring generally to FIG. 1 and particularly to, e.g., FIGS. 17 and 18, indexing-collet assembly 203 comprises collet sleeve 220 and indexing collet 219. Indexing collet 219 is positioned within collet sleeve 220. Collet sleeve 220 and indexing collet 219 are movable relative to each other along indexing-collet-assembly axis Y. The preceding subject matter of this paragraph characterizes example 40 of the present disclosure, wherein example 40 also includes the subject matter according to example 39, above.

Indexing collet 219 provides structure for engagement and coupling with indexing pin 112 of indexing-pin assembly 103 of shank-fastener apparatus 100. Collet sleeve 220 translates over indexing collet 219 and toward indexing-collet second end 225 to squeeze indexing-collet second end 225 radially inward toward indexing-collet-assembly axis Y for clamping indexing collet 219 to indexing pin 112.

Referring generally to FIG. 1 and particularly to, e.g., FIGS. 17 and 18, collet sleeve 220 comprises collet-sleeve first end 222 and collet-sleeve second end 223 that is axially opposite collet-sleeve first end 222. Indexing collet 219 comprises indexing-collet first end 224 and indexing-collet second end 225 that is axially opposite indexing-collet first end 224. Indexing collet 219 extends through collet-sleeve second end 223. The preceding subject matter of this paragraph characterizes example 41 of the present disclosure, wherein example 41 also includes the subject matter according to example 40, above.

Because indexing collet 219 extends through collet-sleeve second end 223, it is possible for collet sleeve 220 to translate alone indexing collet 219 for squeezing indexing-collet second end 225 radially inward toward indexing-collet-assembly axis Y for clamping indexing collet 219 to indexing pin 112.

Referring generally to FIG. 1 and particularly to, e.g., FIGS. 17 and 18, collet sleeve 220 comprises tapered inner surface 226 that is proximate to indexing-collet second end 225 and that extends inward from collet-sleeve second end 223 toward indexing-collet-assembly axis Y. Indexing collet 219 comprises tapered outer surface 227 that is configured to contact tapered inner surface 226 of collet sleeve 220. Indexing collet 219 also comprises legs 228 that are proximate to indexing-collet second end 225 and that are configured to bend relative to indexing-collet-assembly axis Y. The preceding subject matter of this paragraph characterizes example 42 of the present disclosure, wherein example 42 also includes the subject matter according to example 41, above.

As collet sleeve 220 translates along indexing collet 219 toward indexing-collet second end 225, tapered inner surface 226 of collet sleeve 220 engages tapered outer surface 227 of indexing collet 219 to squeeze legs 228 radially inward toward indexing-collet-assembly axis Y for clamping indexing collet 219 to indexing pin 112 of indexing-pin assembly 103 of shank-fastener apparatus 100. By being bendable relative to indexing-collet-assembly axis Y, legs 228 bend inward to clamp against indexing pin 112.

Referring generally to FIG. 1 and particularly to, e.g., FIGS. 17 and 18, each of legs 228 comprises inward clamping surface 230 at indexing-collet second end 225. Inward clamping surface 230 of each of legs 228 faces indexing-collet-assembly axis Y. The preceding subject matter of this paragraph characterizes example 43 of the present disclosure, wherein example 43 also includes the subject matter according to example 42, above.

Inward clamping surface 230 provides an engagement surface for clamping indexing pin 112 of indexing-pin assembly 103 of shank-fastener apparatus 100.

Referring generally to FIG. 1 and particularly to, e.g., FIGS. 17 and 18, when indexing-collet assembly 203 is in the indexing-collet-assembly retracted position, collet sleeve 220 is retracted into receiver-fastener housing 270 and collet-sleeve second end 223 is positioned in receiver-fastener housing 270. When indexing-collet assembly 203 is in the indexing-collet-assembly extended position, collet sleeve 220 extends from receiver-fastener housing 270 and collet-sleeve second end 223 is positioned outside of receiver-fastener housing 270. The preceding subject matter of this paragraph characterizes example 44 of the present disclosure, wherein example 44 also includes the subject matter according to any one of examples 41 to 43, above.

Referring generally to FIG. 1 and particularly to, e.g., FIGS. 17 and 18, indexing-collet assembly 203 further comprises first indexing-collet spring 231 that is positioned between collet-sleeve first end 222 and indexing-collet first end 224. First indexing-collet spring 231 applies a first spring force to bias indexing-collet first end 224 toward collet-sleeve first end 222 and thus to retract indexing collet 219 into collet sleeve 220. The preceding subject matter of this paragraph characterizes example 45 of the present disclosure, wherein example 45 also includes the subject matter according to any one of examples 41 to 44, above.

As indicated, first indexing-collet spring 231 biases indexing-collet first end 224 toward collet-sleeve first end 222. Accordingly, indexing collet 219 remains retracted until pneumatic pressure within indexing-collet-assembly receptacle 272 overcomes the spring force of first indexing-collet spring 231, at which point, indexing collet 219 translates toward indexing pin 112 of indexing-pin assembly 103 of shank-fastener apparatus 100 for engagement therewith.

Referring generally to FIG. 1 and particularly to, e.g., FIGS. 17 and 18, indexing-collet assembly 203 further comprises second indexing-collet spring 232 that is positioned between indexing-collet-assembly-receptacle first end 275 and collet-sleeve first end 222. Second indexing-collet spring 232 applies a second spring force to bias collet-sleeve first end 222 toward indexing-collet-assembly-receptacle first end 275 and thus to retract collet sleeve 220 toward indexing-collet-assembly-receptacle first end 275. The preceding subject matter of this paragraph characterizes example 46 of the present disclosure, wherein example 46 also includes the subject matter according to example 45, above.

As indicated, second indexing-collet spring 232 biases collet-sleeve first end 222 toward indexing-collet-assembly-receptacle first end 275. Accordingly, collet sleeve 220 remains retracted until pneumatic pressure within indexing-collet-assembly receptacle 272 overcomes the spring force of second indexing-collet spring 232, at which point, collet sleeve 220 translates toward indexing-collet second end 225 to squeeze legs 228 toward indexing-collet-assembly axis Y and thus to clamp indexing collet 219 to indexing pin 112 of indexing-pin assembly 103 of shank-fastener apparatus 100.

Referring generally to FIG. 1 and particularly to, e.g., FIGS. 17 and 18, the second spring force is greater than the first spring force. The preceding subject matter of this paragraph characterizes example 47 of the present disclosure, wherein example 47 also includes the subject matter according to example 46, above.

Because the spring force of second indexing-collet spring 232 is greater than the spring force of first indexing-collet spring 231, as pneumatic pressure within indexing-collet-assembly receptacle 272 increases, indexing collet 219 will extend prior in time to collet sleeve 220. As a result, collet sleeve 220 will not squeeze legs 228 until indexing collet 219 is already in place and engaged with indexing pin 112 of indexing-pin assembly 103 of shank-fastener apparatus 100. Conversely, as pneumatic pressure within indexing-collet-assembly receptacle 272 decreases, collet sleeve 220 will retract prior to indexing collet 219. As a result, collet sleeve 220 will release its pressure on legs 228 prior to indexing collet 219 disengaging from indexing pin 112 of indexing-pin assembly 103 of shank-fastener apparatus 100.

Referring generally to FIG. 1 and particularly to, e.g., FIGS. 15, 16, and 19-24, receiver-fastener turret 202 comprises receiver-fastener-turret trailing side 280 and receiver-fastener-turret leading side 281 that opposes receiver-fastener-turret trailing side 280. Each of anvil 204, receiver-fastener delivery assembly 205, and swager assembly 206 is positioned in receiver-fastener turret 202 to cooperate with shank-fastener apparatus 100 at receiver-fastener-turret leading side 281. The preceding subject matter of this paragraph characterizes example 48 of the present disclosure, wherein example 48 also includes the subject matter according to any one of examples 36 to 47, above.

By each being positioned at receiver-fastener-turret leading side 281, anvil 204, receiver-fastener delivery assembly 205, and swager assembly 206 cooperate with shank-fastener apparatus 100 to operatively drill holes and install two-piece fastening systems.

Referring generally to FIG. 1 and particularly to, e.g., FIG. 19, receiver-fastener turret 202 further comprises anvil receptacle 282 that extends into receiver-fastener turret 202 from receiver-fastener-turret leading side 281. Anvil 204 is positioned in anvil receptacle 282. Anvil receptacle 282 is sized for anvil 204 to move along anvil axis X within anvil receptacle 282. The preceding subject matter of this paragraph characterizes example 49 of the present disclosure, wherein example 49 also includes the subject matter according to example 48, above.

Anvil 204 moves along anvil axis X to selectively extend from receiver-fastener turret 202 for engagement with one of first panel 500 or second panel 502 to counteract the force of drill 104 as drilled hole 508 is being cut.

Referring generally to FIG. 1 and particularly to, e.g., FIG. 19, anvil 204 is configured to move along anvil axis X within anvil receptacle 282 responsive to pneumatic pressure against anvil 204. The preceding subject matter of this paragraph characterizes example 50 of the present disclosure, wherein example 50 also includes the subject matter according to example 49, above.

As with various other ones of tools of receiver-fastener apparatus 200 and shank-fastener apparatus 100, pneumatic pressure is an efficient mechanism for operation of anvil 204. Most manufacturing facilities readily have shop air available at appropriate pressures for attachment and use with various tools.

Referring generally to FIG. 1 and particularly to, e.g., FIG. 20, receiver-fastener turret 202 further comprises receiver-fastener receptacle 290 that extends into receiver-fastener turret 202 from receiver-fastener-turret leading side 281 along receiver-fastener-receptacle axis V. Receiver-fastener receptacle 290 is configured to contain receiver fasteners 506 for operative placement of one of receiver fasteners 506 for insertion of a corresponding one of shank fasteners 504 at receiver-fastener-turret leading side 281. The preceding subject matter of this paragraph characterizes example 51 of the present disclosure, wherein example 51 also includes the subject matter according to any one of examples 48 to 50, above.

Receiver-fastener receptacle 290 holds a supply of receiver fasteners 506 so that, in one or more examples, receiver-fastener apparatus 200, together with shank-fastener apparatus 100, are used to install multiple two-piece fastening systems before needing to relate receiver-fastener apparatus 200 with receiver fasteners 506.

Referring generally to FIG. 1 and particularly to, e.g., FIGS. 16 and 20, receiver-fastener receptacle 290 extends through receiver-fastener turret 202 from receiver-fastener-turret leading side 281 to receiver-fastener-turret trailing side 280. Receiver-fastener apparatus 200 further comprises cap 291 that blocks receiver-fastener receptacle 290 at receiver-fastener-turret trailing side 280 to retain receiver fasteners 506 in receiver-fastener receptacle 290. The preceding subject matter of this paragraph characterizes example 52 of the present disclosure, wherein example 52 also includes the subject matter according to example 51, above.

Cap 291 is removable, making it possible to load receiver fasteners 506 into receiver-fastener receptacle 290 via receiver-fastener-turret trailing side 280. Not only does cap 291 retain receiver fasteners 506 in receiver-fastener receptacle 290, but it also provides structure against which receiver-fastener-receptacle spring 293 reacts for pushing receiver fasteners 506 toward receiver-fastener-turret leading side 281.

Referring generally to FIG. 1 and particularly to, e.g., FIG. 20, receiver-fastener apparatus 200 further comprises receiver-fastener-receptacle spring 293 that is positioned in receiver-fastener receptacle 290 to bias receiver fasteners 506 toward receiver-fastener-turret leading side 281. The preceding subject matter of this paragraph characterizes example 53 of the present disclosure, wherein example 53 also includes the subject matter according to example 51 or 52, above.

As indicated, receiver-fastener-receptacle spring 293 biases receiver fasteners 506 toward receiver-fastener-turret leading side 281, and thus toward a position at receiver-fastener-turret leading side 281 for holder 236 to operatively move one of receiver fasteners 506 for insertion of a corresponding one of shank fasteners 504.

Referring generally to FIG. 1 and particularly to, e.g., FIGS. 15, 21, and 22, receiver-fastener delivery assembly 205 comprises holder 236 that is supported by receiver-fastener turret 202 at receiver-fastener-turret leading side 281. Holder 236 is configured to hold one of receiver fasteners 506 and operatively place the one of receiver fasteners 506 for operative insertion of the corresponding one of shank fasteners 504. Holder 236 is selectively pivotable relative to receiver-fastener turret 202 in a plane that is perpendicular to receiver-fastener-turret rotation axis Z to move one of receiver fasteners 506 from receiver-fastener-receptacle axis V to anvil axis X for operative insertion of the corresponding one of shank fasteners 504. The preceding subject matter of this paragraph characterizes example 54 of the present disclosure, wherein example 54 also includes the subject matter according to any one of examples 51 to 53, above.

By holder 236 moving one of receiver fasteners 506 to be aligned with anvil axis X, receiver-fastener turret 202 need not rotate for operative placement of receiver fasteners 506, since drilled hole 508 was drilled with anvil axis X coaxial with drill axis C.

In one or more examples, receiver-fastener delivery assembly 205 also comprises pivoting device 241 and return spring 242. Return spring 242 biases holder 236 to a pivoted position for operative receipt of one of receiver fasteners 506 from receiver-fastener receptacle 290. Pivoting device 241, when actuated (e.g., via pneumatic pressure), selectively pivots holder 236 against the bias of return spring 242 for operative movement of a receiver fastener held by holder to anvil axis X.

Referring generally to FIG. 1 and particularly to, e.g., FIGS. 23 and 24, receiver-fastener turret 202 further comprises swager receptacle 284 that extends into receiver-fastener turret 202 from receiver-fastener-turret leading side 281. Swager assembly 206 is positioned in swager receptacle 284. Swager receptacle 284 is sized for swager assembly 206 to move along swaging axis W within swager receptacle 284. The preceding subject matter of this paragraph characterizes example 55 of the present disclosure, wherein example 55 also includes the subject matter according to any one of examples 48 to 54, above.

By being movable along swaging axis W, in one or more examples, swager assembly 206 is selectively extended for swaging a receiver fastener on a shank fastener. Moreover, in one or more examples, swager assembly 206 is retracted into swager receptacle 284 so that the volume of receiver-fastener apparatus 200 is compact for manipulation into place for operation.

Referring generally to FIG. 1 and particularly to, e.g., FIGS. 23 and 24, swager assembly 206 comprises swager 207 and at least one piston 245. At least one piston 245 is coupled to swager 207 and is configured to move swager assembly 206 along swaging axis W responsive to pneumatic pressure against at least one piston 245. The preceding subject matter of this paragraph characterizes example 56 of the present disclosure, wherein example 56 also includes the subject matter according to example 55, above.

At least one piston 245 provides structure against which the pneumatic pressure reacts for operative movement of swager assembly 206.

In one or more examples, receiver-fastener turret 202 comprises at least one piston chamber 248, through which at least one piston 245 travels, and in which pneumatic pressure is used to cause at least one piston 245 to move, for example, depending on which side of piston the pneumatic pressure is greater.

In one or more examples, swager 207 is Model Number PR3228-1, manufactured by Arconic Fastening Systems of Kingston, N.Y. USA.

Referring generally to FIG. 1 and particularly to, e.g., FIGS. 25-41, system 1000 for joining first panel 500 and second panel 502, at least partially overlapping each other, is disclosed. System 1000 comprises shank-fastener apparatus 100 and receiver-fastener apparatus 200. Shank-fastener apparatus 100 comprises shank-fastener housing 170, shank-fastener turret 102, indexing-pin assembly 103, drill 104, and shank-fastener delivery assembly 105. Shank-fastener turret 102 is supported by shank-fastener housing 170 and is selectively rotatable relative to shank-fastener housing 170 about shank-fastener-turret rotation axis A. Indexing-pin assembly 103 is supported by shank-fastener housing 170 and is selectively movable relative to shank-fastener housing 170 between an indexing-pin-assembly extended position and an indexing-pin-assembly retracted position along indexing-pin-assembly axis B that is parallel to shank-fastener-turret rotation axis A. Drill 104 is supported by shank-fastener turret 102 and is selectively movable relative to shank-fastener turret 102 along drill axis C that is parallel to shank-fastener-turret rotation axis A. Shank-fastener delivery assembly 105 also is supported by shank-fastener turret 102. Receiver-fastener apparatus 200 comprises receiver-fastener housing 270, receiver-fastener turret 202, indexing-collet assembly 203, anvil 204, receiver-fastener delivery assembly 205, and swager assembly 206. Receiver-fastener turret 202 is supported by receiver-fastener housing 270 and is selectively rotatable relative to receiver-fastener housing 270 about receiverfastener-turret rotation axis Z. Indexing-collet assembly 203 is supported by receiver-fastener housing 270 and is selectively movable relative to receiver-fastener housing 270 between an indexing-collet-assembly extended position and an indexing-collet-assembly retracted position along indexing-collet-assembly axis Y that is parallel to receiver-fastener-turret rotation axis Z. Indexing-collet assembly 203 also is configured to cooperate with indexing-pin assembly 103 to secure shank-fastener apparatus 100 and receiver-fastener apparatus 200 relative to first panel 500 and second panel 502. Anvil 204 is supported by receiver-fastener turret 202 and is selectively movable relative to receiver-fastener turret 202 along anvil axis X that is parallel to receiver-fastener-turret rotation axis Z. Anvil 204 also is configured to cooperate with drill 104 for operative drilling of drilled hole 508 through first panel 500 and second panel 502. Receiver-fastener delivery assembly 205 is supported by receiver-fastener turret 202 and is configured to position receiver fasteners 506 for operative placement on shank fasteners 504, corresponding to receiver fasteners 506, by shank-fastener delivery assembly 105. Swager assembly 206 is supported by receiver-fastener turret 202 and is movable relative to receiver-fastener turret 202 along swaging axis W that is parallel to receiver-fastener-turret rotation axis Z. Swager assembly 206 also is configured to swage receiver fasteners 506 on corresponding ones of shank fasteners 504. The preceding subject matter of this paragraph characterizes example 57 of the present disclosure.

Referring generally to FIG. 1 and particularly to, e.g., FIG. 41, system 1000 further comprises first robotic device 600 and second robotic device 601. Shank-fastener apparatus 100 is coupled to first robotic device 600 as first end effector 603. Receiver-fastener apparatus 200 is coupled to second robotic device 601 as second end effector 604. The preceding subject matter of this paragraph characterizes example 58 of the present disclosure, wherein example 58 also includes the subject matter according to example 57, above.

First robotic device 600 and second robotic device 601 serve to operatively position shank-fastener apparatus 100 and receiver-fastener apparatus 200 relative to first panel 500 and second panel 502 for installation of two-piece fastening systems. Moreover, use of first robotic device 600 and second robotic device 601 enables shank-fastener apparatus 100 and receiver-fastener apparatus 200 to be operated automatically and, in some examples, moved within confined, overhead, or otherwise difficult to reach or access by human personnel locations, such as within a wing-box of an aircraft being manufactured.

Referring generally to FIG. 42 and particularly to, e.g., FIGS. 2, 15, and 25-41, method 2000 of joining first panel 500 and second panel 502, at least partially overlapping each other, is disclosed. Method 2000 comprises (block 2002) locating shank-fastener apparatus 100 relative to first panel 500 and second panel 502 by engaging indexing-pin assembly 103 of shank-fastener apparatus 100 with locating hole 510 in first panel 500. Shank-fastener apparatus 100 is located on a first side of first panel 500. Method 2000 further comprises (block 2004) locating receiver-fastener apparatus 200 relative to first panel 500 and second panel 502 by engaging indexing-pin assembly 103 of shank-fastener apparatus 100 with indexing-collet assembly 203 of receiver-fastener apparatus 200. Receiver-fastener apparatus 200 is located opposite shank-fastener apparatus 100 on a second side of first panel 500, opposite the first side. Method 2000 also comprises (block 2006) aligning drill 104 of shank-fastener apparatus 100 with anvil 204 of receiver-fastener apparatus 200. Method 2000 additionally comprises (block 2008) drilling drilled hole 508 with drill 104 through first panel 500 and second panel 502. Method 2000 further comprises (block 2010) aligning one of receiver fasteners 506 with drilled hole 508 using receiver-fastener delivery assembly 205 of receiver-fastener apparatus 200. Method 2000 also comprises (block 2012) inserting one of shank fasteners 504 from the first side of first panel 500 into drilled hole 508 and into the one of receiver fasteners 506 using shank-fastener delivery assembly 105 of shank-fastener apparatus 100. Method 2000 additionally comprises (block 2014) securing the one of receiver fasteners 506 onto the one of shank fasteners 504 with swager assembly 206 of receiver-fastener apparatus 200. The preceding subject matter of this paragraph characterizes example 59 of the present disclosure.

By locating shank-fastener apparatus 100 and receiver-fastener apparatus 200 relative to first panel 500 and second panel 502, and by engaging indexing-pin assembly 103 with indexing-collet assembly 203, shank-fastener apparatus 100 and receiver-fastener apparatus 200 are secured relative to first panel 500 and second panel 502 for operation of their respective component tools. That is, once shank-fastener apparatus 100 is secured, it is possible to accurately position drill 104 for drilling drilled hole 508 through first panel 500 and second panel 502, and subsequently it is possible to accurately position shank-fastener delivery assembly 105 for inserting one of shank fasteners 504 through drilled hole 508 and through a receiver fastener positioned by receiver-fastener apparatus 200. Once receiver-fastener apparatus 200 is secured, it is possible to accurately position anvil 204 opposite drill 104, it is possible to position one of receiver fasteners 506 for insertion of the shank fastener through drilled hole 508 and through the positioned receiver fastener, and subsequently, it is possible to accurately position swager assembly 206 for securing the placed receiver fastener to the inserted shank fastener.

FIGS. 2, 15, and 25-40 are presented generally in sequential order and illustrate operation of shank-fastener apparatus 100 and receiver-fastener apparatus 200 to install a two-piece fastening system that joins first panel 500 and second panel 502.

Referring generally to FIG. 42 and particularly to, e.g., FIG. 25, according to method 2000, (block 2002) engaging indexing-pin assembly 103 of shank-fastener apparatus 100 with locating hole 510 in first panel 500 comprises (block 2016) extending indexing pin 112 of shank-fastener apparatus 100 along indexing-pin-assembly axis B and inserting indexing-pin second end 115 of indexing pin 112 through locating hole 510. The preceding subject matter of this paragraph characterizes example 60 of the present disclosure, wherein example 60 also includes the subject matter according to example 59, above.

By extending indexing pin 112 through locating hole 510, indexing pin engages the opposite side of first panel 500 to aid in securing shank-fastener apparatus 100 to first panel 500.

Referring generally to FIG. 42 and particularly to, e.g., FIG. 26, according to method 2000, (block 2002) engaging indexing-pin assembly 103 of shank-fastener apparatus 100 with locating hole 510 in first panel 500 further comprises (block 2018) sliding plunger 113 within an interior of indexing pin 112 along indexing-pin-assembly axis B and expanding indexing-pin second end 115 within locating hole 510. The preceding subject matter of this paragraph characterizes example 61 of the present disclosure, wherein example 61 also includes the subject matter according to example 60, above.

By expanding indexing-pin second end 115 with plunger 113, indexing pin 112 will engage the surface of locating hole 510 to aid in securing shank-fastener apparatus 100 to first panel 500.

Referring generally to FIG. 42 and particularly to, e.g., FIG. 26, according to method 2000, (block 2002) engaging indexing-pin assembly 103 of shank-fastener apparatus 100 with locating hole 510 in first panel 500 further comprises (block 2020) contacting finger-flange 118 at indexing-pin second end 115 against the second side of first panel 500. The preceding subject matter of this paragraph characterizes example 62 of the present disclosure, wherein example 62 also includes the subject matter according to example 60 or 61, above.

Contacting finger-flange 118 against the second side of first panel 500 aids in securing shank-fastener apparatus 100 to first panel 500.

Referring generally to FIG. 42 and particularly to, e.g., FIG. 27, according to method 2000, (block 2002) engaging indexing-pin assembly 103 of shank-fastener apparatus 100 with locating hole 510 in first panel 500 further comprises (block 2022) sliding clamping sleeve 111 along an exterior of indexing pin 112 and clamping first panel 500 between clamping sleeve 111 on the first side of first panel 500 and finger-flange 118 on the second side of first panel 500. The preceding subject matter of this paragraph characterizes example 63 of the present disclosure, wherein example 63 also includes the subject matter according to example 62, above.

Clamping first panel 500 between clamping sleeve 111 on the first side of first panel 500 and finger-flange 118 on the second side of first panel 500 secures shank-fastener apparatus 100 to first panel 500 for subsequent operation by the other tools of shank-fastener apparatus 100.

Referring generally to FIG. 42 and particularly to, e.g., FIGS. 28 and 29, according to method 2000, (block 2004) engaging indexing-pin assembly 103 of shank-fastener apparatus 100 with indexing-collet assembly 203 of receiver-fastener apparatus 200 comprises (block 2024) moving collet sleeve 220 of indexing-collet assembly 203 along indexing-collet-assembly axis Y and over indexing collet 219 indexing-collet assembly 203, and (block 2026) compressing indexing-collet second end 225 of indexing collet 219 onto indexing-pin assembly 103 that extends through locating hole 510. The preceding subject matter of this paragraph characterizes example 64 of the present disclosure, wherein example 64 also includes the subject matter according to any one of examples 59 to 63, above.

Compressing indexing-collet second end 225 onto indexing-pin assembly 103 clamps indexing collet 219 to indexing pin 112 and thus secures receiver-fastener apparatus 200 to shank-fastener apparatus 100 and thus secures receiver-fastener apparatus 200 relative to first panel 500 and second panel 502.

Referring generally to FIG. 42 and particularly to, e.g., FIG. 30, method 2000 further comprises, after (block 2004) engaging indexing-pin assembly 103 of shank-fastener apparatus 100 with indexing-collet assembly 203 of receiver-fastener apparatus 200, (block 2028) rotating shank-fastener turret 102 of shank-fastener apparatus 100 about shank-fastener-turret rotation axis A to align drill 104 at point P where first panel 500 and second panel 502 overlap. The preceding subject matter of this paragraph characterizes example 65 of the present disclosure, wherein example 65 also includes the subject matter according to any one of examples 59 to 64, above.

By rotating shank-fastener turret 102 about shank-fastener-turret rotation axis A, drill 104 is aligned with point P for drilling drilled hole 508.

Referring generally to FIG. 42 and particularly to, e.g., FIG. 31, method 2000 further comprises (block 2030) rotating receiver-fastener turret 202 of receiver-fastener apparatus 200 about receiver-fastener-turret rotation axis Z to align anvil 204 with point P. The preceding subject matter of this paragraph characterizes example 66 of the present disclosure, wherein example 66 also includes the subject matter according to example 65, above.

By rotating receiver-fastener turret 202 about receiver-fastener-turret rotation axis Z, anvil 204 is aligned with point P so that anvil 204 counteracts the force of drill 104.

Referring generally to FIG. 42 and particularly to, e.g., FIGS. 32 and 33, method 2000 further comprises (block 2032) extending pressure foot 136 of drill 104 to contact first panel 500, and (block 2034) extending anvil 204 to contact second panel 502 and to clamp first panel 500 and second panel 502 between anvil 204 and pressure foot 136. The preceding subject matter of this paragraph characterizes example 67 of the present disclosure, wherein example 67 also includes the subject matter according to example 66, above.

By extending anvil 204 to contact second panel 502, anvil 204 counteracts the force of drill 104.

Referring generally to FIG. 42 and particularly to, e.g., FIG. 35, method 2000 further comprises, after (block 2008) drilling drilled hole 508 through first panel 500 and second panel 502, prior to (block 2012) inserting the one of shank fasteners 504 from the first side of first panel 500 into drilled hole 508 and into the one of receiver fasteners 506, and while indexing-pin assembly 103 is engaged with indexing-collet assembly 203, (block 2036) rotating shank-fastener turret 102 of shank-fastener apparatus 100 about shank-fastener-turret rotation axis A to align shank-fastener delivery assembly 105 with drilled hole 508. The preceding subject matter of this paragraph characterizes example 68 of the present disclosure, wherein example 68 also includes the subject matter according to any one of examples 59 to 67, above.

By rotating shank-fastener turret 102 about shank-fastener-turret rotation axis A, shank-fastener delivery assembly 105 is aligned with drilled hole 508, making it is possible for shank-fastener delivery assembly 105 to insert one of shank fasteners 504 through drilled hole 508 and one of receiver fasteners 506, placed by receiver-fastener apparatus 200.

Referring generally to FIG. 42 and particularly to, e.g., FIG. 38, method 2000 further comprises, after (block 2012) inserting the one of shank fasteners 504 from the first side of first panel 500 into drilled hole 508 and into the one of receiver fasteners 506 while indexing-pin assembly 103 is engaged with indexing-collet assembly 203, (block 2040) rotating receiver-fastener turret 202 of receiver-fastener apparatus 200 about receiver-fastener-turret rotation axis Z to align swager assembly 206 with the one of shank fasteners 504 and the one of receiver fasteners 506. The preceding subject matter of this paragraph characterizes example 69 of the present disclosure, wherein example 69 also includes the subject matter according to any one of examples 59 to 68, above.

By rotating receiver-fastener turret 202 about receiver-fastener-turret rotation axis Z, swager assembly 206 is aligned with the placed receiver fastener and the shank fastener, extending through the placed receiver fastener so that the receiver fastener is swaged onto the shank fastener.

Referring generally to FIG. 42 and particularly to, e.g., FIG. 41, method 2000 further comprises (block 2042) moving shank-fastener apparatus 100 relative to first panel 500 and second panel 502 with first robotic device 600, and moving receiver-fastener apparatus 200 relative to first panel 500 and second panel 502 with second robotic device 601. The preceding subject matter of this paragraph characterizes example 70 of the present disclosure, wherein example 70 also includes the subject matter according to any one of examples 59 to 69, above.

Moving shank-fastener apparatus 100 and receiver-fastener apparatus 200 with robotic devices enables shank-fastener apparatus 100 and receiver-fastener apparatus 200 to be operated automatically and, in some examples, moved within confined, overhead, or otherwise difficult to reach or access by human personnel locations, such as within a wing-box of an aircraft being manufactured.

Examples of the present disclosure may be described in the context of aircraft manufacturing and service method 1100 as shown in FIG. 43 and aircraft 1102 as shown in FIG. 44. During pre-production, illustrative method 1100 may include specification and design (block 1104) of aircraft 1102 and material procurement (block 1106). During production, component and subassembly manufacturing (block 1108) and system integration (block 1110) of aircraft 1102 may take place. Thereafter, aircraft 1102 may go through certification and delivery (block 1112) to be placed in service (block 1114). While in service, aircraft 1102 may be scheduled for routine maintenance and service (block 1116). Routine maintenance and service may include modification, reconfiguration, refurbishment, etc. of one or more systems of aircraft 1102.

Each of the processes of illustrative method 1100 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 44, aircraft 1102 produced by illustrative method 1100 may include airframe 1118 with a plurality of high-level systems 1120 and interior 1122. Examples of high-level systems 1120 include one or more of propulsion system 1124, electrical system 1126, hydraulic system 1128, and environmental system 1130. Any number of other systems may be included. Although an aerospace example is shown, the principles disclosed herein may be applied to other industries, such as the automotive industry. Accordingly, in addition to aircraft 1102, the principles disclosed herein may apply to other vehicles, e.g., land vehicles, marine vehicles, space vehicles, etc.

Apparatus(es) and method(s) shown or described herein may be employed during any one or more of the stages of the manufacturing and service method 1100. For example, components or subassemblies corresponding to component and subassembly manufacturing (block 1108) may be fabricated or manufactured in a manner similar to components or subassemblies produced while aircraft 1102 is in service (block 1114). Also, one or more examples of the apparatus(es), method(s), or combination thereof may be utilized during production stages 1108 and 1110, for example, by substantially expediting assembly of or reducing the cost of aircraft 1102. Similarly, one or more examples of the apparatus or method realizations, or a combination thereof, may be utilized, for example and without limitation, while aircraft 1102 is in service (block 1114) and/or during maintenance and service (block 1116).

Different examples of the apparatus(es) and method(s) disclosed herein include a variety of components, features, and functionalities. It should be understood that the various examples of the apparatus(es) and method(s) disclosed herein may include any of the components, features, and functionalities of any of the other examples of the apparatus(es) and method(s) disclosed herein in any combination, and all of such possibilities are intended to be within the scope of the present disclosure.

Many modifications of examples set forth herein will come to mind to one skilled in the art to which the present disclosure pertains having the benefit of the teachings presented in the foregoing descriptions and the associated drawings.

Therefore, it is to be understood that the present disclosure is not to be limited to the specific examples illustrated and that modifications and other examples are intended to be included within the scope of the appended claims. Moreover, although the foregoing description and the associated drawings describe examples of the present disclosure in the context of certain illustrative combinations of elements and/or functions, it should be appreciated that different combinations of elements and/or functions may be provided by alternative implementations without departing from the scope of the appended claims. Accordingly, parenthetical reference numerals in the appended claims are presented for illustrative purposes only and are not intended to limit the scope of the claimed subject matter to the specific examples provided in the present disclosure.

The invention claimed is:

1. A shank-fastener apparatus for joining a first panel and a second panel, at least partially overlapping each other, the shank-fastener apparatus comprising:
 a shank-fastener housing;
 a shank-fastener turret, supported by the shank-fastener housing and selectively rotatable relative to the shank-fastener housing about a shank-fastener-turret rotation axis (A);
 an indexing-pin assembly, supported by the shank-fastener housing and selectively movable relative to the shank-fastener housing along an indexing-pin-assembly axis between: (i) an indexing-pin-assembly extended position in which the indexing-pin assembly extends from the shank-fastener housing, and (ii) an indexing-pin-assembly retracted position in which the indexing-pin assembly is drawn into the shank-fastener housing, the indexing-pin-assembly axis (B) being parallel to the shank-fastener-turret rotation axis (A);
 a drill, supported by the shank-fastener turret and selectively movable relative to the shank-fastener turret along a drill axis (C) that is parallel to the shank-fastener-turret rotation axis (A); and
 a shank-fastener delivery assembly, supported by the shank-fastener turret.

2. The shank-fastener apparatus according to claim 1, wherein:
 the indexing-pin assembly comprises:
  a clamping sleeve;
  an indexing pin, positioned within the clamping sleeve; and
  a plunger, positioned within the indexing pin; and each of the clamping sleeve, the indexing pin, or the plunger is movable relative to another along the indexing-pin-assembly axis (B).

3. The shank-fastener apparatus according to claim 2, wherein the indexing pin has an elongated shape and comprises:
an indexing-pin first end and an indexing-pin second end, axially opposite the indexing-pin first end; and
fingers, proximate to the indexing-pin second end and bendable relative to the indexing-pin-assembly axis (B).

4. The shank-fastener apparatus according to claim 3, wherein:
the clamping sleeve has an elongated shape and comprises a clamping-sleeve first end and a clamping-sleeve second end, located axially opposite from the clamping-sleeve first end;
in the indexing-pin-assembly retracted position, the clamping sleeve is retracted into the shank-fastener housing with the clamping-sleeve second end positioned in the shank-fastener housing; and
in the indexing-pin-assembly extended position, the clamping sleeve extends from the shank-fastener housing with the clamping-sleeve second end positioned outside of the shank-fastener housing.

5. The shank-fastener apparatus according to claim 3, wherein:
the indexing-pin assembly further comprises:
a first indexing-pin spring, operatively connected to the clamping sleeve;
a second indexing-pin spring, operatively connected to the indexing pin; and
a third indexing-pin spring;
the first indexing-pin spring applies a first spring force to the clamping sleeve to bias the clamping sleeve along the indexing-pin-assembly axis (B) into the shank-fastener housing;
the second indexing-pin spring applies a second spring force to the indexing pin to bias the indexing pin along the indexing-pin-assembly axis (B) into the shank-fastener housing;
the third indexing-pin spring applies a third spring force to the plunger to bias the plunger away from the indexing-pin second end;
the first indexing-pin spring has a first spring constant;
the second indexing-pin spring has a second spring constant;
the third indexing-pin spring has a third spring constant; and
the third spring constant is greater than the second spring constant and is less than the first spring constant.

6. The shank-fastener apparatus according to claim 3, wherein:
each of the fingers comprises a finger-flange at the indexing-pin second end; and
the finger-flange of each of the fingers extends radially away from the indexing-pin-assembly axis (B).

7. The shank-fastener apparatus according to claim 3, wherein the plunger is shorter than the indexing pin along the indexing-pin-assembly axis (B).

8. The shank-fastener apparatus according to claim 1, wherein:
the shank-fastener turret comprises a shank-fastener-turret trailing side and a shank-fastener-turret leading side that opposes the shank-fastener-turret trailing side; and
each of the drill and the shank-fastener delivery assembly is positioned in the shank-fastener turret to cooperate with a receiver-fastener apparatus at the shank-fastener-turret leading side;
the shank-fastener turret further comprises a drill receptacle that extends into the shank-fastener turret from the shank-fastener-turret leading side;
the drill is positioned in the drill receptacle;
the drill receptacle is sized for the drill to move along the drill axis (C) within the drill receptacle;
the drill comprises:
a drill housing, positioned in the drill receptacle of the shank-fastener turret;
a drill spindle, positioned in the drill housing;
a motor, operatively connected to the drill spindle to apply a force to rotate a drill bit, held by the drill spindle; and
a housing support spring that biases the drill housing away from the shank-fastener-turret leading side; and
the housing support spring is positioned between the drill housing and the shank-fastener turret.

9. The shank-fastener apparatus according to claim 8, wherein the drill further comprises:
a pressure foot that extends out of the shank-fastener turret via the shank-fastener-turret leading side; and
a pressure-foot spring, located between the pressure foot and the drill housing to bias the pressure foot away from the drill housing.

10. The shank-fastener apparatus according to claim 1, wherein:
the shank-fastener turret comprises a shank-fastener-turret trailing side and a shank-fastener-turret leading side that opposes the shank-fastener-turret trailing side; and
each of the drill and the shank-fastener delivery assembly is positioned in the shank-fastener turret to cooperate with a receiver-fastener apparatus at the shank-fastener-turret leading side;
the shank-fastener delivery assembly comprises:
a magazine, sized to hold shank fasteners; and
a retainer, positioned adjacent to the magazine to receive one of the shank fasteners from the magazine.

11. The shank-fastener apparatus according to claim 10, wherein:
the retainer comprises:
a first retainer side and a second retainer side, opposite the first retainer side;
a hollow interior space that extends between the first retainer side and the second retainer side and that is sized to contain one of the shank fasteners from the magazine;
a retainer slot that extends into the hollow interior space; and
flaps at the second retainer side;
the retainer slot is aligned with the magazine to enable one of the shank fasteners to move from the magazine, through the retainer slot, and into the hollow interior space;
the flaps are partially circumferentially spaced about the hollow interior space to temporarily retain one of the shank fasteners in an operative position;
two of the flaps at least partially define the retainer slot;
the shank-fastener delivery assembly further comprises a push rod, aligned with the retainer and configured to contact one of the shank fasteners in the retainer and to drive the one of the shank fasteners from the hollow interior space of the retainer; and the shank-fastener delivery assembly further comprises a push-rod spring that biases the push rod away from the retainer and toward the shank-fastener-turret trailing side.

12. The shank-fastener apparatus according to claim 10, wherein the magazine comprises a magazine body, a shank-fastener outlet, and a magazine slot, which extends into the magazine body from the shank-fastener outlet.

13. The shank-fastener apparatus according to claim 10, wherein the retainer is positioned at the shank-fastener-turret leading side.

14. The shank-fastener apparatus according to claim 1, wherein the shank-fastener housing extends at least partially around the shank-fastener turret and comprises shank-fastener-housing mounting flanges.

15. The shank-fastener apparatus according to claim 1, wherein the shank-fastener housing comprises an indexing-pin-assembly receptacle that houses the indexing-pin assembly.

16. The shank-fastener apparatus according to claim 15, wherein:

the indexing-pin-assembly receptacle has an indexing-pin-assembly-receptacle first end and an indexing-pin-assembly-receptacle second end, located axially opposite the indexing-pin-assembly-receptacle first end;

the indexing-pin-assembly receptacle comprises an indexing-pin-assembly receptacle inlet, located at the indexing-pin-assembly-receptacle first end, and configured to supply pressurized fluid to the indexing-pin-assembly receptacle to move the indexing-pin assembly between the indexing-pin-assembly extended position and the indexing-pin-assembly retracted position; and the indexing-pin-assembly-receptacle second end is configured to enable the indexing-pin assembly to move to the indexing-pin-assembly extended position to engage with one of the first panel or the second panel.

17. The shank-fastener apparatus according to claim 1, wherein:

the shank-fastener turret comprises a shank-fastener-turret trailing side and a shank-fastener-turret leading side that opposes the shank-fastener-turret trailing side;

each of the drill and the shank-fastener delivery assembly is positioned in the shank-fastener turret to cooperate with a receiver-fastener apparatus at the shank-fastener-turret leading side;

the shank-fastener turret further comprises a shank-fastener-delivery-assembly receptacle that extends into the shank-fastener-turret leading side; and the shank-fastener delivery assembly is positioned in the shank-fastener-delivery-assembly receptacle.

18. The shank-fastener apparatus according to claim 17, further comprising a shank-fastener-delivery-assembly-receptacle pressure-supply port that extends between the shank-fastener-delivery-assembly receptacle and the shank-fastener-turret trailing side, and wherein the shank-fastener-delivery-assembly-receptacle pressure-supply port is configured to move pressurized fluid into the shank-fastener-delivery-assembly receptacle.

19. The shank-fastener apparatus according to claim 17, wherein the shank-fastener delivery assembly comprises a plug that seals the shank-fastener-delivery-assembly receptacle toward the shank-fastener-turret trailing side.

20. A method of using the shank-fastener apparatus according to claim 1 in concert with a receiver-fastener apparatus to join the first panel and the second panel, at least partially overlapping each other, the method comprising steps of:

locating the shank-fastener apparatus relative to the first panel and the second panel by engaging the indexing-pin assembly of the shank-fastener apparatus with a locating hole in the first panel, and wherein the shank-fastener apparatus is located on a first side of the first panel;

locating the receiver-fastener apparatus relative to the first panel and the second panel by engaging the indexing-pin assembly of the shank-fastener apparatus with an indexing-collet assembly of the receiver-fastener apparatus, and wherein the receiver-fastener apparatus is located opposite the shank-fastener apparatus on a second side of the first panel, opposite the first side;

aligning the drill of the shank-fastener apparatus with an anvil of the receiver-fastener apparatus;

drilling a drilled hole with the drill through the first panel and the second panel;

aligning one of receiver fasteners with the drilled hole using a receiver-fastener delivery assembly of the receiver-fastener apparatus;

inserting one of shank fasteners from the first side of the first panel into the drilled hole and into the one of the receiver fasteners using the shank-fastener delivery assembly of the shank-fastener apparatus; and securing the one of the receiver fasteners onto the one of the shank fasteners with a swager assembly of the receiver-fastener apparatus.

\* \* \* \* \*